United States Patent [19]

Carau, Sr. et al.

[11] 4,255,617
[45] Mar. 10, 1981

[54] TRAVELLING WAVE DIGITIZER

[75] Inventors: Frank P. Carau, Sr.; Henry T. Hetzel; Michael A. Tremblay, all of Loveland, Colo.

[73] Assignee: Hewlett-Packard Company, Palo Alto, Calif.

[21] Appl. No.: 69,956

[22] Filed: Aug. 27, 1979

Related U.S. Application Data

[63] Continuation of Ser. No. 944,931, Sep. 22, 1978, abandoned.

[51] Int. Cl.³ ............................................. G08C 21/00
[52] U.S. Cl. .................................... 178/19; 178/18; 340/347 AD
[58] Field of Search ...... 364/520; 340/709, 146.3 SY, 340/347 AD, 347 CC; 178/18, 19, 20; 33/1 M, 1 P, 1 HH; 346/139 C; 371/1

[56] References Cited

U.S. PATENT DOCUMENTS

| | | | |
|---|---|---|---|
| 3,342,935 | 9/1967 | Leifer et al. | 178/19 |
| 3,732,369 | 5/1973 | Cotter | 178/19 |
| 3,735,044 | 5/1973 | Centner et al. | 178/19 |
| 3,865,977 | 2/1975 | Hiraki et al. | 178/19 |
| 3,875,331 | 4/1975 | Hasenbalg | 178/19 |
| 3,904,822 | 9/1975 | Kamm et al. | 178/19 |
| 3,921,165 | 11/1975 | Dym | 178/19 |
| 3,975,592 | 8/1976 | Carvey | 178/19 |
| 4,018,989 | 4/1977 | Snyder et al. | 178/19 |
| 4,054,746 | 10/1977 | Kamm | 178/19 |
| 4,080,515 | 3/1978 | Anderson | 178/19 |
| 4,081,603 | 3/1978 | Davis et al. | 178/19 |
| 4,088,842 | 5/1978 | Ikedo | 178/19 |
| 4,181,952 | 1/1980 | Casey et al. | 178/19 |

*Primary Examiner*—Thomas A. Robinson
*Attorney, Agent, or Firm*—Edward L. Miller

[57] ABSTRACT

A digitizer shifts long and short wavelength square waves across x and y grids in a platen to perform upon a cursor signal time measurements that represent coarse and fine cursor position data. The periodic staircase cursor signal is filtered before use to permit time measurements that resolve cursor positions to locations between lines in the grids. The contribution of the filter to the coarse and fine time measurements is obtained in a special reference measurement, so that it may be removed. A processor combines these data into Cartesian coordinates, and implements procedures for error reduction. These include averaging of consecutive time measurements, dynamic adjustment of a timing reference to remove ambiguities inherent in measuring very small or very large cyclic quantities, and correction of coordinates for the effects of cursor motion during measurement and for any non-perpendicularity of the x and y grids.

54 Claims, 39 Drawing Figures

SIMPLIFIED BLOCK DIAGRAM

TRAVELLING WAVE DIGITIZER WITH COMPUTER

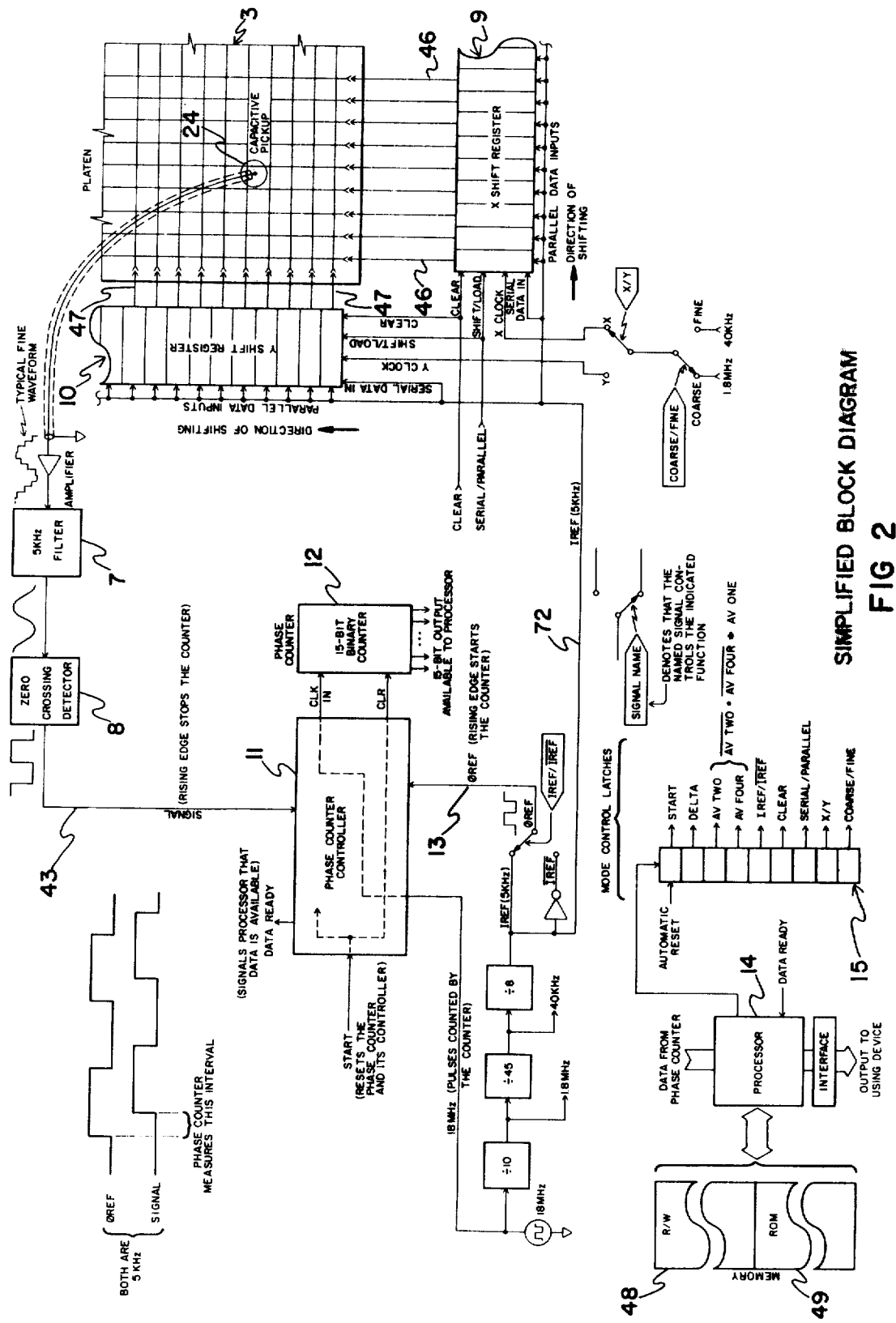

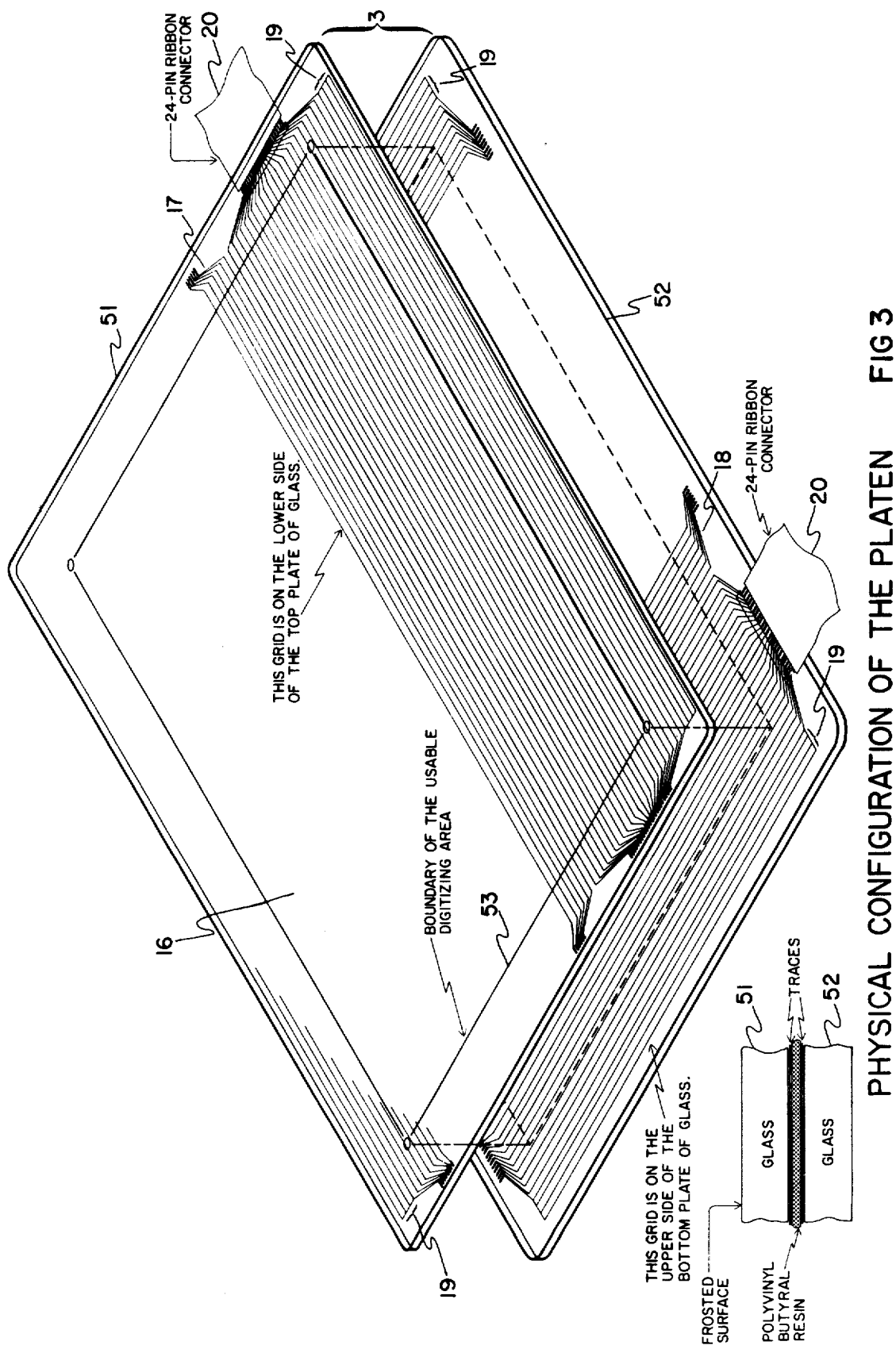

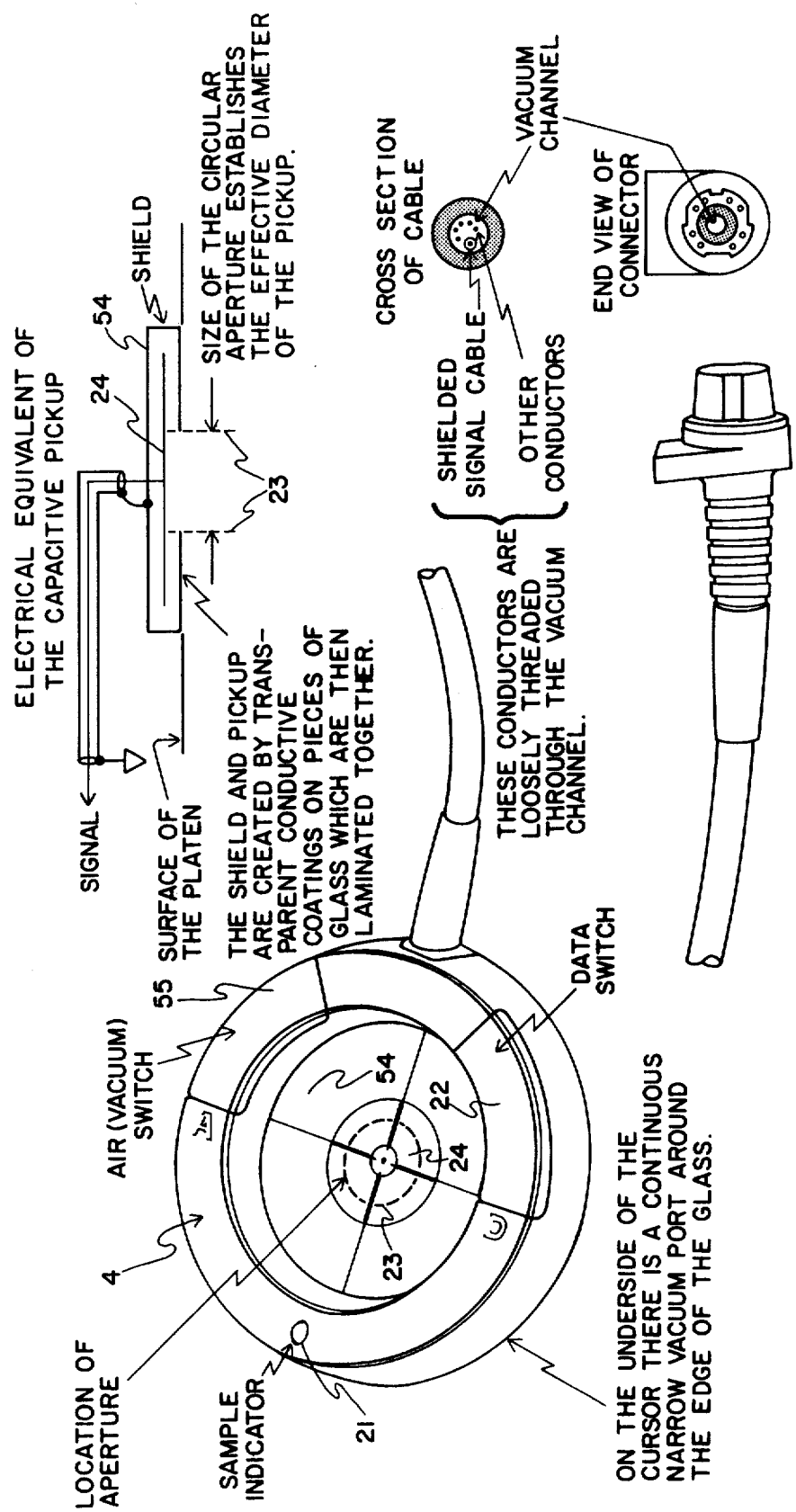

DETAILED BLOCK DIAGRAM

RELATIONSHIP BETWEEN THE SHIFT REGISTER,
THE SWEPT SQUARE WAVES, AND THE PLATEN

FIG 8 DETAILS OF FINE MEASUREMENT

HOW A REFERENCE MEASUREMENT AFFECTS A COARSE MEASUREMENT

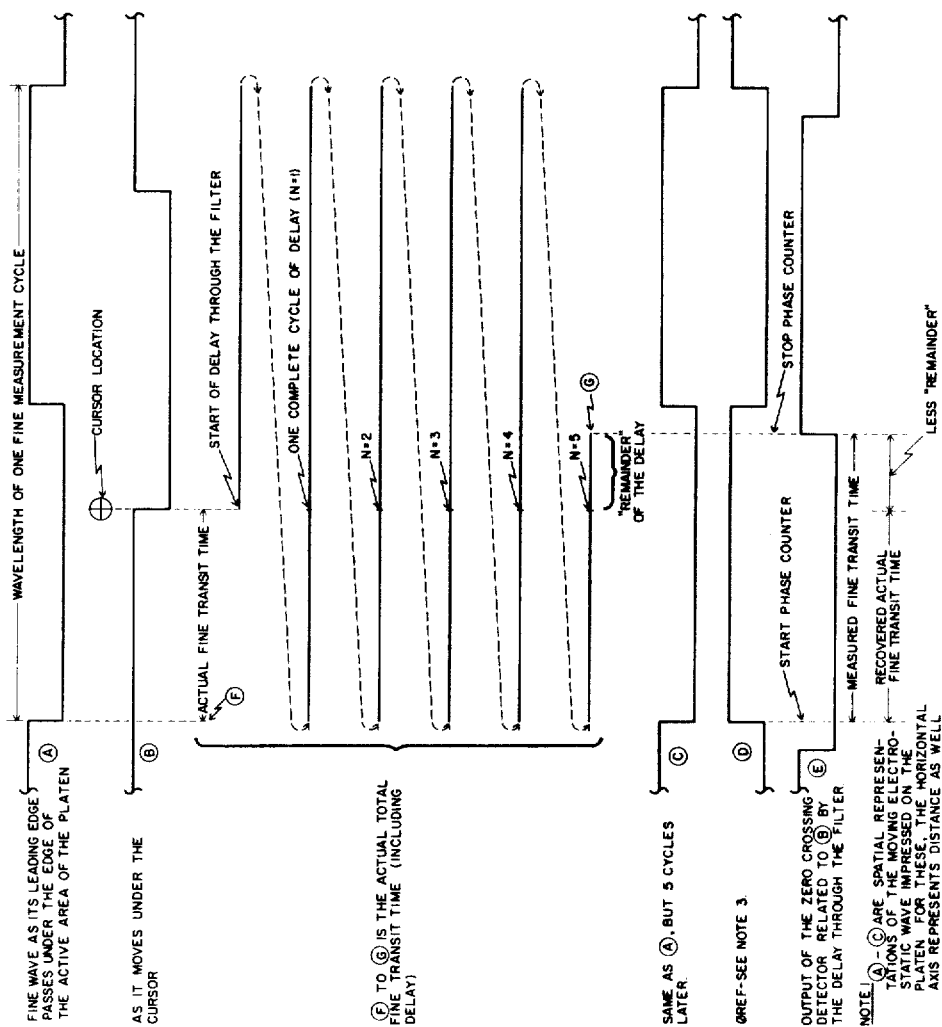

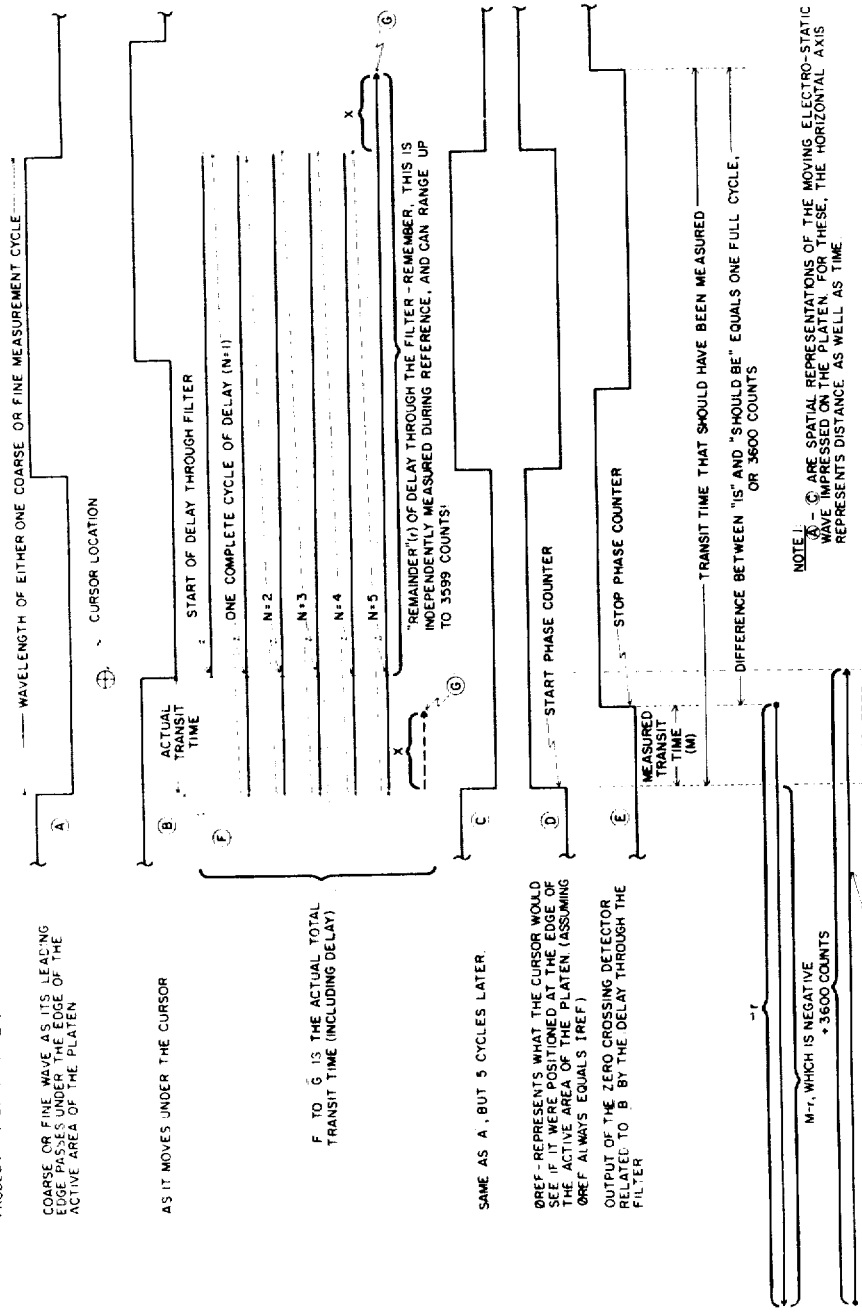

DETAILS OF THE HALF-WAVELENGTH OFFSET OF ØREF

1. FOR ANY TYPE OF MEASUREMENT THE IDEAL RESULT IN THE PHASE COUNTER IS A NUMBER m: $0 \leq m < 3599$ FOR AN AV1; $0 \leq m < 2(3599)$ FOR AN AV2; OR $0 \leq m < 4(3599)$ FOR AN AV4.

NORMALLY, A SMALL CHANGE IN THE RISING EDGE OF SIGNAL RESULTS IN A CORRESPONDINGLY SMALL CHANGE IN THE VALUE OF m. HOWEVER, BECAUSE ØREF AND SIGNAL ARE PERIODIC, THERE ARE INSTANCES WHERE A SMALL DIFFERENCE IN TIMING IN THE RISING EDGE OF SIGNAL CAN ABRUPTLY RESULT IN LARGE DIFFERENCES IN THE VALUE OF m. THESE INSTANCES, THEIR EFFECTS, AND WHAT IS DONE TO AMELIORATE THESE EFFECTS, ARE DESCRIBED BELOW.

DRIFT IN THE THRESHOLD OF THE ZERO CROSSING DETECTOR, AND NOISE IN THE AMPLIFIER, FILTER AND ZERO CROSSING DETECTOR, CAN INDUCE OFFSETS AND JITTER IN THE EDGES OF THE OUTPUT FROM THE ZERO CROSSING DETECTOR (SIGNAL). NOW, IT IS NEVER THE CASE THAT SUCH OFFSETS OR JITTER WILL CAUSE AN ALREADY ACCUMULATED LARGE COUNT IN THE PHASE COUNTER TO ABRUPTLY BECOME SMALL. THAT IS, IN THIS SYSTEM THE PHASE CONTER HAS 15 BITS, WHICH IS APPROXIMATELY TWICE AS LARGE AS IS NECESSARY TO ACCUMULATE THE LARGEST ACCUMULATION PURSUANT TO AN AV4. THEREFORE, THE PHASE COUNTER WILL NOT "ROLL OVER". HOWEVER, SUCH OFFSETS AND JITTER CAN CAUSE THESE GENERAL CASES:

i. A SITUATION REQUIRING A SMALL COUNT REGISTERS A LARGE ONE.

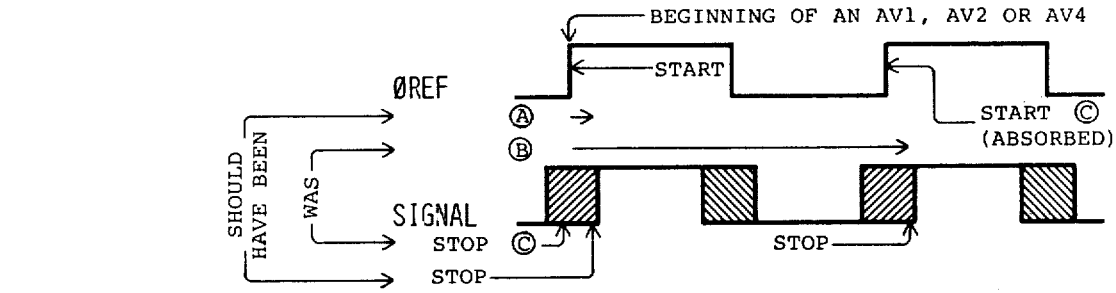

▨ — REPRESENTS (A MUCH EXAGGERATED) RANGE OF POSSIBLE TRANSITIONS IN SIGNAL, DUE TO OFFSETS OR JITTER.

Ⓐ REPRESENTS THE MAGNITITUDE OF THE COUNT THAT SHOULD HAVE BEEN OBTAINED.
   Ⓑ REPRESENTS THE MAGNITITUDE OF THE COUNT THAT ACTUALLY WAS OBTAINED.
   Ⓒ THESE START AND STOP SIGNALS HAVE NO EFFECT BECAUSE THEY OCCUR OUT OF SEQUENCE.

ii. A SITUATION REQUIRING A LARGE COUNT REGISTERS A SMALL ONE.

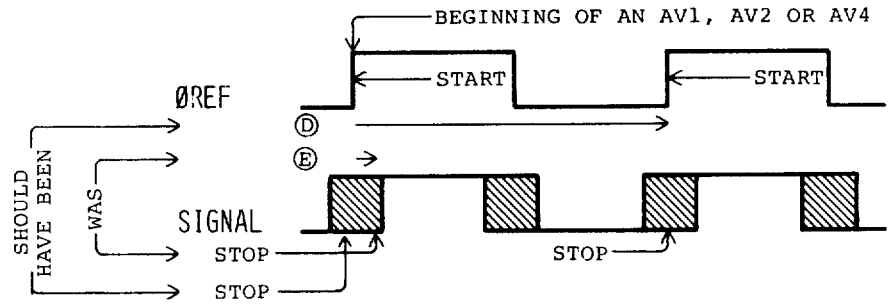

Ⓓ REPRESENTS THE MAGNITITUDE OF THE COUNT THAT SHOULD HAVE BEEN OBTAINED.
   Ⓔ REPRESENTS THE MAGNITITUDE OF THE COUNT THAT ACTUALLY WAS OBTAINED.

FIG 13A iii. A SITUATION REQUIRING A LARGE (BUT LESS THAN 3599) COUNT REGISTERS ONE GREATER THAN 3599.

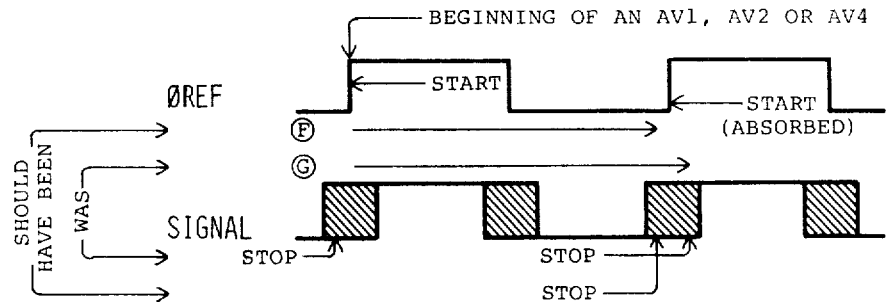

Ⓕ REPRESENTS THE MAGNITITUDE OF THE COUNT THAT SHOULD HAVE BEEN OBTAINED.
Ⓖ REPRESENTS THE MAGNITITUDE OF THE COUNT THAT ACTUALLY WAS OBTAINED.

2. MERE AVERAGING OF CONSECUTIVELY ACCUMULATED MEASUREMENTS WILL NOT SOLVE THIS PROBLEM.  IN FACT, THE PROBLEMS OF 1 ABOVE EFFECTIVELY PREVENT AVERAGING FROM BEING EMPLOYED TO MINIMIZE THE ERROR IN m DUE TO NOISE.  CONSIDER THE FOLLOWING CASES, ONE IN AN IDEAL SYSTEM WHERE THE MEASUREMENTS ALWAYS CORRECTLY INDICATE THE PRESENCE OF NOISE, AND THE OTHER IN A PRACTICAL SYSTEM WHERE THE EFFECTS OF NOISE INDUCED SKEW ON THE EDGES OF SIGNAL CANNOT BE SEPARATELY DISCERNED.

| IDEAL SYSTEM | PRACTICAL SYSTEM |
|---|---|
| 3594 | 3594 |
| 3602 | 2 ← SHOULD HAVE |
| 3594 | 3594   BEEN 3602 |
| + 3602 | + 2 ← |
| AV4=14392÷4=3598 | AV4=7192÷4=1798 |

3. EVEN IF IT WERE POSSIBLE TO TIGHTLY CONTROL THE LEVEL OF NOISE IN THE ANALOG CIRCUITRY AND CONTROL THE STABILITY OF THE THRESHOLD IN THE ZERO CROSSING DETECTOR, THERE WOULD STILL BE POTENTIAL AMBIGUITY CONCERNING THE MEANING OF A VERY SMALL OR VERY LARGE COUNT.  THIS WOULD OCCUR IF THERE WERE SIMULTANEOUS OR NEAR SIMULTANEOUS ARRIVAL OF START AND STOP SIGNALS TO THE PHASE COUNTER; THAT WOULD CAUSE RACE CONDITIONS WITH UNPREDICTABLE OUTCOMES.

4. A SOLUTION TO THIS DILEMMA IS TO DYNAMICALLY CONTROL WHICH SENSE OF IREF (IREF OR $\overline{IREF}$) IS USED AS ØREF DURING THE COMPARISON OF ØREF WITH SIGNAL. SINCE IREF AND $\overline{IREF}$ ARE EXACTLY 180° OUT OF PHASE THE SWITCH FROM ONE TO THE OTHER INDUCES AN 1800 COUNT OFFSET IN THE MEASURED VALUE OF m.  SOME VARIATIONS IN THE VALUES OF m DUE TO OFFSETS AND JITTER WILL STILL BE PRESENT, BUT THEY CAN BE SUCCESSFULLY AVERAGED OUT AFTER ARITHMETIC REMOVAL OF THE 1800 COUNT OFFSET.  SUCH AVERAGING DOES NOT TOTALLY ELIMINATE THE ERROR CAUSED BY NOISE, BUT DOES RENDER m MORE ACCURATE.

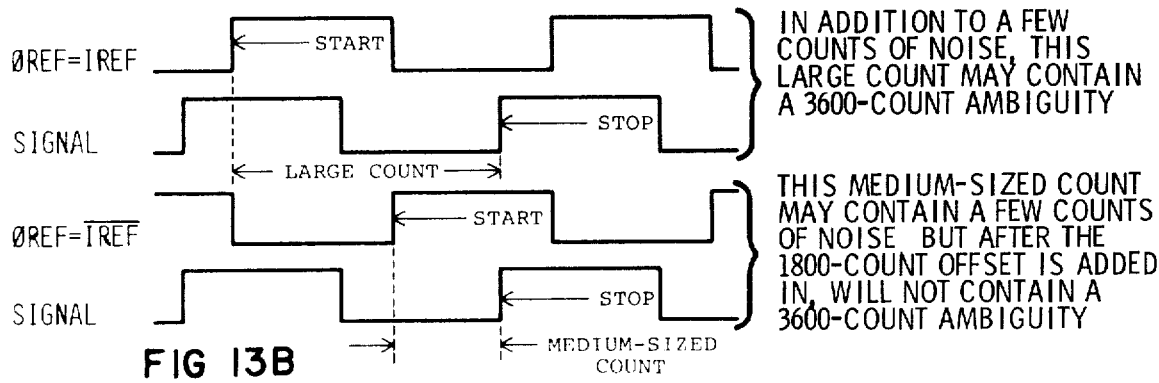

FIG 13B

5. ACCORDINGLY, AT THE BEGINNING OF ANY AV1, AV2 OR AV4, ØREF IS SET TO EQUAL IREF, AND A PRELIMINARY AV1 IS TAKEN TO ASCERTAIN THE GENERAL RANGE OF m. THERE ARE THREE GENERAL CASES:

i. IF 400<m<3200, THEN THE VALUE OBTAINED IS RETAINED AND THE REST OF THE MEASUREMENT ACTIVITY PROCEEDS UNINTERRUPTED.

ii. IF m<400, THEN $\overline{\text{IREF}}$ IS USED IN PLACE OF IREF AS A SOURCE OF ØREF, AND THE VALUE OF m JUST OBTAINED IS DISCARDED. SUBSEQUENT VALUES OF m OBTAINED ARE FIRST DIMINISHED BY 1800 COUNTS (i.e., m IS REPLACED BY m-1800) BEFORE BEING USED.

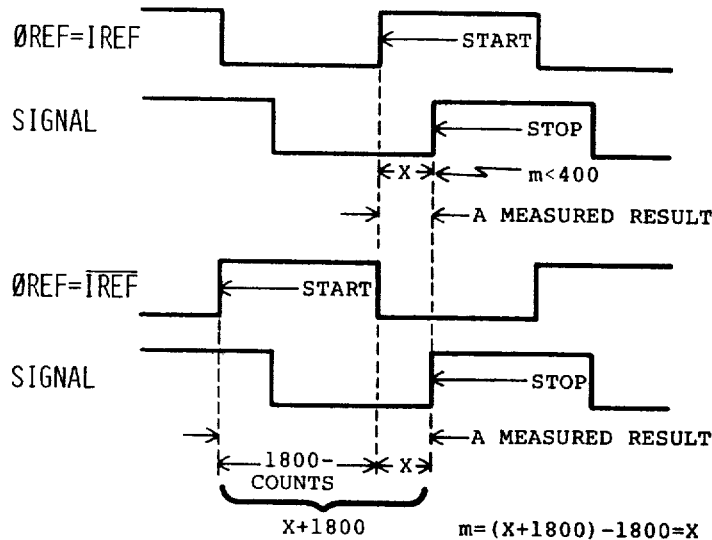

iii. IF 3200≤m THEN $\overline{\text{IREF}}$ IS USED IN PLACE OF IREF AS A SOURCE OF ØREF, AND THE VALUE OF m JUST OBTAINED IS DISCARDED. SUBSEQUENT VALUES OF m ARE FIRST INCREASED BY 1800 COUNTS (i.e., m IS REPLACED WITH m+1800) BEFORE BEING USED.

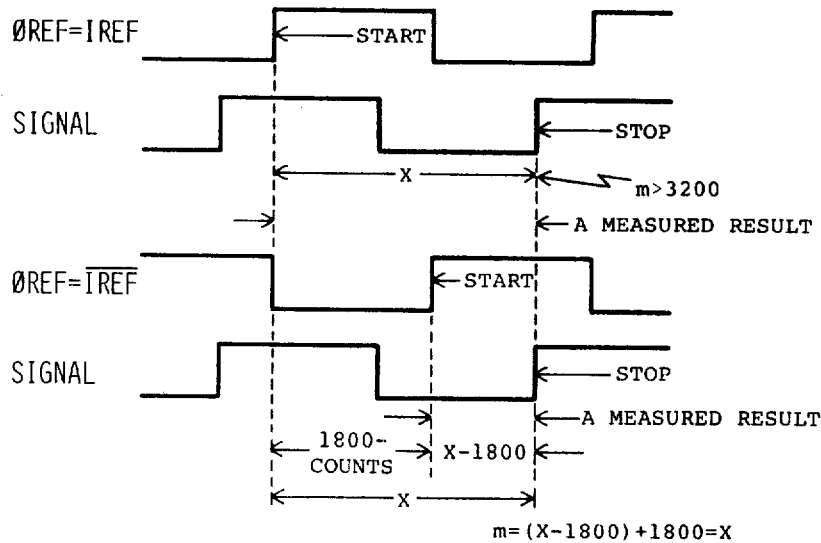

FIG 13C

FIG 14 — DETAILS OF THE COMBINING THE COARSE & FINE MEASUREMENTS (1) THE TOTAL DISTANCE (D) IN A GIVEN DIMENSION IS RESOLVED INTO THE SUM OF:

A COARSE COMPONENT — C-MANY COUNTS (C) OF 18 MHz
& A FINE COMPONENT — F-MANY COUNTS (F) OF 18 MHz (2) NOW:
- 5mm/SHIFT & 360 SHIFTS/CYCLE OF 5KHz ⇒ 1.8M/CYCLE
- COUNTING @ 18MHz & SHIFTING @ 1.8MHz ⇒ 10 COUNTS/SHIFT
- ∴ THE COARSE RESOLUTION IS 1.8M/3600 COUNTS OR .5mm/COUNT

NOW:
- 8 SHIFTS/CYCLE OF 5KHz @ 5mm/CYCLE ⇒ 40mm/CYCLE
- COUNTING @ 18MHz & SHIFTING @ 40KHz ⇒ 450 COUNTS/SHIFT
- ∴ THE FINE RESOLUTION IS 40mm/3600 COUNTS OR .0111···mm/COUNT (3) .5/.0111··· = 45 THEREFORE, EACH OF THE C-MANY COARSE COUNTS IS "WORTH" 45 FINE COUNTS (4) SINCE THE DISTANCE CORRESPONDING TO A FINE WAVE IS 1/45 THE DISTANCE CORRESPONDING TO A COARSE WAVE (BECAUSE OF (3) ABOVE, OR BECAUSE 18M/40mm=45) A FINE WAVE CORRESPONDS TO 1/45 OF THE 360 SHIFTS OF A COARSE WAVE. THIS IS 8 (COARSE) SHIFTS, OR 80 (COARSE) COUNTS.

TO PROVIDE AN EXACT COMMON BOUNDARY BETWEEN THE COARSE AND FINE MEASUREMENTS, THE COARSE COMPONENT IS OBTAINED BY ROUNDING THE COARSE MEASUREMENT UP OR DOWN TO THE "MOST LIKELY" NUMBER OF COUNTS EXACTLY CONTAINING AN INTEGRAL NUMBER OF COMPLETE GROUPS OF 80 COUNTS. THIS IS DONE BY THE PROCESSOR BEFORE THE COARSE AND FINE COMPONENTS ARE ADDED, AND OCCURS IN THE MANNER SHOWN IN (5) AND (6) BELOW.

(5) REPRESENTS FINE COUNTS ALONG THE AXIS UNDER CONSIDERATION

REPRESENTS COARSE COUNTS ALONG THE AXIS UNDER CONSIDERATION

NOW:
$C/80 = N + r/80$ WHERE N IS THE INTEGRAL NUMBER OF TIMES 80 IS CONTAINED IN C, AND r IS THE REMAINDER.

THE UNROUNDED COARSE COUNT AND THE FINE COUNT ARE NOT AT ALL ARBITRARY WITH RESPECT TO EACH OTHER. EXCEPT FOR BEING CYCLIC (MOD 3600) THE FINE COUNT REPRESENTS AN ACTUAL MAGNIFICATION (BY 45X) OF THAT PORTION OF THE COARSE COUNT IN EXCESS OF AN INTEGRAL NUMBER OF 80 COUNTS. THE COMBINATIONS OF A HIGH COARSE "EXCESS" ACCOMPANIED BY A LOW FINE COUNT, OR A LOW COARSE "EXCESS" ACCOMPANIED BY A HIGH FINE COUNT, ARE NOT POSSIBLE IN AN IDEAL SYSTEM. HOWEVER, THE PRESENCE IN AN ACTUAL SYSTEM OF NOISE AND OTHER HARD-TO-CONTROL-FOR VARIABLES (SUCH AS SLIGHT CHANGES IN DELAY THROUGH THE PRE-AMPLIFIERS AS THEIR GAIN IS ADJUSTED TO MATCH THE DIFFERING SIGNAL LEVEL CONDITIONS CORRESPONDING TO COARSE AND FINE), AS WELL AS CURSOR MOTION, CAN CAUSE THOSE SITUATIONS TO OCCUR.

SINCE AN EQUAL NUMBER OF SPURIOUS COUNTS DUE TO NOISE ARE EQUALLY LIKELY TO OCCUR IN BOTH THE COARSE AND FINE COUNTS, AND SINCE THERE ARE 45 FINE COUNTS TO EVERY "EXCESS" COARSE COUNT, ERRORS DUE TO NOISE ARE VERY LIKELY TO BE SIGNIFICANT ONLY FOR THE COARSE COUNT. IN PARTICULAR, THE DANGER IS THAT NOISE MAY ADD SPURIOUS COUNTS WHEN THE "EXCESS" COARSE COUNT IS CLOSE TO 79 (PUSHING THE COUNT INTO THE NEXT GROUP OF 80), OR MAY LOSE LEGITIMATE COUNTS WHEN THE "EXCESS" IS CLOSE TO ZERO (RETARDING THE COUNT INTO THE PREVIOUS GROUP OF 80). THESE SITUATIONS CAN BE DETECTED BY COMPARING THE "EXCESS" COARSE COUNT WITH THE FINE COUNT, AS SHOWN IN (6) BELOW.

(6) SHOWN BELOW IN (A) THROUGH (E) ARE THE VARIOUS POSSIBLE COMBINATIONS OF THE EXCESS COARSE COUNT AND ITS ACCOMPANYING FINE COUNT. CASES (D) AND (E) REQUIRE ADJUSTMENT TO N.

(A) AGREEMENT—NO CHANGE TO N
(B) AGREEMENT—NO CHANGE TO N
(C) AGREEMENT—NO CHANGE TO N
(D) NO AGREEMENT—DECREMENT N
  THIS ASSUMES THE COARSE COUNT WAS MADE LARGER BY EXTRA COUNTS, DUE TO NOISE, OR THAT THERE WAS CURSOR MOTION TOWARD SMALLER VALUES IN THIS DIMENSION.
(E) NO AGREEMENT—INCREMENT N
  THIS ASSUMES THE COARSE COUNT WAS MADE SMALLER BY LOSS OF LEGITIMATE COUNTS, DUE TO NOISE, OR THAT THERE WAS CURSOR MOTION TOWARD THE LARGER VALUES IN THIS DIMENSION (7) THUS THE TOTAL DISTANCE (D) IS: $D = (45 C_{ROUNDED} + F) \times .0111 \cdots$ mm

THE COORDINATE PAIR MEASUREMENT SEQUENCE

| GENERAL SEQUENCE OF MAJOR ACTIVITIES | ASSOCIATED CONTENTS OF THE MODE CONTROL LATCHES | COMMENTS |
|---|---|---|
| CLEAR | AUTOMATIC RESET → START, DELTA, AV TWO, AV FOUR, IREF/IREF (✓), CLEAR (P), SERIAL/PARALLEL, X/Y, COARSE/FINE — DONE 1 TIME | CLEAR GROUNDS EACH LINE IN BOTH GRIDS WITHIN THE PLATEN. |
| | AUTOMATIC RESET → START, DELTA, AV TWO → AV ONE, AV FOUR, IREF/IREF, CLEAR, SERIAL/PARALLEL (S), X/Y (X), COARSE/FINE (C) — DONE 1 TIME | THIS AV1 IS DONE TO PRE-SELECT WHICH OF IREF OR $\overline{IREF}$ IS USED AS ØREF FOR THE AV4'S TO FOLLOW. THE VALUE OF m RETURNED IS <u>NOT</u> RETAINED. |
| X COARSE | AUTOMATIC RESET → START, DELTA, AV TWO, AV FOUR (✓), IREF/IREF, CLEAR, SERIAL/PARALLEL (S), X/Y (X), COARSE/FINE (C) — DONE 1 TIME | THERE NOW FOLLOW ONE (OR MORE) AV4'S. EACH AV4 CAN "NULLIFY" AND THEN "REPEAT" ITSELF WITH THE OPPOSITE SENSE OF ØREF IF THE CURSOR BEGINS TO MOVE INTO A REGION WHERE A 3600-COUNT AMBIGUITY MAY SOON AFTERWARDS APPEAR. |

FIG 15A

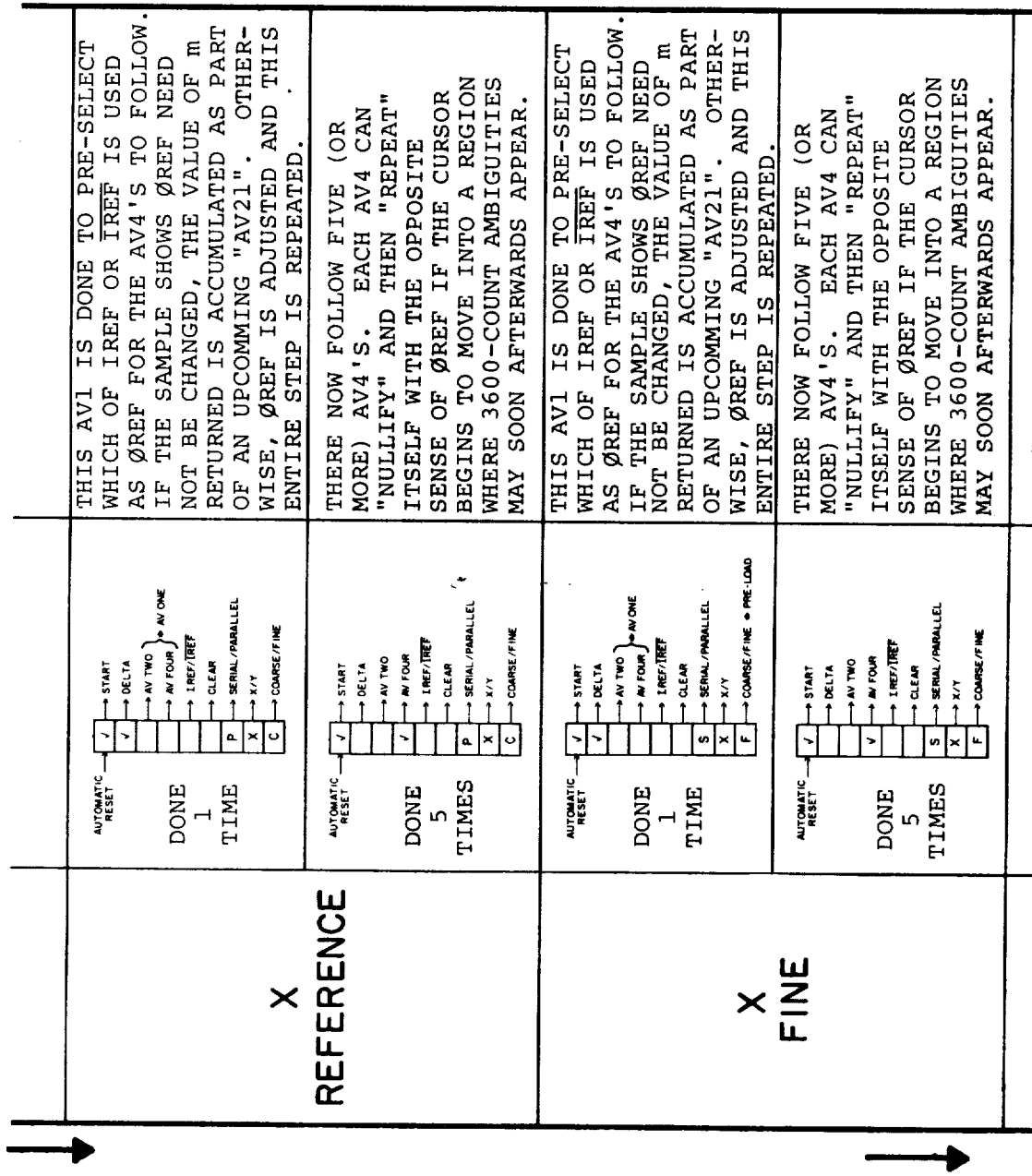

| | | | |
|---|---|---|---|
| Y REFERENCE | AUTOMATIC RESET: ✓ START, ✓ DELTA, AV TWO, AV FOUR } → AV ONE, IREF/I̅R̅E̅F̅, CLEAR, P SERIAL/PARALLEL, Y X/Y, C COARSE/FINE — DONE 1 TIME | THIS AV1 IS DONE TO PRE-SELECT WHICH OF IREF OR I̅R̅E̅F̅ IS USED AS ØREF FOR THE AV4'S TO FOLLOW. IF THE SAMPLE SHOWS ØREF NEED NOT BE CHANGED, THE VALUE OF m RETURNED IS ACCUMULATED AS PART OF AN UPCOMMING "AV21". OTHERWISE, ØREF IS ADJUSTED AND THIS ENTIRE STEP IS REPEATED. | |
| | AUTOMATIC RESET: ✓ START, ✓ DELTA, AV TWO, AV FOUR } → AV ONE, IREF/I̅R̅E̅F̅, CLEAR, P SERIAL/PARALLEL, Y X/Y, C COARSE/FINE — DONE 5 TIMES | THERE NOW FOLLOW FIVE (OR MORE) AV4'S. EACH AV4 CAN "NULLIFY" AND THEN "REPEAT" ITSELF WITH THE OPPOSITE SENSE OF ØREF IF THE CURSOR BEGINS TO MOVE INTO A REGION WHERE 3600-COUNT AMBIGUITIES MAY SOON AFTERWARDS APPEAR. | |
| Y COARSE | AUTOMATIC RESET: ✓ START, ✓ DELTA, AV TWO, AV FOUR } → AV ONE, IREF/I̅R̅E̅F̅, CLEAR, S SERIAL/PARALLEL, Y X/Y, C COARSE/FINE — DONE 1 TIME | THIS AV1 IS DONE TO PRE-SELECT WHICH OF IREF OR I̅R̅E̅F̅ IS USED AS ØREF FOR THE AV4'S TO FOLLOW. THE VALUE OF m RETURNED IS NOT RETAINED. | |
| | AUTOMATIC RESET: ✓ START, ✓ DELTA, AV TWO, AV FOUR } → AV ONE, IREF/I̅R̅E̅F̅, CLEAR, S SERIAL/PARALLEL, Y X/Y, C COARSE/FINE — DONE 1 TIME | THERE NOW FOLLOW ONE (OR MORE) AV4'S. EACH AV4 CAN "NULLIFY" AND THEN "REPEAT" ITSELF WITH THE OPPOSITE SENSE OF ØREF IF THE CURSOR BEGINS TO MOVE INTO A REGION WHERE A 3600-COUNT AMBIGUITY MAY SOON AFTERWARDS APPEAR. | |

FIG 15D

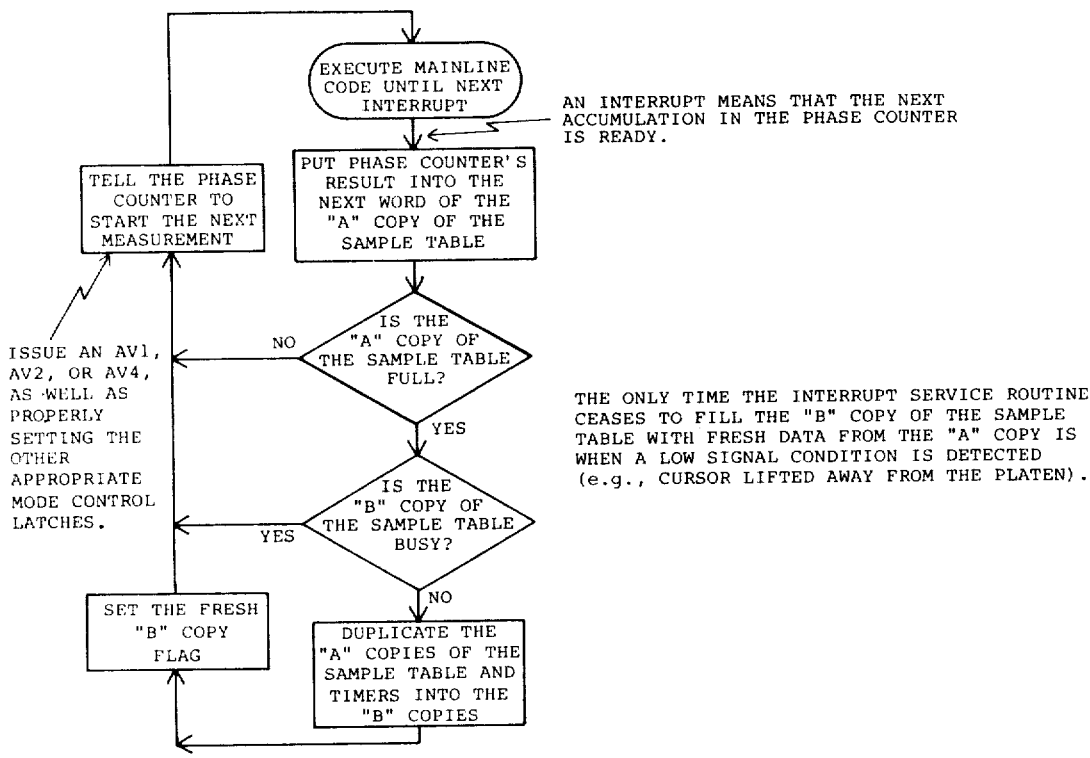
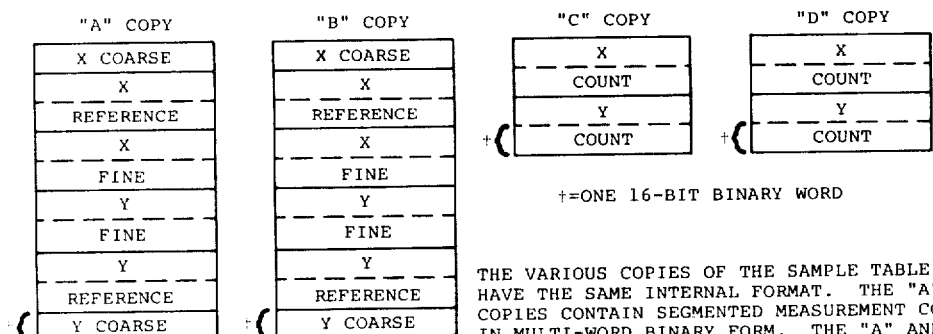
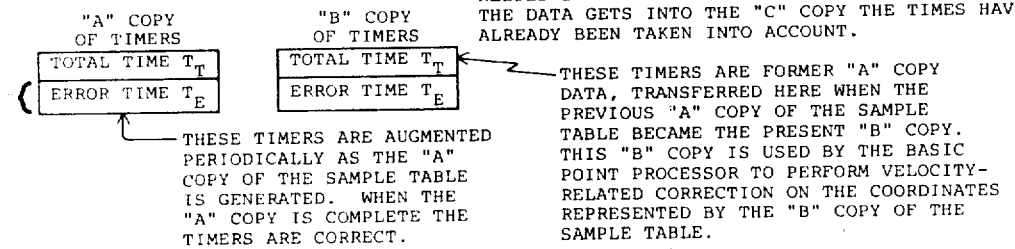
OVERVIEW OF THE PROCESSOR'S ACTIVITY
FIG 16A

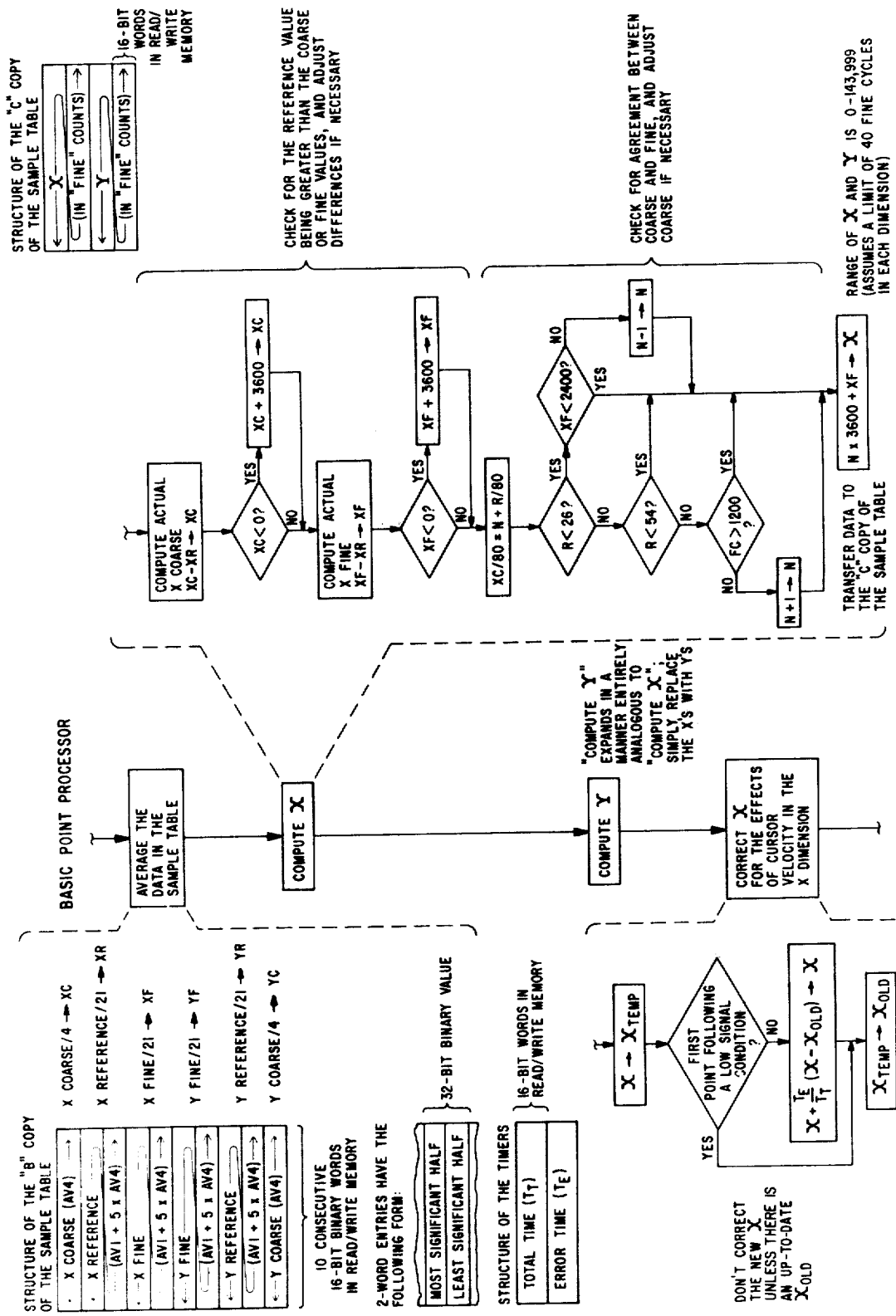
FIG 18 DESCRIPTION OF THE BASIC POINT PROCESSOR

BASIC REASON WHY VELOCITY-RELATED COORDINATE CORRECTION IS NEEDED

GENERAL BASIS OF THE ALGORITHM USED TO PERFORM VELOCITY-RELATED COORDINATE CORRECTION (NUANCES ARISING FROM DISTINCTION BETWEEN COARSE AND FINE MEASUREMENTS ARE NOT SHOWN.)

DETAILS OF WHICH PORTIONS OF THE MEASUREMENT CYCLE
CONTRIBUTE TO VELOCITY-RELATED CORRECTION

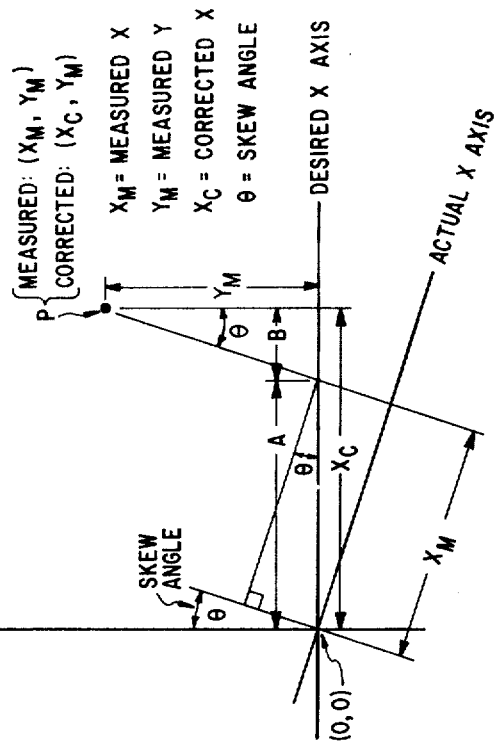
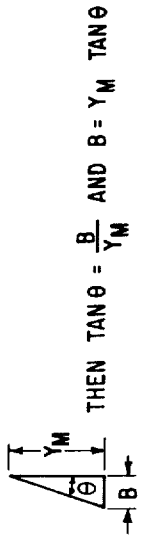
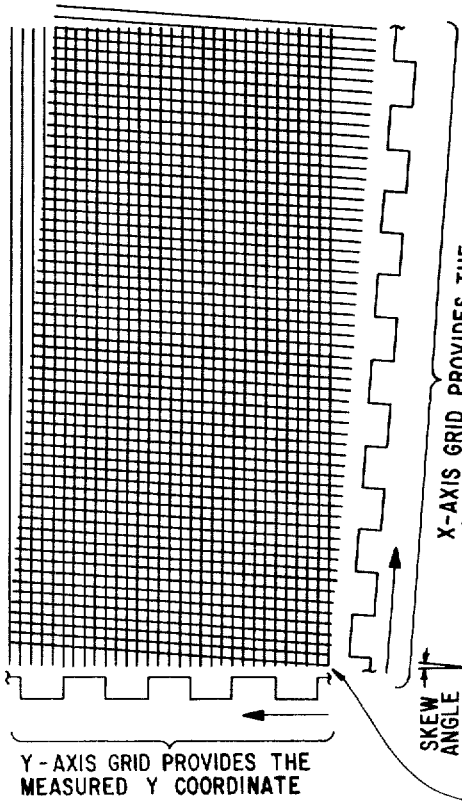
ALGORITHMIC BASIS FOR CORRECTION OF AXIS SKEW
FIG 22

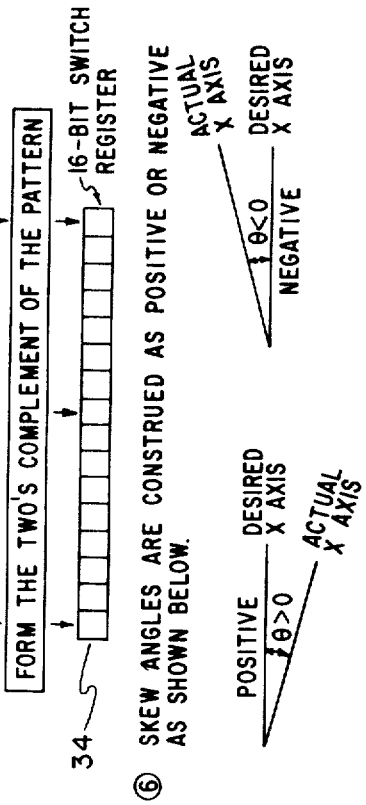

① THE COSθ AND TANθ REQUIRED FOR SKEW CORRECTION OF THE MEASURED X COMPONENT ARE OBTAINED BY EVALUATING THE FIRST THREE TERMS OF THE RESPECTIVE TAYLOR SERIES EXPANSIONS. THOSE EXPANSIONS ARE PERFORMED BY PROGRAMS IN THE DIGITIZER'S FIRMWARE. THOSE PROGRAMS REQUIRE THE SKEW ANGLE θ AS AN INPUT VARIABLE.

② THE VALUE OF θ IS DETERMINED BY MEASUREMENT AT THE TIME THE DIGITIZER IS ASSEMBLED AND TESTED. θ IS SUBSEQUENTLY MANUALLY ENCODED INTO A 16-BIT SWITCH REGISTER. THAT SWITCH REGISTER APPEARS TO THE PROCESSOR AS A MEMORY LOCATION WHOSE CONTENTS CAN BE READ.

③ THE SWITCH REGISTER IS ENCODED WITH THE MOST SIGNIFICANT 16 BITS OF THE BINARY NUMBER OBTAINED BY FIRST CONVERTING |θ| IN RADIANS TO BINARY. (θ IS EXPECTED TO BE SMALL-ON THE ORDER OF 1/64 RADIAN OR LESS.) THE RESULT WILL BE A BINARY FRACTION. NEXT, THE FRACTION IS WRITTEN TO INCLUDE TWENTY PLACES TO THE RIGHT OF THE BINARY POINT:

BIT-PATTERN OF INTEREST
.0 0 0 0 0 x x x x x x x x x x x x x x x x x

BINARY POINT

|θ| IS SMALL ENOUGH THAT THE FIRST FIVE BITS TO THE RIGHT OF THE BINARY POINT ARE ZEROS.

④ THE BITS MARKED "BIT-PATTERN OF INTEREST" IN ③ ABOVE ARE ENCODED INTO THE SWITCH REGISTER AS SHOWN BELOW IF θ IS TO BE CONSTRUED AS POSITIVE.

BIT-PATTERN OF INTEREST
0 x x x x x x x x x x x x x x x  →  16-BIT SWITCH REGISTER

34

⑤ THE BITS MARKED "BIT-PATTERN OF INTEREST" IN ③ ABOVE ARE ENCODED INTO THE SWITCH REGISTER AS SHOWN BELOW IF θ IS TO BE CONSTRUED AS NEGATIVE.

BIT-PATTERN OF INTEREST
0 x x x x x x x x x x x x x x x
FORM THE TWO'S COMPLEMENT OF THE PATTERN  →  16-BIT SWITCH REGISTER

34

⑥ SKEW ANGLES ARE CONSTRUED AS POSITIVE OR NEGATIVE AS SHOWN BELOW.

POSITIVE  DESIRED X AXIS  {θ>0}  ACTUAL X AXIS

ACTUAL X AXIS  {θ<0}  DESIRED X AXIS  NEGATIVE

⑦ THE PROGRAMMING IN THE FIRMWARE INCORPORATES THE VALUE IN THE SWITCH REGISTER INTO A MULTI-WORD BINARY FLOATING POINT FORMAT. THE RESULTING 3-WORD VALUE IS USED BY ARITHMETIC ROUTINES IN THE DIGITIZER'S FIRMWARE. THE PARTICULAR FORMAT USED IS SHOWN BELOW.

16-BIT SW. REG. — ENCLOSED VALUE OF θ — MOST SIGNIFICANT MANTISSA WORD

16-BIT WORDS LOCATED IN ROM
| 0 0 0 0 0 | 34 | LEAST SIGN. MANT. WORD
| 1 7 7 7 3 4 | ASSUMED LCTN. OF THE BIN. PT.
TWO'S CMPLM. EXPONENT WORD

EQUALS −36 DECIMAL. IF THE TWO WORD MANTISSA WERE CONVERTED TO A FIXED POINT NUMBER USING THIS EXPONENT, THE RESULT WOULD BE THE SAME AS IN ③ FOR POSITIVE θ'S, AND THE TWO'S COMPLEMENT OF ③ FOR NEGATIVE θ'S.

HOW THE SWITCH REGISTER IS ENCODED WITH THE SKEW ANGLE   FIG 23

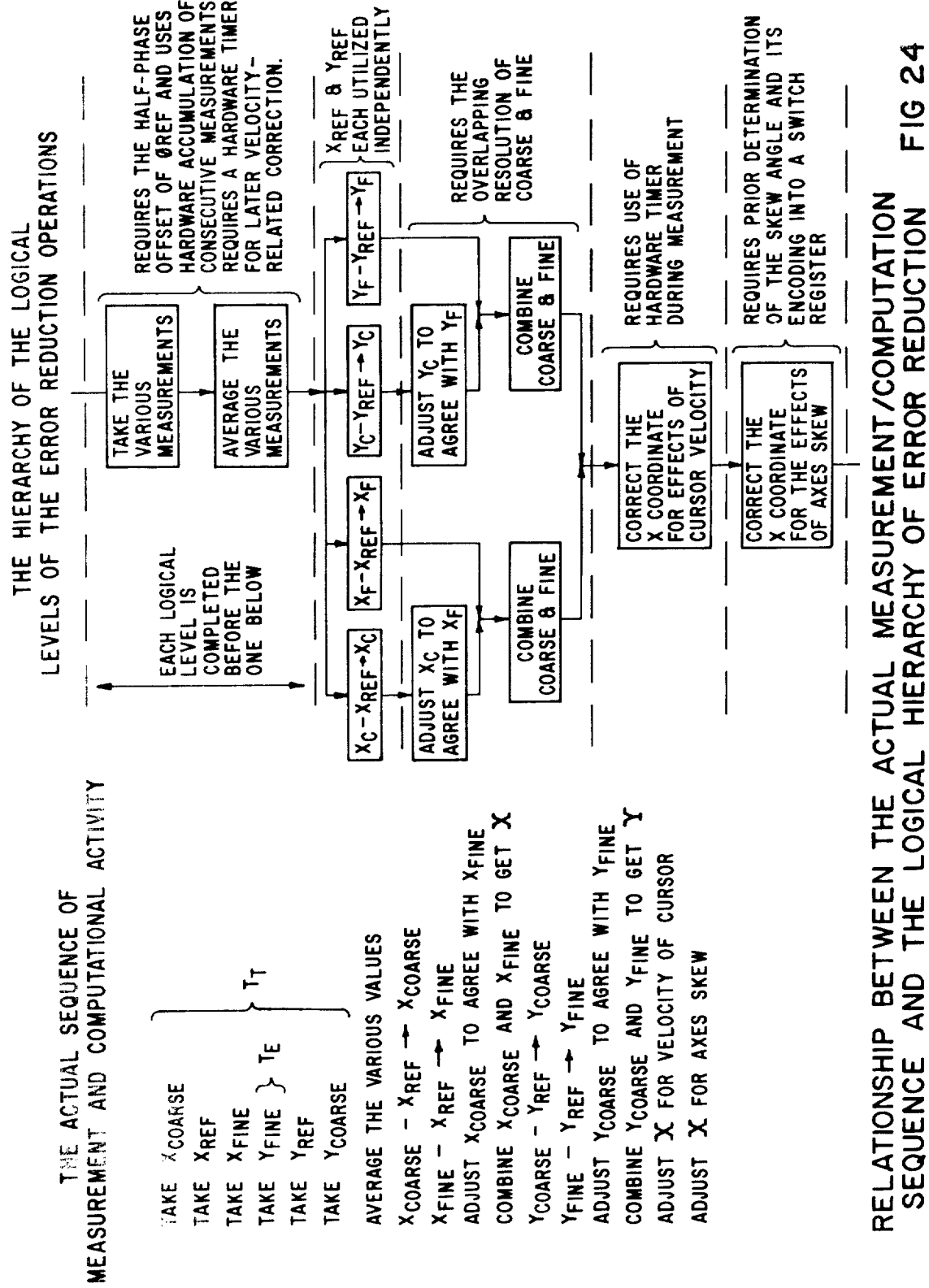
RELATIONSHIP BETWEEN THE ACTUAL MEASUREMENT/COMPUTATION SEQUENCE AND THE LOGICAL HIERARCHY OF ERROR REDUCTION    FIG 24

REASON FOR NON-LINEARITY AT THE EXTREMES OF THE PLATEN

THE USE OF REDUNDANT DRIVE LINES IN THE SOLUTION OF NON-LINEARITY AT THE EXTREMES OF THE PLATEN

SIMPLIFIED BLOCK DIAGRAM OF AN ALTERNATE EMBODIMENT EMPLOYING A MAGNETIC PICKUP

TRAVELLING WAVE DIGITIZER

CROSS REFERENCE TO RELATED APPLICATION

This is a continuation of application Ser. No. 944,931, filed Sept. 22, 1978, now abandoned.

BACKGROUND OF THE INVENTION

1. Field of the Invention

This invention relates in general to electronic means of gathering data for processing by computers or other data handling or storage devices. More particularly, the invention pertains to electronic devices that convert graphic information such as charts, maps, graphs, images on film, etc., into Cartesian coordinate data through the use of an operator positioned cursor whose location on a platen is obtainable in terms of Cartesian coordinates. Such devices are commonly called digitizers.

2. Discussion of the Prior Art

To be useful with the computers, plotters and data storage media currently available, a digitizer must be capable of supplying at least several tens of coordinate pairs per second, as well as be accurate and otherwise easy to use. The accuracy and ease of use criteria have practically eliminated mechanical linkages from digitizers used for electronic data gathering and processing. Most digitizers used for such purposes employ some means of electronic interaction between the cursor, or stylus, and a digitizing surface, called a platen.

Digitizers may be classified as either incremental or absolute. An incremental digitizing technique is one wherein it is inherently the effects of cursor motion that are detectable, rather than the actual location of the cursor, per se. An incremental digitizing system must continually accumulate changes in cursor position, starting with its original position. In addition, the original position must be identified as such, and assigned coordinate values (usually as the origin). Such digitizing techniques suffer from the disadvantage that the cursor cannot ordinarily be lifted away from the platen (say, to change the document being digitized). For to do so severs the electronic interaction between the cursor and the platen. Since an incremental technique requires the digitizer to constantly keep track of changes in the cursor's position in order to know where the cursor is, and since it cannot do this once the cursor has been lifted away from the platen, once lifted the cursor cannot then be replaced with the intent of digitizing further with the same point on the platen serving as the origin.

A digitizer employing an absolute technique does not have this difficulty. In such a digitizer the technique itself provides direct determination of the cursor's position on the platen. Each such determination is totally independent of the one before it, and is capable of determining the cursor's location anywhere within the active area of the platen.

A common general approach to absolute digitizing may be described as follows. Find some physical or electrical phenomenon having a parameter that varies, or can be made to vary, with distance. Apply the phenomenon along a dimension or axis of the platen in such a way that there is a one-to-one correspondence between the displacement of the cursor along the axis and the variation in the chosen parameter. Cyclic phenomena may be used as long as the correspondence is restricted to less than one cycle. The cursor detects the chosen parameter, whose variation is then measured and converted into distance units.

Examples of this approach include digitizing techniques utilizing voltage dividers along the axes of the platen. The dividers, for instance, can be used to divide a dc potential or to provide steps of phase shift in an ac signal.

Such a general approach involves the following difficulty. As the degree of desired accuracy increases (say, from 0.01 inch to 0.001 inch), or, as the size of the platen increases while maintaining a desired accuracy, or both, the resolution of the technique (i.e., the ability to detect or measure smaller and smaller percentages of full scale deviation of the chosen parameter) must increase correspondingly. But beyond a certain point increases in resolution can be quite difficult. An additional aggravating factor is the case where it is desired that substantially the same digitizer circuitry work with both large and small platens with no change in the basic accuracy.

A solution to the problem of increasing resolution is to devise a technique that lends itself to the incorporation of coarse and fine modes of measurement. One such scheme is presented by Dym (U.S. Pat. No. 3,921,165 issued Nov. 18, 1975. His scheme involves the segmenting of the active area of the platen into sections. Successive sections along a dimension are tested until a section is found to contain the cursor. Then a fine measurement is made within that section. There are two disadvantages to the notion of "sectionalizing" the platen. First, additional circuitry must be employed to select the section of the platen to which the measuring phenomenon is to be applied, and to then apply it. Second, there are difficulties connected with attaining linearity at the boundaries of the individual sections. Whereas techniques having a platen comprising a single measurement section along each dimension have such boundary problems only at two extremes for each dimension, a sectionalized platen has two extremes for each section. This greatly increases the difficulty of attaining linear measurement.

A common feature of systems that use coarse and fine measurement involves a "multiplicity ambiguity." That is, the fine measurement provides high resolution within a relatively short interval (one of many into which the platen may be considered to be divided during fine measurement), but is unable to distinguish between the cursor's being in a certain place in one interval and its being in the same relative place in an entirely different interval. The task of coarse measurement then becomes one of identifying the fine interval. There have been a number of systems along these lines.

One such is the technique of Centner et al,. (U.S. Pat. No. 3,735,044 issued May 22, 1973). It involves the use of two slightly different frequencies whose difference is a frequency small in comparison to either of the first two frequencies. Thus, the period of the difference frequency is long compared to either of the other two frequencies. Also, the amplitude of the difference frequency is related to the cursor's position, and may be taken as an approximate (coarse) location. The major disadvantage to this technique is that the coarse measurement circuitry does not readily lend itself to also performing the fine measurement. In the example cited two different instances of a digitizing technique were used; one set of circuitry for coarse and one for fine. This gives rise to more varied circuitry than would be found in a digitizer whose fine measurement technique was an extension in principle of the coarse technique.

As a final example of the approaches to coarse and fine measurements, consider the technique of Cotter (U.S. Pat. No. 3,732,369 issued May 8, 1973). In Cotter's technique the platen contains coarse and fine grids in each dimension. The obvious disadvantage here is the need for extra grids, with the attendant problem of increased difficulty of grid alignment during platen assembly.

Most previous digitizers have not incorporated micro-processors into their hardware architecture. The incorporation of a processor can result in a reduction in the amount of circuitry needed for measurement purposes, as well as in the application of sophisticated error reduction techniques (such as will be disclosed). As an example, consider the effect of cursor motion during coordinate measurement. Unless the digitizer has separate circuitry for both the x and y axes, such that the x and y coordinates are always sampled simultaneously, it may happen that cursor motion causes the x and y values obtained to correspond to two different points. By employing a processor that can correct for cursor motion it is possible to reduce the amount of circuitry by using one common set of circuitry to alternately sample x and y values. Also, the inclusion of a processor allows sophisticated averaging and noise recognition techniques that enhance high accuracy digitizing.

OBJECTS OF THE INVENTION

The primary object of the invention is to provide a high accuracy digitizer that performs absolute measurements incorporating coarse and fine modes each of which uses the same basic technique, so as to achieve a reduction in the necessary amount of circuitry.

Another object of the invention is to provide for ease of changing the size of the platen without substantially altering the remaining digitizer circuitry or changing the accuracy specification.

Another object of the invention is to provide a digitizing technique incorporating coarse and fine measurements without segmenting the grids in the platen nor requiring extra grids in the platen.

Another object of the invention is to provide a digitizing technique whose associated platen incorporates a means of reducing non-linearity at the extremes of the platen while also minimizing the amount of circuitry required to implement such a non-linearity reduction.

Another object of the invention is to provide means for correction of errors caused by cursor motion during coordinate measurement, so that further reductions in the amount of circuitry may be achieved by alternate sampling of the x and y coordinates by a substantially common set of measurement circuitry.

A further object of the invention is to provide a means for internal compensation by the digitizer for lack of perfect orthogonality between the grids in the platen.

These and other objects of the invention will become more readily apparent to those skilled in the art as the description thereof proceeds.

SUMMARY OF THE INVENTION

A coordinate digitizer for determining the location of a freely moveable cursor on a platen is disclosed. The digitizer alternately employs x and y axis shift registers to sweep various symmetrical square waveforms of differing wavelengths across each axis of the platen. The platen comprises a flat surface within which is imbedded two orthogonal grids each of which consists of uniformly spaced individual conductors. The cursor is a capacitive pick-up into which is coupled each separately swept signal in the platen. The cursor signal is amplified, filtered, squared-up and compared to a reference signal. Cursor position is reflected in the length of time required for the swept waves to leave the edge of the active area of the platen and subsequently pass under the cursor. This transit time reveals itself as a time difference between corresponding leading edges of the reference signal and the treated cursor signal. A timer measures this difference, which can then be converted to coordinate data.

Since these are differences between periodic waveforms, as a given difference increases it reaches a maximum and then abruptly passes through zero, and then continues to increase as before. That is, the degree of misalignment (i.e., "phase shift") between two periodic things is itself periodic. This gives rise to a certain degree of uncertainty when the measured difference is either very large or very small; noise and other uncontrollable variables may have affected the measured difference so that it differs from the actual difference by an entire period. This is avoided by detecting the case of either a near maximum or near zero difference and temporarily offsetting the reference signal by a half-wavelength. The difference obtained is then adjusted arithmetically by an amount corresponding to the half-wavelength. Noise will still affect the value of the reading, but will not cause a difference that should be near the maximum to appear as very small, or vice versa.

The x and y axes are swept alternately. Within the activity for each axis there occurs alternate sweeping of that axis by long and short wavelengths. The long wavelength reveals a coarse position which is then resolved into an integral number of "fine" distance units, each of which corresponds to a short wavelength. A fine position is obtained by sweeping with the short wavelength. By itself, the fine measurement determines where in *any* of the possible fine distance units the cursor is positioned, but does not determine *which* such unit.

The time difference measurements described include an element of delay caused by amplification and filtering. The delay through the filter and its associated circuitry is regularly measured in a special measurement cycle. The filter delay is then subtracted from the coarse and fine measurement data to obtain time data that actually represents the cursor's position. The fine position is then combined with the coarse position to produce the actual raw coordinate. These data may be converted to any desired unit of linear measure.

The platen incorporates a configuration involving redundant drive lines at its extremes in each dimension to reduce measurement errors at these extremes. These redundant lines reduce the number of active lines needed in the platen to produce an accurate active measuring area of a given size.

An internal processor for controlling the various aspects of the digitizer's activity also obtains cursor velocity information. The processor corrects the digitized coordinates for the effects of cursor motion that may occur during the alternating measurement of the x and y coordinates. This is done by noticing the velocity in the x direction and adjusting the x coordinate to correspond with the supplied y coordinate. The process also corrects the coordinates for an individually predetermined and yet arbitrary amount of non-perpendicularity between the grids within the platen.

BRIEF DESCRIPTION OF THE DRAWINGS

FIG. 2 is a simplified block diagram of the digitizer of FIG. 1.

FIG. 3 is an illustration of the general physical and electrical configuration of the platen or digitizing surface used in conjunction with the digitizer of FIG. 1.

FIG. 4 is an illustration of the general physical and electrical configuration of the cursor or pickup used in conjunction with the digitizer of FIG. 1.

FIG. 11 is a waveform diagram illustrating the relationship between fine and reference measurements, for either of the x or y dimensions.

FIG. 12 is a waveform diagram illustrating how a reference measurement for either axis is handled when its value exceeds the coarse or fine value that it is associated with.

FIGS. 13 A-C is an illustration of why and how the internal timing reference signal is dynamically adjusted by a half-cycle during the various measurements performed by the digitizer of FIG. 1.

FIG. 14 is an illustration of the method used to combine the coarse and fine values for either of the x or y axes into a single value; the method incorporates adjustments to the coarse value to render it in agreement with the fine value.

FIG. 18 is a more detailed yet still simplified flow chart of the "Basic Point Processor" portion of the mainline programming of FIG. 16B.

FIG. 22 is a diagram depicting the nature of an algorithm to correct for the error induced in the digitized coordinates by non-perpendicularity of the grids in the platen.

FIG. 23 is a diagram illustrating how the non-perpendicularity error angle of FIG. 22 is encoded into the switch register of FIG. 5A.

FIG. 24 is a diagram illustrating the relationship between the actual sequence of measurement and computational activity, and the logical levels of the error reduction computations.

DESCRIPTION OF THE PREFERRED EMBODIMENT

Figure 1:
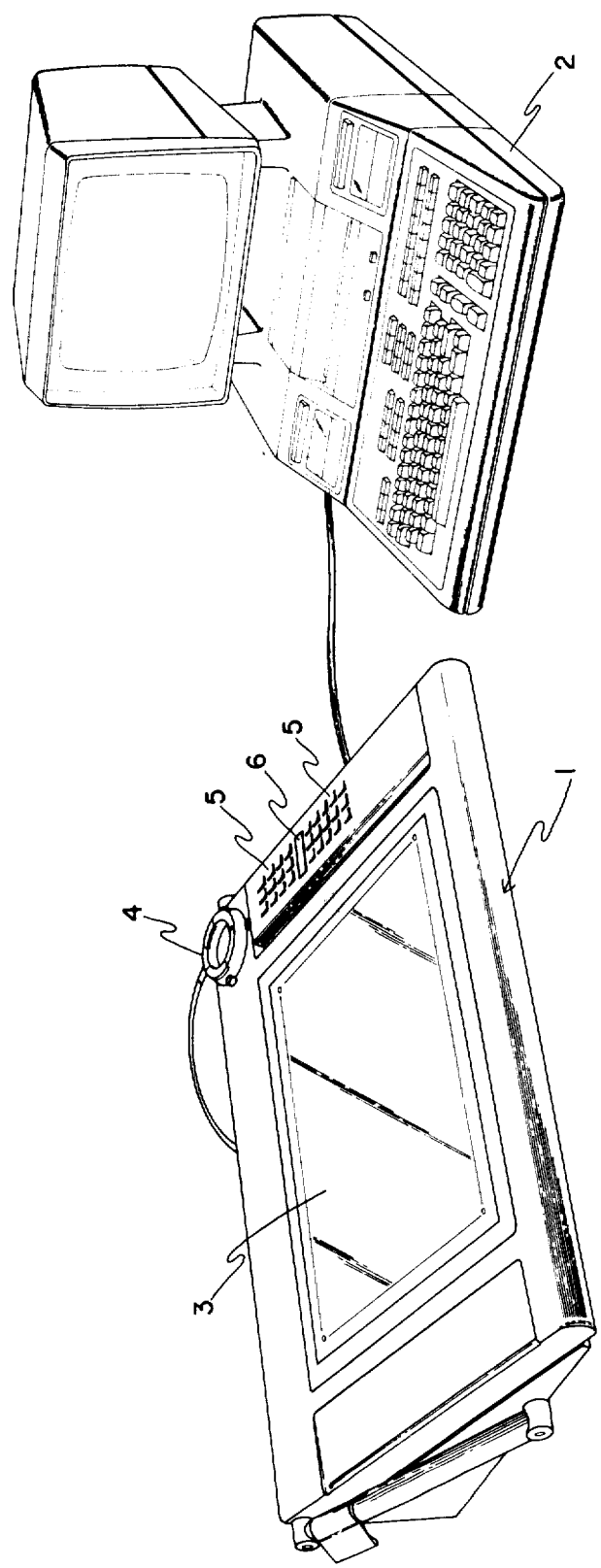
FIG. 1 is a perspective view of a digitizer whose measurement technique incorporates the use of swept square waves and a transparent capacitive pickup; also shown is a desktop computer exemplary of any of a number of devices suitable for controlling the digitizer.

FIG. 1 shows a digitizer 1 incorporating a swept square wave measurement technique connected to a controller 2. Any of a number of different devices could serve as the controller. In general, the controller would be a computer of either the mini or desktop variety, or it could be a programmable calculator. Other controlling devices are possible; with a suitable interface the digitizer can be controlled with a teletype.

The digitizer 1 comprises a digitizing surface or platen 3, a freely movable pickup or cursor 4, a keypad 5 and a multi-character display 6. The general description of the digitizer's use is as follows. The document to be digitized is secured to the platen by tape, weights, or any other suitable manner. With the document resting flat on the platen, the cursor is placed on the document. The cursor has a transparent region containing a reticle, or cross hairs, whose intersection represents the location whose coordinates are to be provided. Digitizing is accomplished by the operator's first activating the controller and then successively positioning the cross hairs over the locations on the document whose coordinates are desired. The controller receives the coordinate data from the digitizer, and manipulates it in whatever manner that has been provided for.

A number of additional points should be made. To begin with, the document itself is not necessary for the digitizer's electrical operation. The digitizer digitizes the location of the cursor cross hairs on the platen, not the position of a point on the document that just happens to be under the cross hairs. Ideally, there is no electrical interaction between the document and the digitizer.

There are two basic modes that the digitizer may operate within. These are Single, wherein the digitizer supplies to the controller the coordinates of a single point, once each time the operator instructs the digitizer to do so, and Continuous, wherein the digitizer repeatedly and automatically supplies coordinates in some uniform or regular way. In the Single mode the operator specifies each point to be digitized by activating a Data switch on the cursor. In the Continuous mode the digitizer supplies a new point either at regular time intervals, or upon the condition that the new point is sufficiently far removed in distance from the previous one. Both the time interval and the distance can be arbitrarily chosen, within a predetermined range, by the operator. The operator initiates and terminates Continuous mode sampling through use of the same Data switch on the cursor. Other controls on the digitizer's front panel specify whether the digitizer is in the Single or Continuous mode.

Another fact of consequence is that the digitizer never transmits coordinates to the controller except as part of a response to a request for coordinates by the controller. Now, internally the digitizer is always determining the coordinates of the cursor. The notions of Single and Continuous sampling involve escapement mechanisms triggered by either the Data switch in the Single mode, or by the Data switch in conjunction with the time or distance criteria in the Continuous mode. The escapement mechanisms isolate and save the coordinates corresponding to the points the operator intended to digitize. The saved coordinate pair is sent to the controller when it is requested. Meanwhile, the internal digitizing process has never ceased.

There is a sample light on the cursor that indicates the transfer of data from the digitizer to the controller. When a point has been engaged by the escapement mechanism (i.e., when the operator has "digitized" a point) the light goes out. The light comes back on when the controller asks for and then subsequently receives the coordinates.

The keypad contains a number of control keys for such purposes as establishing the Single and Continuous modes, as well as digit entry keys. The digit entry keys can serve to annotate points as they are sent to the controller. That is, what is sent to the controller is not simply a pair of numbers, but a sequence of four numbers. One of those numbers can be made to represent any floating-point numerical value the operator desires, through the use of the keypad. In this manner the coordinates sent to the controller may be given numerical "labels" that establish a correspondence between the digitized locations on the document and the coordinates stored in the memory of the controller. Alternatively, the annotation may be used to manually supply an elevation, or z axis, to the digitized points.

The digitizer's display is responsive to a number of digitizer operations, such as annotation of points, and can also be controlled by the controller.

Virtually all of the controls on the digitizer's front panel, and on the cursor, that pertain to actual digitizing can be activated by the controller, as well as by the operator.

The cursor may be replaced with a stylus similar in shape to, and incorporating, a ball point pen.

The digitizer incorporates an electronic beeper whose duration and frequency of tone can be specified by the controller. The digitizer also incorporates a vacuum pump. The vacuum thus obtained is applied through an electrically controlled valve and subsequently through a hose to the cursor. A vacuum port on the underside of the cursor allows the vacuum to cause the cursor to adhere to the platen or document when the electrically controlled valve is open. The valve can be controlled either by the Air switch on the cursor, or by commands from the controller.

Referring to the simplified block diagram of FIG. 2, there now follows a brief description outlining the functions of the major elements of the digitizer. Each topic mentioned will be discussed at greater length in subsequent sections.

Consider measurement in the x dimension. A platen 3 containing uniformly spaced (5 mm) parallel conductors 46, collectively called the x grid, provides a physical embodiment across which a symmetrically varying electro-static field is impressed. The field is generated by the outputs from the x shift register 9, and corresponds to the instantaneous bit pattern in the shift register. The bit pattern is generated by applying a 5 kHz square wave signal 72, named IREF (Internal Reference), to the serial data input of the x shift register as it is shifting. If, for example, the shift rate were 1.8 MHz (as it is during coarse position measurements) the resulting bit pattern in the x shift register would be 180 bits set followed by 180 bits cleared.

A bit pattern in the x shift register causes a corresponding electro-static field having half-wave symmetry to appear at the platen. Since the conductors 46 in the x grid are parallel to the y axis, the electro-static field is uniform in the y direction. The value of the field in the x direction is a function of time and the bit pattern in the x shift register. The regular shifting of the x shift register causes the corresponding electro-static field to change its position on the platen; that is, it moves in the direction defined by the x axis.

The moving electro-static field passes under the cursor, whose essential element is a capacitive pickup 24. The capacitive coupling between the pickup 24 and the wires 46 of the x grid couples a signal to the cursor. The signal is a 5 KHz ac voltage which is subsequently amplified and applied to a 5 KHz filter 7. (The cursor signal is 5 kHz because that is the rate at which the signal originating the bit pattern at the input end of the x shift register is changing. Since the shift rate is a synchronized multiple of that 5 KHz, that is also then the rate at which the electro-static field in the platen varies as it moves past a given point.) The filter 7 removes the staircase nature of the coupled cursor signal and renders it purely sinusoidal. The output of the filter is converted back into a square wave 43, named SIGNAL, by a zero crossing detector 8.

The position along the x axis of the pickup 24 is reflected in the time required for a given leading edge of the electro-static square wave on the platen to traverse the distance from the edge of the platen to the location of the pickup.

Now, the length of the active measuring area of the platen is limited, in each of the x and y dimensions, to a length somewhat less than the distance traversed by a leading edge of the moving electro-static wave when shifted at the coarse shifting frequency of 1.8 MHz, and allowed to displace itself by one wavelength. That is, the maximum length of the platen is such that there will always be less than one complete cycle of the coarse electro-static wave impressed upon the platen. A consequence of this is that *any* leading edge of IREF *might* be used to start a timer, which would then be turned off by the *next* leading edge detected at the pickup. IREF *could* perform this duty since it is the immediate source of the 5 kHz signal that is applied to the very edge of the platen, and that is then subsequently shifted. However, as explained below, a need exists to be able to sometimes offset, by exactly one half-wavelength, the signal that starts a phase counter. A signal 13 that can have this property is φREF (Phase Reference), which can equal either IREF or $\overline{\text{IREF}}$. For the purposes of the above explanation assume φREF=IREF. The need for the case of φREF=$\overline{\text{IREF}}$ is explained later.

A time interval corresponding to the one described above is measured by the phase counter 12 and its controller 11. The phase counter controller 11 is a means of starting and stopping the binary phase counter 12 according to the leading edges of φREF and SIGNAL. A leading edge of φREF starts the counter, which then counts cycles of an 18 MHz clock. The next leading edge of SIGNAL causes the counting to cease. A DATA READY line signals a micro processor 14 that the phase counter has data available.

At this point the binary count in the phase counter represents the sum of two values. These are: (1) the time required for a leading edge of the swept coarse electrostatic square wave to depart the edge of the platen and subsequently pass under the pickup; and (2) a value related to the amount of time the cursor signal is delayed by the amplifier and the filter. Now, since the swept square waves traversing the platen are doing so in a continuous and uninterrupted fashion (at least for the duration of each type of measurement), and since the filter delay is several times as long as the largest measurable time interval, there is no way to identify exactly which leading edges of φREF are to correspond to the various subsequent leading edges of SIGNAL. It doesn't matter; the periodicity of the waveforms removes the need for such correspondence.

However, the existence of the filter delay presents a difficulty that is solved by obtaining an additional measurement, called the x reference measurement. It is a measurement whose value is related to the delay through the filter, and which may be subtracted from the value obtained by the x coarse measurement to produce a usable x coarse component of the ultimate x coordinate.

The x reference measurement does not obtain the actual total filter delay, which is typically on the order of five cycles of the 5 KHz cursor signal. What is measured is the "remainder," or fractional portion of the delay in excess of an integral number when the delay is expressed in terms of cycles of 5 kHz. For example, if the delay through the filter were 1.050 msec, that would correspond to 5.25 cycles of 5 kHz, and the x reference measurement would produce a value representing the quarter-cycle in excess of the five cycles. That value would be the number of cycles of 18 MHz that are contained in 50 μsec.

Electrically, an x reference measurement is made in the following way. With the y shift register cleared, the x shift register is made to parallel load IREF at a frequency (the coarse shift rate—1.8 MHz) that is both an integral multiple of IREF and is synchronous with it. (This is so that the edges of IREF are not "chopped off" as they appear at the outputs of the shifter register.) The effect of this is to simultaneously and uniformly apply IREF to each line 46 in the x grid. Thus, the cursor sees the same 5 kHz signal no matter where it is positioned on the platen. The phase counter will now measure the "remainder" of the delay through the filter, as well as including in that measurement any other delays distributed through the system, *except* delays that are a function of cursor position during coarse or fine measurement.

Once the x reference value has been obtained it can be arithmetically combined with the measured x coarse value to remove the effect of filter delay from that value. The necessary arithmetic is done by a processor rather than be dedicated circuitry.

The determination of the final value of the x coordinate requires an additional type of measurement, viz., x fine. To perform the x fine measurement the shift rate of the x shift register is changed from 1.8 MHz to 40 KHz. The use of IREF as a 5 kHz source of the serially shifted waveform/bit pattern remains unchanged. The slower shift rate produces a shorter bit pattern to represent the 5 KHz IREF. In particular, the bit pattern will be four bits set followed by four bits cleared.

The shorter bit pattern produces correspondingly shorter moving electro-static square waves on the platen. Whereas in the case of coarse measurement one wavelength exceeded the maximum length of the platen, the wavelength of a fine wave is considerably shorter than the platen. That is, there will be several cycles of fine waves on the platen, and any of several cursor positions (i.e., at intervals of one fine wavelength) will produce the same result in the phase counter.

This does not cause a problem, and does result in an overall increase in the resolution of the x coordinate. The multiplicity is resolved as follows. The coarse measurement can be examined to determine which of the fine cycles contains the cursor location. Then the coarse measurement can be converted to an equivalent integral number of fine cycles, which is then augmented by the fine measurement.

The increase in resolution comes about in the following way. The phase counter cannot tell the difference between coarse and fine measurement. SIGNAL and φREF are 5 KHz in either case, and the maximum difference between their leading edges is 200 μsec. In each case the phase counter measures the interval by counting cycles of 18 MHz. Now, there are 3600 cycles of 18 MHz in 200 μsec. Thus, for either coarse or fine measurement a count of, say, 1800 in the phase counter represents a distance amounting to a half-wavelength of the swept electro-static wave. But in the case of coarse that wavelength is 1.8 meters (180 bits set+180 bits cleared=360 shifts×5 mm per shift=1.8 M) while for fine it is only 40 millimeters. Accordingly, the distance represented by one "fine count" is 1/45 the distance represented by one "coarse count."

Of course, the measured x fine value must be arithmetically adjusted in accordance with the value of the x reference measurement, just as in the case of the x coarse measurement. Once that is done the coarse and fine components can be combined to produce an actual x coordinate.

The procedure outlined for x dimension measurement is analogous to the one used for measurement in the y dimension. Here is how the two activities are coordinated. The series of x measurements is performed first. To do this, both the x and y shift registers are first cleared. Then the x shift register is allowed to begin shifting at the coarse rate. The y shift register remains cleared. This is important, because it prevents any y-direction cursor motion from crossing an electro-static gradient presented by the y shift register, and thereby coupling an unwanted component into the cursor signal. After the x coarse measurement is taken, the x reference measurement is made. That in turn is followed by x fine, which is performed by changing the shift frequency of the x shift register.

Prior to beginning the y dimension measurements, both shift registers are again cleared. Now the x shift register remains cleared while the y shift register begins shifting at the fine rate. After the y fine measurement there follow y reference and y coarse in turn. Then the entire coordinate measurement sequence starts over.

The x coarse, x reference and x fine, etc., measurement procedure outlined above does not employ simply single instances of phase counter activity to obtain each of the successive values. Instead, they are each averaged from successive measurements allowed to accumulate in the phase counter. Also, due to the cyclic nature of the quantity represented by the count in the phase counter, a situation involving near coincidence of the leading edges of $\phi$REF and SIGNAL may result in either a count near zero or one near 3600. Various sources of unavoidable noise, drift in the threshold of the zero crossing detector, as well as cursor motion during measurement, can cause this 3600-count ambiguity in very small or very large counts.

The need to accumulate consecutive individual measurements for later averaging, coupled with the phenomenon of the 3600-count ambiguity (which can upset the arithmetic of the averaging) gives rise to a problem. The solution is to eliminate the 3600-count ambiguity whenever its presence is possible, by temporarily shifting $\phi$REF by a half-cycle of half-wavelength, and subsequently adjusting the measured value by an amount equal to half-wavelength of $\phi$REF (1800 counts). The effects of noise will still be present, but now they can be subjected to proper averaging.

$\phi$REF is offset by a half-cycle simply by using its complement in its place. The decision to do this is made by the processor 14 that directs all internal digitizer activity. Generally, the ambiguous measurement is discarded, $\phi$REF offset, and a new measurement taken. The processor then adjusts the value obtained before any other arithmetic use is made of that value.

As mentioned above, the digitizer incorporates a processor 14 that is responsible for directing all internal digitizer activity. Associated with the processor is both Read/Write memory 48 (R/W) and Read-Only-Memory 49 (ROM). The primary means by which the processor exercises its control is through the mode control latches 15. Through means described in detail in subsequent sections, the processor continuously manages the values of these latches. The latches, in turn, affect the interconnections between the various circuit elements described in reference to FIG. 2 thus far.

Figure 15:
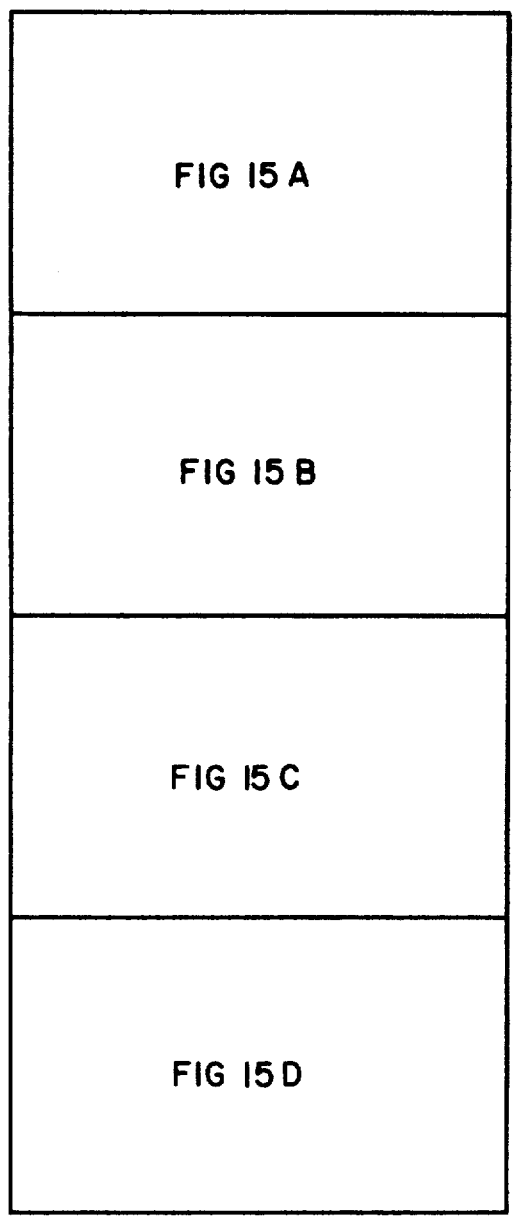
FIGS. 15 A-D is a diagram illustrating the basic sequence of operations used by the digitizer to obtain a pair of coordinates corresponding to the location of the cursor on the platen.
Figure 15C:
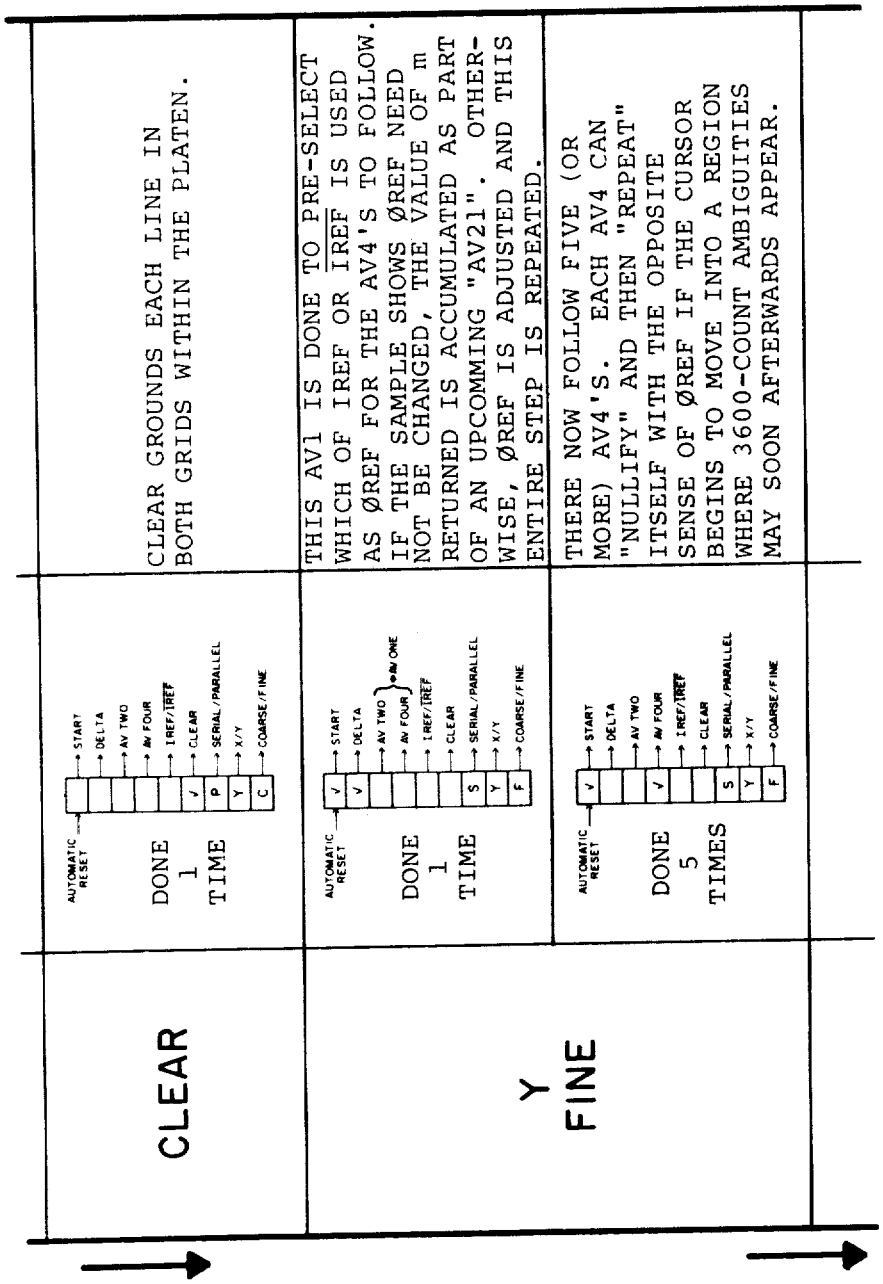

A detailed exposition of the collective use to which the latches are put is provided in the section concerning FIG. 15. At this point, however, it is appropriate to briefly explain each of the individual latches.

The START latch is used to inform the phase counter controller 11 that a new measurement is to begin. It also causes the phase counter 12 and its controller to be cleared. The START latch is automatically reset after a suitable period of time.

The DELTA latch is used to trigger a delay one shot that withholds the start of phase counter activity until various circuit conditions have had time to stabilize. DELTA ensures that the bit pattern in the active shift register has achieved uniformity, and that the filter has had time to settle after seeing a change in the cursor signal. DELTA is issued at the start of each different type of measurement.

The AV TWO latch tells the phase counter controller 11 to accumulate two consecutive individual measurements into the phase counter 12. AV TWO is not utilized in the present embodiment.

The AV FOUR latch tells the phase counter controller 11 to accumulate four consecutive individual measurements into the phase counter 12. AV FOUR is used in obtaining values that are later averaged by the processor.

The absence of both AV TWO and AV FOUR at the time START is issued implies an AV ONE to the phase counter controller 11. An AV ONE tells the phase counter controller to perform a single individual phase counter measurement.

The IREF/$\overline{\text{IREF}}$ latch controls the half-phase offset of $\phi$REF, and is dynamically adjusted by the processor 14 at the start of individual AV ONE's or AV FOUR's, as required.

The X/Y latch designates which of the x shift register 9 or y shift register 10 will be the active shift register.

The CLEAR latch clears both the x and y shift registers.

The SERIAL/PARALLEL latch controls whether the shift register selected by the X/Y latch will shift IREF in as serial data for either of coarse or fine measurement, or parallel load IREF for a reference measurement.

The COARSE/FINE latch specifies the shift rate of the active shift register identified by the X/Y latch.

The processor controls the values of these latches during the coordinate measurement sequence according to programmed algorithms encoded in the ROM 49.

The physical and electrical nature of the platen 3 may be understood with reference to FIG. 3. As shown there the platen consists of two pieces of (float) glass 51 and 52 having printed circuit traces upon them. Glass is shown as exemplary, but other materials could be used. Glass is preferred in the present embodiment because it allows back-lighting of transparent documents, as well as rear projection of images onto the platen. The upper side of the upper piece of glass 51 is frosted to diffuse illumination for back-lighting purposes, and to act as a screen for rear projection. It is also the actual digitizing surface.

The upper piece of glass 51 has the y grid 17 on its underside. The lower piece of glass 52 has the x grid 18 on its upper side. The edges of each piece of glass 51 and 52 are ground to render the pieces rectangular. The traces 17 of the y grid are parallel to the long, or "length", dimension of the upper piece of glass 51. The traces 18 of the x grid are parallel to the short, or "width", dimension of the lower piece of glass 52. Ribbon connectors 20 are soldered to the traces along one end of the x grid and along one end of the y grid. Finally, the two pieces are laminated together with polyvinyl butyral resin to become a flat piece of laminated safety glass containing orthogonal x and y grids. Great care is taken during lamination to ensure proper registration of the glass piece so that there will be the least possible error in the perpendicularity of the x and y grids.

Also shown in FIG. 3 are the locations of the four sets of redundant lines 19. The purpose and function of these lines is discussed in detail in a subsequent section; briefly, they reduce the non-linearity of measurements made at the edges of the usable area of the platen.

The usable area is identified by and contained within a rectangular line 53 etched into the top of the upper piece of glass 51. Digitizing is restricted to points on or within the region 16 circumscribed by the boundary 53.

Aside from the four sets of redundant lines 19, all of the conductors in the platen are separate and insulated from each other, and connected to the shift registers at only one end; the other end of each such conductor is unterminated. The x and y grids are separated and insulated from each other by the resin that laminates the glass; lines within a grid are separated and insulated by their horizontal spacing. Non-redundant lines within a grid are regularly and uniformly spaced 5 mm center to center. In the present example all traces are approximately 0.015 inches in width.

The physical and electrical nature of the cursor 4 may be understood with reference to FIG. 4. As shown in the figure, the electrical nature of the cursor is that of a shielded plate 24 of a capacitor exposed to the conductors in the platen through a circular aperture 23 in the underside of the shield 54. The aperture allows capacitive coupling between the actual pickup 24 and conductors of the x and y grids. The diameter of the aperture is approximately equal to a half-wavelength of the smallest (i.e., the fine) swept wavelength the cursor is exposed to. This is an optimum value, since smaller diameters would reduce the amplitude of the signal coupled into the pickup, while larger diameters (up to one wavelength) would also reduce the signal due to self-cancellation of the out-of-phase portions of the coupled signal. The circular nature of the aperture provides a degree of preliminary sinusoidal filtering of the signal coupled into the pickup 24. The fully shielded pickup provides not only a well defined aperture, but protection from the effects of variable stray capacitances; e.g., to the hand of the operator.

Physically, the shielded pickup is formed with transparent conductive coatings of indium oxide on pieces of glass that are subsequently laminated together. Both the shield 54 and the pickup 24 are conductors formed by indium oxide coatings on the pieces of glass.

Also shown in FIG. 4 are the locations of the data switch 22 and sample indicator 21.

Vacuum generated in the mainframe of the digitizer is conveyed to the cursor through a hollow cable. The vacuum is available at a narrow circular opening in the underside of the cursor. The opening surrounds the glass reticle.

Figure 5A:
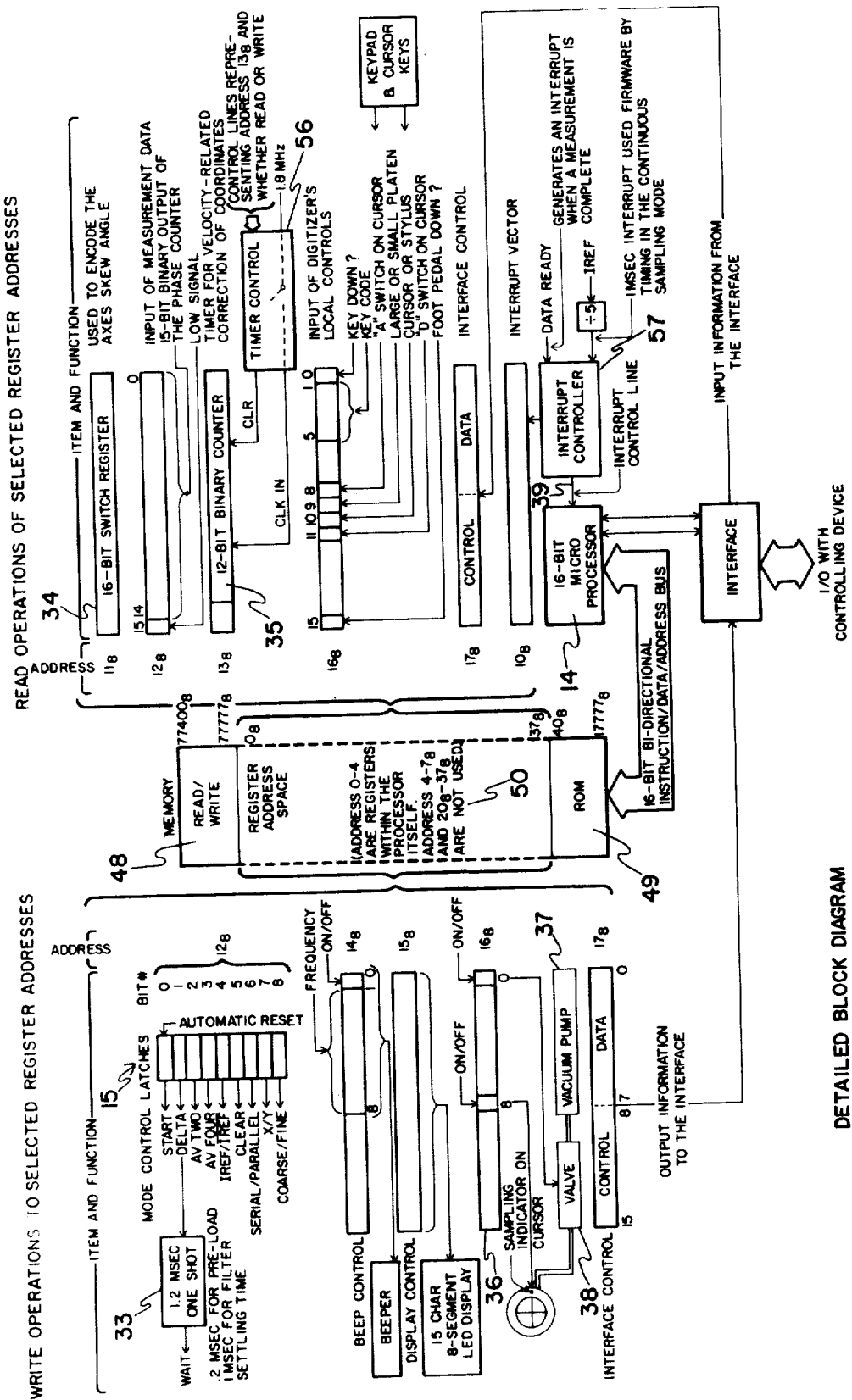
FIGS. 5 A-B is a detailed block diagram of the digitizer of FIG. 1.
Figure 5B:
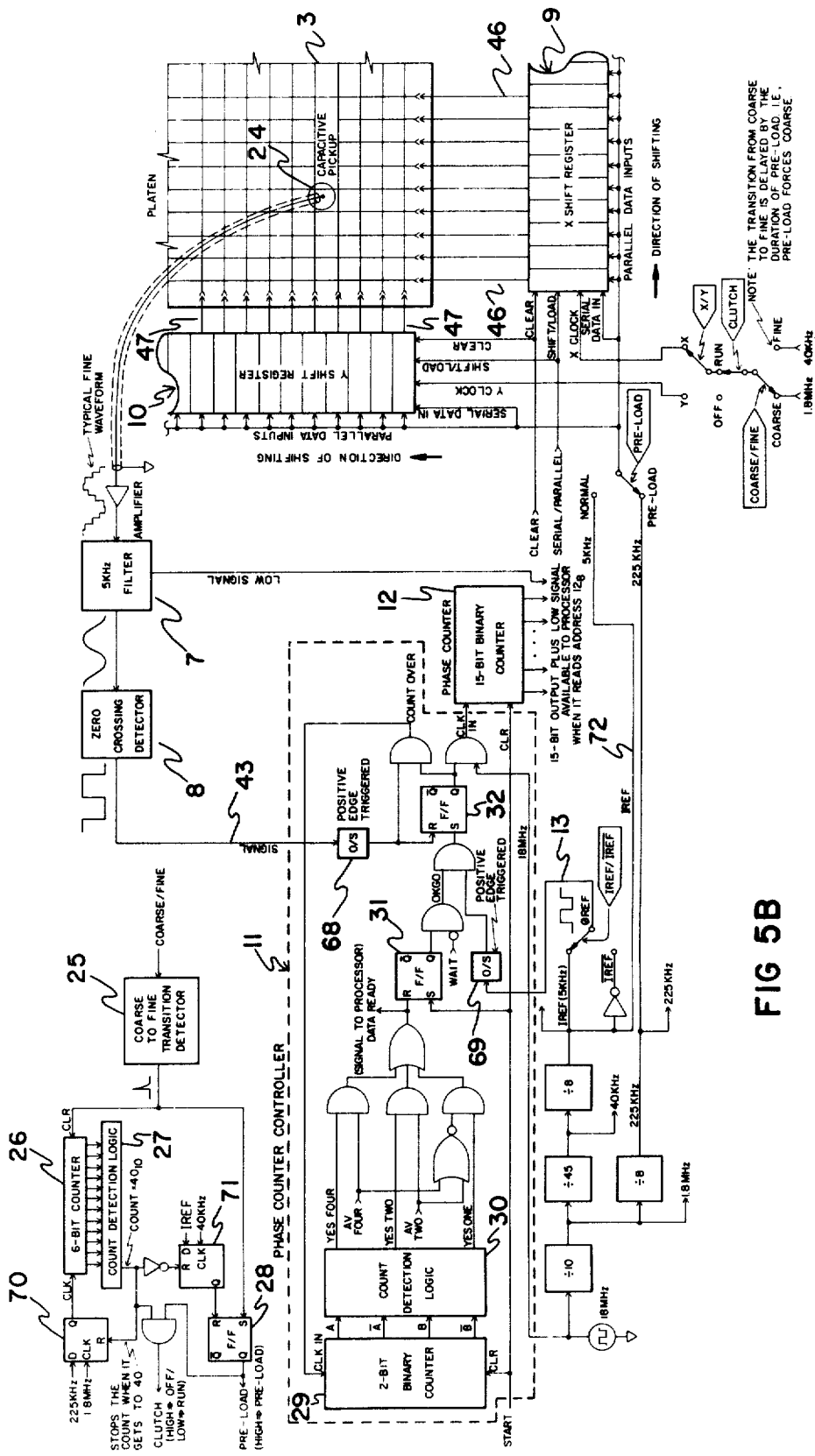

A more complete understanding of the operation of the digitizer may be had with reference to the detailed block diagram of FIGS. 5A and 5B. Recalling for a moment the simplified block diagram of FIG. 2, the latter is essentially a subset of FIGS. 5A and 5B. What was said relating to FIG. 2 is applicable to that part of FIG. 5B that is the same as FIG. 2, and will not be repeated.

As previously mentioned, the digitizer contains a processor that directs the internal operation of the digitizer's measurement appartus; it also performs various error reduction procedures. Now, with respect to both of these functions, no particular processor or type of processor need be used. In particular, the processor need not be of the 16-bit parallel variety, although such a processor is of great utility in the internal operation of the present digitizer. In a theoretical sense, and in connection with the task of controlling the internal measurement operation of the digitizer, one could conceive of the digitizer as having no processor at all, or at least of not using a processor for that purpose. In such an embodiment a state machine or other collection of logic circuitry would implement the necessary interaction between the clocks, x and y shift registers, platen, pickup, amplifiers, filter, zero crossing detector, and the phase counter. The basis digitizing technique resides in such interaction, not in programming executed by a processor.

However, with respect to the function of implementing error reduction procedures of the type to be disclosed, a processor of some sort is all but absolutely necessary. These procedures require a fair amount of number crunching and logic to implement.

What has been said is that the basic digitizing technique does not in principle require the use of a processor. But, certain error reduction procedures that are useful adjuncts to the basic digitizing technique do, as a practical matter, require the use of a processor. Hence, the embodiment disclosed involves the use of a processor to its best advantage for both the functions of internal digitizer control and error reduction.

A fairly thorough description of the attributes of the actual processor whose use is described in this embodiment may be found in co-pending application Ser. No. 837,771, filed Sept. 29, 1977. The application is in the name of Jack M. Walden et al., assigned to the Hewlett Packard Company, and is titled "Programmable Calculator." Of particular interest are the various figures and their associated text among FIGS. 44 through 127 that describe an entity called the "BPC". The BPC is the processor used in the present digitizer.

Referring now to FIG. 5A, a 16-bit micro processor 14 operates in conjunction with a memory that is divided into a Read/Write (R/W) address space 48, a register address space 50, and a Read-Only Memory (ROM) address space 49. Of particular interest is the nature of the register address space 50. It exists between addresses 0 and $37_8$, inclusive.

What is special about the register address space is that the processor automatically generates an inhibiting signal that prevents all of R/W or ROM from responding to memory cycles directed to those addresses; some element of that "bulk" memory would otherwise try to respond to addresses within that range. Such prevention allows agencies other than the bulk memory to selectively respond as memory for certain addresses within the range of the register address space. For instance, the processor itself contains four addressable registers that respond as memory under the aegis of this scheme.

To provide a means for the rest of the digitizer and the processor to communicate with each other, the digitizer incorporates hardware that responds as memory to selected addresses within the register address space. Under this scheme the processor performs an input operation when it reads one of those "memory locations," and performs an output operation when it writes to one of those "memory locations." The processor controls internal digitizer operation in part by inputting data from the phase counter, as well as status information concerning the digitizer's controls, such as from the keypad and the cursor. It further controls the digitizer by outputting information that sets up the mode control latches, as well as outputting other information for other purposes.

The various input operations of interest are briefly summarized below:

A read-from-memory operation directed to address $12_8$ obtains fifteen bits of phase counter data from the phase counter 12, and one bit of low signal (or not) information from the filter 7.

A read-from-memory operation directed to address $16_8$ obtains status information concerning the digitizer's local controls, such as the keys on the cursor and on the keypad. This information is encoded as shown in FIG. 5A.

A read-from-memory operation directed to address $13_8$ obtains data from a 12-bit binary counter 35. The counter runs at a 1.8 MHz rate and is employed as a hardware timer in conjunction with cursor velocity measurements. This is part of the mechanism for the error reduction procedure that corrects coordinates for the effects of cursor motion.

A special mechanism is used to control the counter 35. A timer control circuit 56 detects a write operation to address $13_8$ (the timer) and interprets this as a command to clear and stop the counter. It does this by issuing a CLR to the counter and disconnecting its CLK IN line from the 1.8 MHz clock. The next read operation to address $13_8$ restarts the counter. The timer control circuit does this simply by reconnecting the CLK IN line of the counter to the 1.8 MHz clock on the next positive edge of the clock. The data obtained by this read is ignored. The *next* read, however, will stop the counter so that its count may be transferred as data to the processor. The counter does not restart. Subsequent reads from $13_8$ will obtain the same value, until the counter is cleared and then restarted.

A read-from-memory operation directed to address $11_8$ obtains an encoded value of the axes skew angle from the 16-bit switch register 34. The skew angle is the difference between the actual angle formed by the x and y grids and a true right angle (90°). The skew angle represents the degree of non-perpendicularity between the electrical axes of the digitizer's platen. The processor uses the skew angle (whose value is determined solely by the properties of the platen and is subsequently encoded into the switch register upon digitizer assembly) as input data to an error reduction procedure that corrects the coordinates for the non-perpendicularity of the axes.

A read-from-memory operation directed to address $10_8$ is part of a mechanism used by the processor itself to determine the conditions surrounding an interrupt to the processor. When an interrupt occurs the processor will read the contents of location $10_8$ and branch to a location based on the value read. An interrupt control circuit 57 arranges that the various different conditions causing an interrupt are each simultaneously reflected by differing values of certain bits in location $10_8$. In this way the processor automatically branches to a subroutine that corresponds to the nature of the interrupt. An interrupt control line 39 informs the processor that an interrupt is required.

There are two general conditions that cause interrupts. The first of these is the accumulation of a complete measurement in the phase counter 12. The phase counter controller signals this event with DATA READY.

The other interrupt is basically a time signal. It occurs once every millisecond, and is used by the routines that control Continuous mode sampling to monitor how long it has been since the "last point" was "digitized" (i.e., in terms of what the operator thinks is going on).

In the event that both interrupts occur simultaneously, the one millisecond interrupt is serviced first, followed immediately by service for the DATA READY. No interrupt is lost.

A read-from-memory operation directed to address $17_8$ reads a byte of data sent to the digitizer from its controlling device.

The various output operations of interest are briefly summarized below:

A write-to-memory operation directed to address $12_8$ establishes the values of the mode control latches 15. The particular sequence of values sent to the latches is explained in detail in a subsequent section. At present it is sufficient to say that the various latch values appear to the processor as individual bits in the word to be written to location $12_8$.

A write-to-memory operation directed to address $13_8$ stops and clears the velocity timer 35, as previously explained.

A write-to-memory operation directed to address $14_8$ controls whether the beeper is on or off, and if on, at what frequency it operates.

A write-to-memory operation directed to address $15_8$ controls the contents of the digitizer's display.

A write-to-memory operation directed to address $16_8$ controls the illumination of the sample indicator 21 on the cursor, and also controls the application of vacuum to the cursor.

A write-to-memory operation directed to address $17_8$ sends a byte of data to the device controlling the digitizer.

Recalling the function and purpose of the phase counter controller 11 of FIG. 2, this circuitry is shown in expanded form in FIG. 5B. Referring now to FIG. 5B, the phase counter controller incorporates a flip-flop 32 to control whether or not the phase counter 12 actually counts (at the 18 MHz rate). When the flip-flop 32 is set counting may proceed. If conditions are met for taking a measurement, or accumulating an additional measurement, the signal OKGO will be true and the next rising edge of $\phi$REF will then trigger a one shot 69, which sets flip-flop 32 and starts the phase counter. The next rising edge of SIGNAL 43 (the output of the zero crossing detector) will trigger a one shot 68 which resets flip-flop 32 and halts the phase counter.

The basic sequence of events just described is used as part of an AV ONE, AV TWO or AV FOUR related measurement. The mode control latches will have previously specified which type of operation is to be performed. What is needed is circuitry to implement the specified number of accumulations to the phase counter. This is achieved as follows.

Each time flip-flop 32 terminates either, (i) an ongoing new count or (ii) an accumulation to an old count in the phase counter, the signal COUNT OVER increments a binary counter 29 that keeps track of the number of count intervals thus far accumulated. When a count detection circuit 30 produces an output that matches either AV TWO or AV FOUR, or matches their "NOR" (which specifies an AV ONE), the signal DATA READY is generated. This signals the processor 14 that the desired number of time interval measurements have been accumulated in the phase counter 12.

DATA READY also resets a flip-flop 31, which ensures that OKGO becomes false. Without OKGO $\phi$REF cannot restart the phase counter. The count in the phase counter remains unchanged until the processor sets the mode control latch called START. START appears at the beginning of each AV ONE, AV TWO or AV FOUR related measurement. What START does is clear the 2-bit binary counter 29 that registers the number of counts thus far accumulated, clear the phase counter, and set the flip-flop 31. Setting flip-flop 31 generates OKGO, provided WAIT is false. Assuming WAIT to be false, the next φREF will start the next instance of the entire phase counter sequence described thus far. The START mode control latch is automatically reset by the hardware a short time after it is set.

WAIT is the output of a 1.2 msec one shot 33 (see FIG. 5A) that is triggered by the mode control latch called DELTA. DELTA is issued whenever the filter may need settling time. That occurs at the beginning of each major type of measurement such as x coarse, x reference, etc. What WAIT does is hold OKGO false until the settling time is over. Once OKGO is again true (i.e., after WAIT goes false) the next φREF will initiate the measurement.

Operating in conjunction with the DELTA/WAIT/OKGO mechanism just described is a collection of circuitry that generates a signal called PRE-LOAD (see FIG. 5B). Its function is as follows. To begin an x fine or y fine measurement a new bit pattern must propagate its way down the active shift register. The same is true of coarse measurements also, but the coarse shift rate of 1.8 MHz is sufficiently rapid that no appreciable delay is seen in shift register set-up. However, the normal fine shift rate is only 40 kHz. This means that there can be an appreciable amount of time required to get the proper four-bits-set/four-bits-cleared bit pattern propagated all the way down to the end of the active shift register, especially if a large platen (with its correspondingly long shift register) is in use. To minimize the time required to shift in the fine bit pattern, and thereby keep the coordinate sampling rate at its maximum, the following procedure is employed.

At the beginning of a fine measurement the normal fine shift rate of 40 kHz is temporarily replaced with 1.8 MHz. In order to generate the proper bit pattern of four-bits-set/four-bits-cleared, the serial data input is simultaneously situated from 5 kHz to 225 kHz. This condition is maintained until the longest permitted shift register would be filled with the newly propagated bit pattern. It has been determined that a length equal to forty fine wavelengths will be the longest active dimension of any platen. Since each cycle of the 225 kHz now corresponds to a fine wavelength of four-bits-set/four-bits-cleared, it is sufficient to maintain the pre-load condition for forty cycles of the 225 kHz.

The above described pre-load technique is implemented as follows. A coarse-to-fine transition detection circuit 25 detects the onset of a fine measurement. Its output is used to reset a 6-bit binary counter 26 and set a flip-flop 28. While flip-flop 28 is set it generates PRE-LOAD. PRE-LOAD prevents, for its duration, the change in shift rate from 1.8 MHz (as it always is unless already doing a fine measurement) to 40 kHz. This amounts to a delay in instituting the 40 kHz shift frequency until the pre-load cycle is over. PRE-LOAD also switches the serial data input of the active shift register from 5 kHz to 225 kHz.

PRE-LOAD is true until the 6-bit binary counter 26 counts forty cycles of the 225 kHz. A D-type latch 70 ensures that the cycles of the 225 kHz pre-load data frequency are counted in synchronization with the 1.8 MHz pre-load shift frequency. A count detection circuit 27 detects the count of forty and eventually makes PRE-LOAD false by allowing the resetting of flip-flop 28 via the D-type latch 71. What the latch 71 does is this. First, it prevents the reset of flip-flop 28 until the count in the counter 26 has reached forty. Second, it delays the reset of flip-flop 28 until the normal shift frequency and the normal fine data frequency (which is IREF) are synchronized. Furthermore, this synchronization is of the same type that occurred between the 1.8 MHz and the 225 kHz. By performing such synchronization the change from PRE-LOAD to NORMAL will not disturb the four-bits-set/four-bits-cleared sequence being shifted into the shift register. To do so would defeat the very purpose of the pre-load operation!

During the interval between when the count in counter 26 reaches forty and when PRE-LOAD goes false the signal CLUTCH is true. What CLUTCH does is disconnect the active shift register from the 1.8 MHz pre-load shift frequency. This preserves the pre-loaded bit pattern in the active shift register until PRE-LOAD goes false and normal 40 kHz shifting is resumed.

Normal fine shift operation resumes as soon as PRE-LOAD goes false. Approximately 178 μsec are required for the counter 26 to count to forty. For the sake of extra margin, PRE-LOAD is assumed to last approximately 200 μsec.

Note that DELTA always accompanies a pre-load condition. Now consider the 1.2 msec period (WAIT) of the one shot 33 triggered by DELTA. The first 200 μsec of that 1.2 msec are to allow time for the pre-load cycle just described to occur. The remaining one millisecond is filter settling time for the new 5 kHz fine signal being coupled into the cursor.

The operational aspects of the phase counter control circuitry 11, and of the pre-load circuitry described above, could be obtained through a number of different methods. They could, for instance, be obtained through the use of a state machine. Any scheme that preserves the attributes, as described, of the following signals would function in the place of the example circuits shown in FIGS. 5A and 5B. The important signals are: START, AV TWO, AV FOUR, AV ONE (implied by the absence of both AV TWO and AV FOUR), WAIT, IREF, φREF, SIGNAL, DATA READY, CLUTCH, and PRE-LOAD.

Figure 6:
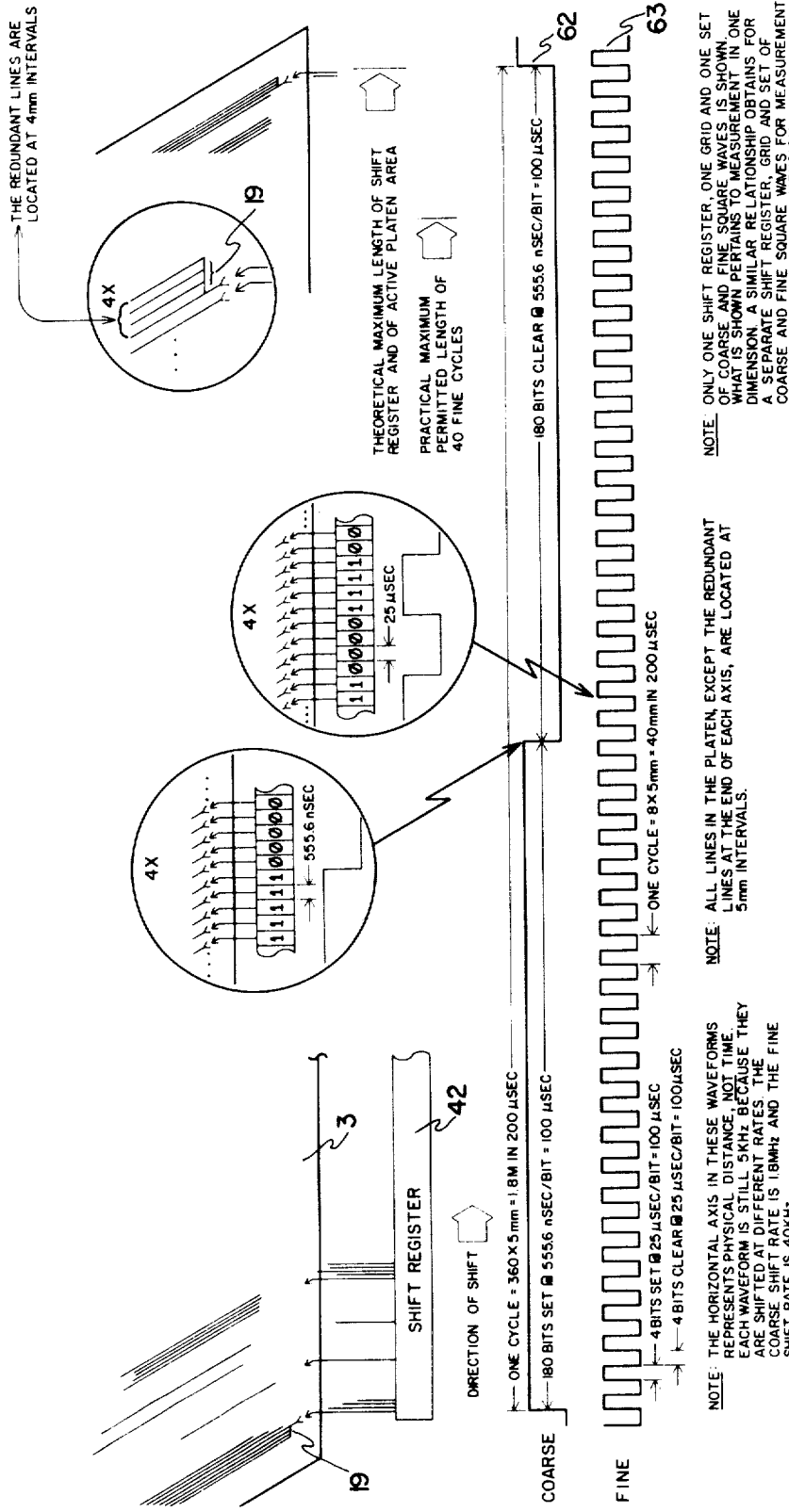
FIG. 6 is an illustration of the basic relationships between the shift registers, the swept coarse and fine square waves, and the grids within the platen.

The relationship between the active shift register, the platen, and the coarse and fine swept electro-static square waves may be better understood with reference to FIG. 6. FIG. 6 shows that the outputs of a shift register 42 are applied to the conductors of a grid within the platen 3. Each active (i.e., non-redundant) line within the grid is 5 mm from its adjacent lines. There must be one shift register cell for each active line in the platen.

The generation of a coarse measurement wave 62 is reflected in FIG. 6. One cycle of the 5 kHz IREF has a period of 200 μsec. In that time occur 360 cycles of the coarse shift frequency of 1.8 MHz. Hence, there are 360 shifts of the shift register 42 during each cycle of IREF. Since IREF is a symmetrical square wave, 180 of those shifts will occur with IREF true, and 180 shifts will occur with IREF false. This generates a coarse bit pattern of 180-bits-set/180-bits-cleared. At 5 mm per line in the grid this generates a moving (coarse) electro-static wave in the platen with a wavelength of 1.8 meters.

The generation of a fine measurement wave 63 is also reflected in FIG. 6. During the 200 μsec period of IREF there occur eight cycles of the fine shift frequency of 40 kHz. This results in a shift register bit pattern of four-bits-set/four-bits-cleared. In a manner analogous to the case for coarse, this results in a consecutive series of moving fine cycles of an electro-static wave having a wavelength of 40 mm. Note that the fine wavelength is 1/45 the coarse wavelength.

FIG. 6 also shows how the redundant lines 19 are appended to the last active line at each end of the electrical axes of the platen.

Figure 7:
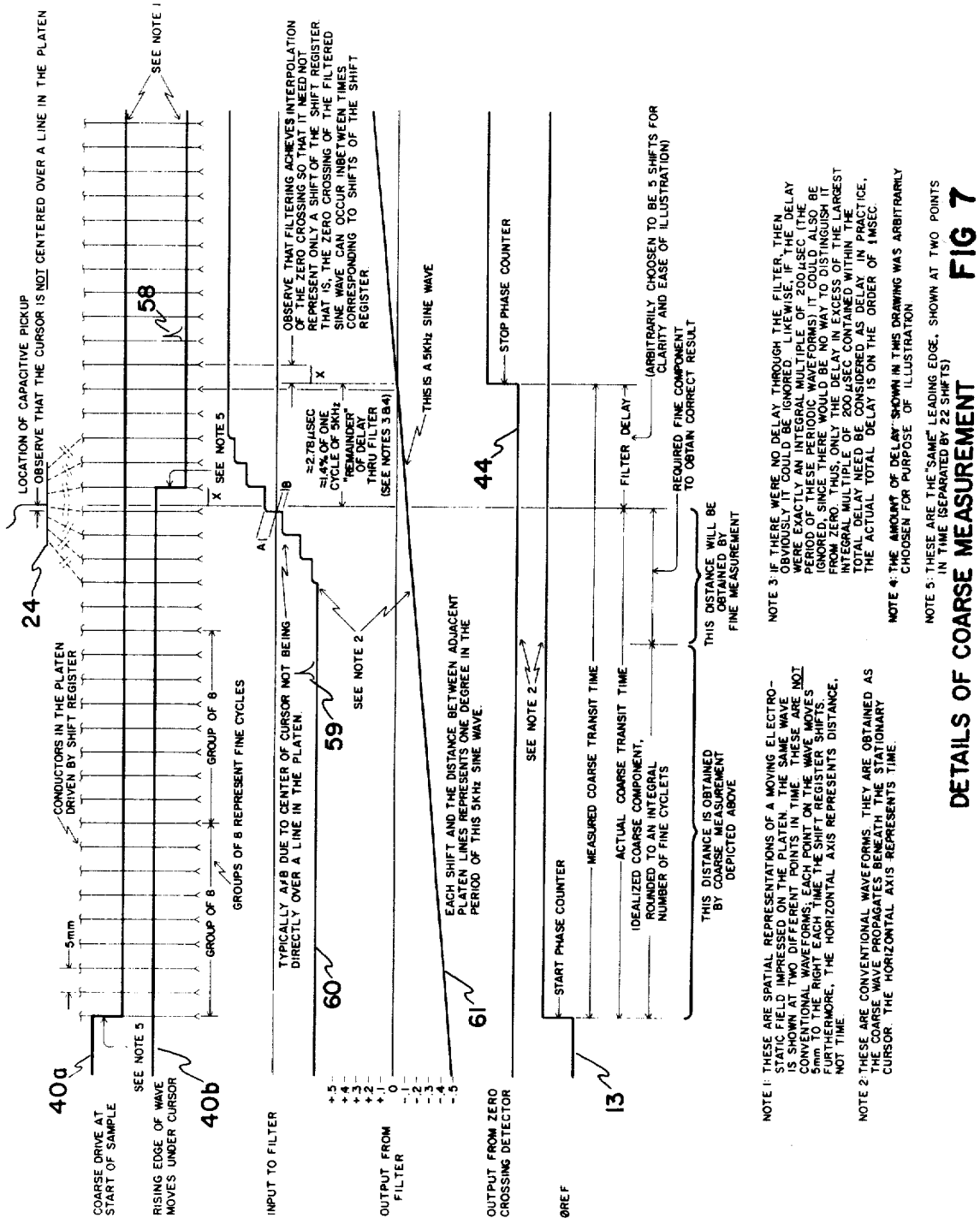
FIG. 7 is a waveform diagram depicting coarse position measurement along either of the x or y axes with a swept square wave whose wavelength is 1.8 meters.

The details of obtaining a coarse measurement may be better understood with reference to FIG. 7. There is shown a coarse measurement wave in two different positions as it is swept across the platen. The wave 40a is shown as it exists at the time its leading edge begins to sweep across the active area. The wave 40b is the same wave as it exists twenty-two shifts later. It must be understood that waves 40a and 40b are *not* conventional waveforms such as can be displayed on an oscilloscope. Waves 40a and 40b are spatial representations of a regularly shifting electro-static field impressed upon the platen. Each shift of the shift register moves the entire wave 5 mm to the right (as viewed in the figure). Furthermore, the horizontal axis of waves 40a and 40b are most usefully understood as representing distance, rather than as representing time.

A short explanation of the proper way to interpret the material of FIG. 7 will alleviate possible confusion when following chains of cause and effect that link IREF to ϕREF, and link IREF, through the active shift register, through the position of the cursor, and finally through the filter and zero crossing detector, to SIGNAL.

To begin with, these spatial representations of the moving electrostatic wave are "snapshots" of a moving thing having length, taken at two different points in time. The motion of the wave 40a can only be shown by indicating its successive positions at successive instances in time. These instances in time might well be arbitrary; 40b is a useful such instance.

As the wave 40 moves to the right the transition from low to high passes under the cursor. This causes a conventional waveform (i.e., its horizontal axis is time) to appear at the cursor, and other conventional waveforms to subsequently appear in adjacent or subsequent circuits. If drawn against the same time axis, these conventional waveforms may be compared with each other over their entire length.

However, a spatial representation such as 40b may be compared with its associated conventional waveforms only at one point in time, and then only at the location of the cursor. This follows from the fact that at a given point in time some location or feature of the moving electro-static wave is passing beneath the cursor and causing some particular circuit activity, as indicated by the instantaneous values of the various waveforms. In the next and succeeding instants the moving electro-static wave propagates to the right, so that the chosen location or feature on it no longer is "above" the phenomena it caused in the waveforms.

For example, consider an imaginary glitch 58 on wave 40b, specially added for illustrating the point of the above explanation. As glitch 58 moves under the cursor it produces a corresponding glitch 59 on the waveform labeled "INPUT TO FILTER." At that point in time the two glitches 58 and 59 would be aligned in time, and would be at the cursor. They would appear "over each other" in the drawing if such a snapshot of wave 40b were a useful one and were shown in the figure. But wave 40b can represent only one snapshot, and since it is more useful to depict one involving the arrival of the leading edge under the cursor, glitches 58 and 59 appear displaced in opposite directions from the line drawn beneath the center of the cursor. As drawn, the further to the right something is on wave 40b, the earlier it will have passed under the cursor and the further to the left on the conventional waveforms will be the location of the corresponding event.

Returning now to the main substance of FIG. 7, what is shown is a coarse measurement wave whose leading edge propagates twenty-two shifts after leaving the edge of the grid before passing under the cursor. Wave 40 generates waveform 60, which is the resulting signal coupled into the pickup of the cursor. Waveform 60 has a staircase shape produced by the increases in coupling as the wave 40 periodically and abruptly moves another 5 mm under the cursor.

A complete description of all the variables affecting the shape of the cursor waveform 60 would be quite complex, and will not be attempted. However, such an analysis would take into account the following. The rounding of the edges of the staircase is brought about in part by capacitive loading on the pickup 24 by its surrounding shield, and in part by the filtering effect produced by the circular nature of the aperture. Also, the capacitive loading on the pickup 24 is not constant. When the transition in the wave is under the cursor, part of the pickup's coupling capacitance is to ground, and part is to the voltage level presented by the wave. The proportion changes as the wave moves beneath the cursor.

Another important aspect of the cursor waveform 60 is indicated by the notation, on FIG. 7, of "A≠B." This indicates the non-symmetrical nature of stair steps above and below the zero-volts axis. This is due to the cursor's not being centered over a line in the platen (i.e., a line in the grid for the dimension being considered). As the cursor's position changes slightly, so does the degree of asymmetry, as well as the sizes of the individual steps in the staircase. These aspects just mentioned are important because they allow the filter 7 to, in essence, interpolate the cursor's position when its center it not directly over a line in the platen.

FIG. 7 also shows the output 61 of the filter. It was assumed, for the sake of clarity, that the excess, or remainder, of the filter's delay over and above an integral number of 200 μsec periods was small; say, on the order of 3 μsec.

The importance of interpolation by the filter can be seen from the following. If waveform 61 were shifted to the left by an amount corresponding to the remainder of the filter delay, the zero crossing of waveform 61 would occur just as the leading edge of the wave 40b "passes" under the center of the cursor. The amount of offset between the center of the cursor and the righthand adjacent drive line is marked "X" in the figure. If the interpolation effect were not available from filtering, the zero crossing detector 8 would be unable to generate a transition in its output 44 (SIGNAL) that fails in-between the steps in the staircase of waveform 60. That is, in such a system, the cursor's position could be resolved to the nearest drive line only. Filtering allows additional resolution by interpolating the cursor's position.

The output of the filter is used by the zero crossing detector to produce SIGNAL. This is shown as waveform 44. When SIGNAL is compared with ϕREF 13 the length of time that the phase counter counts can be seen. If the filter delay is removed the remaining time can be divided into groups of eight shifts, plus some shifts left over. Each complete group of eight shifts represents an entire fine measurement wavelength contained in the cursor's displacement from the edge of the platen. To determine the number of such complete fine wavelengths is the primary object of coarse measurement, and the result is called the coarse component of the measurement. The fine component is the fractional portion of a fine wavelength, and is found during fine measurement.

Figure 8:
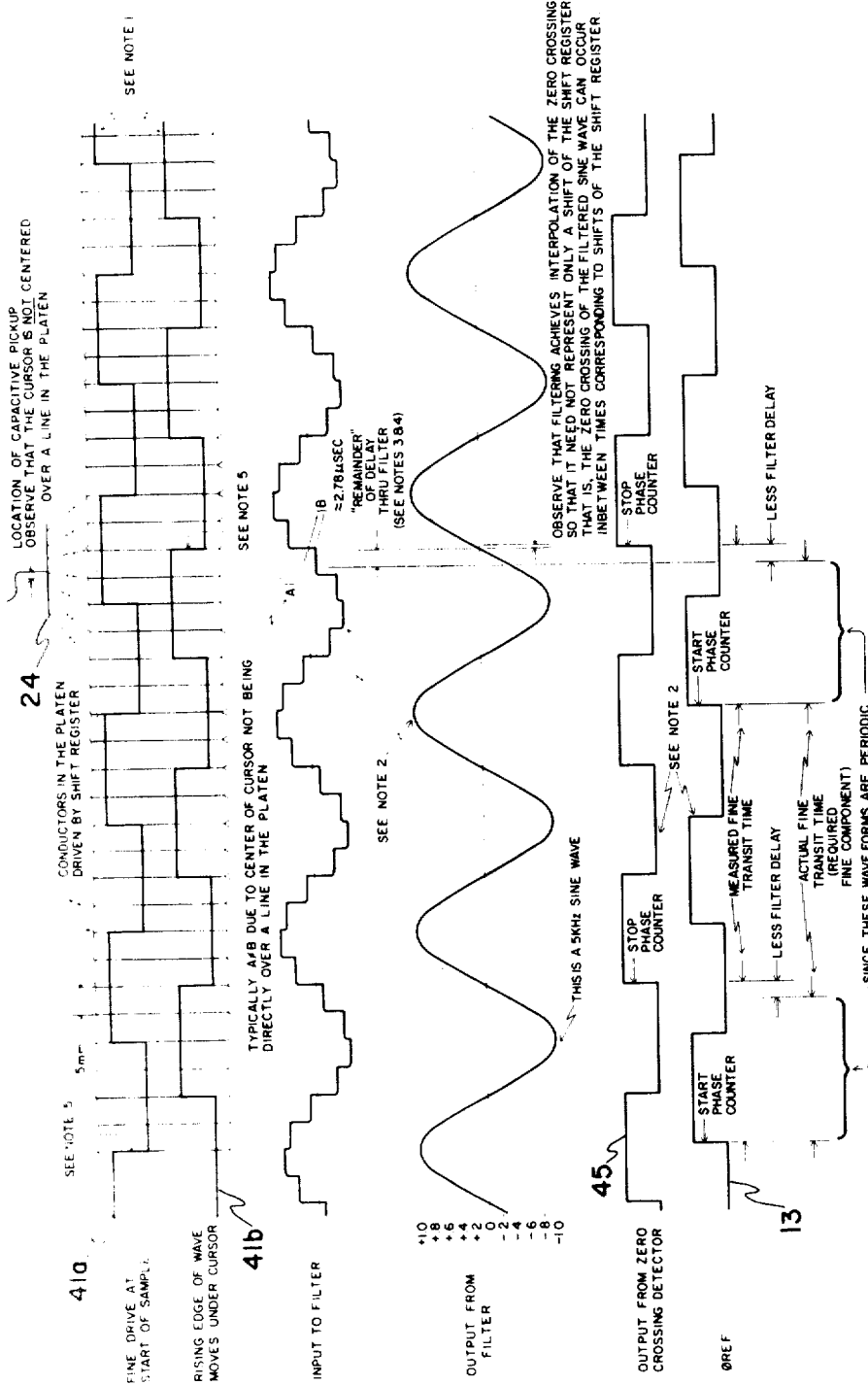
FIG. 8 is a waveform diagram depicting fine position measurement along either of the x or y axes with a swept square wave whose wavelength is 40 millimeters.

The details of obtaining a fine measurement may be better understood with reference to FIG. 8. Therein is shown a fine measurement wave in two different positions as it is swept across the platen. The wave 41a is shown as it exists as one of its leading edges begins to sweep across the active area. The wave 41b is the same wave as it exists twenty-two shifts later. All that was said in connection with FIG. 7 concerning the specialized interpretation of spatial representations of moving electro-static waves, when drawn in conjunction with conventional waveforms, also applies to FIG. 8.

The main difference between FIGS. 7 and 8 is that in FIG. 8 the measuring electro-static wave has a wavelength of eight shifts rather than of 360. Accordingly, what is measured is the fine component. The amountof filter delay assumed in each of the Figures is the same. The remarks concerning the filter's interpolation of cursor position in FIG. 7 are applicable to FIG. 8 also.

One important thing that FIG. 8 shows is that fine measurement can be taken by noting the length of any of a multiplicity of intervals established by φREF and SIGNAL, even if it does not "correspond" to the one in the drawing where the cursor is located.

To obtain the coarse and fine components, as shown in FIGS. 7 and 8, it is necessary to know the filter delay. This is obtained during a reference measurement, and may be better understood with reference to FIGS. 9 through 12.

Figure 9:
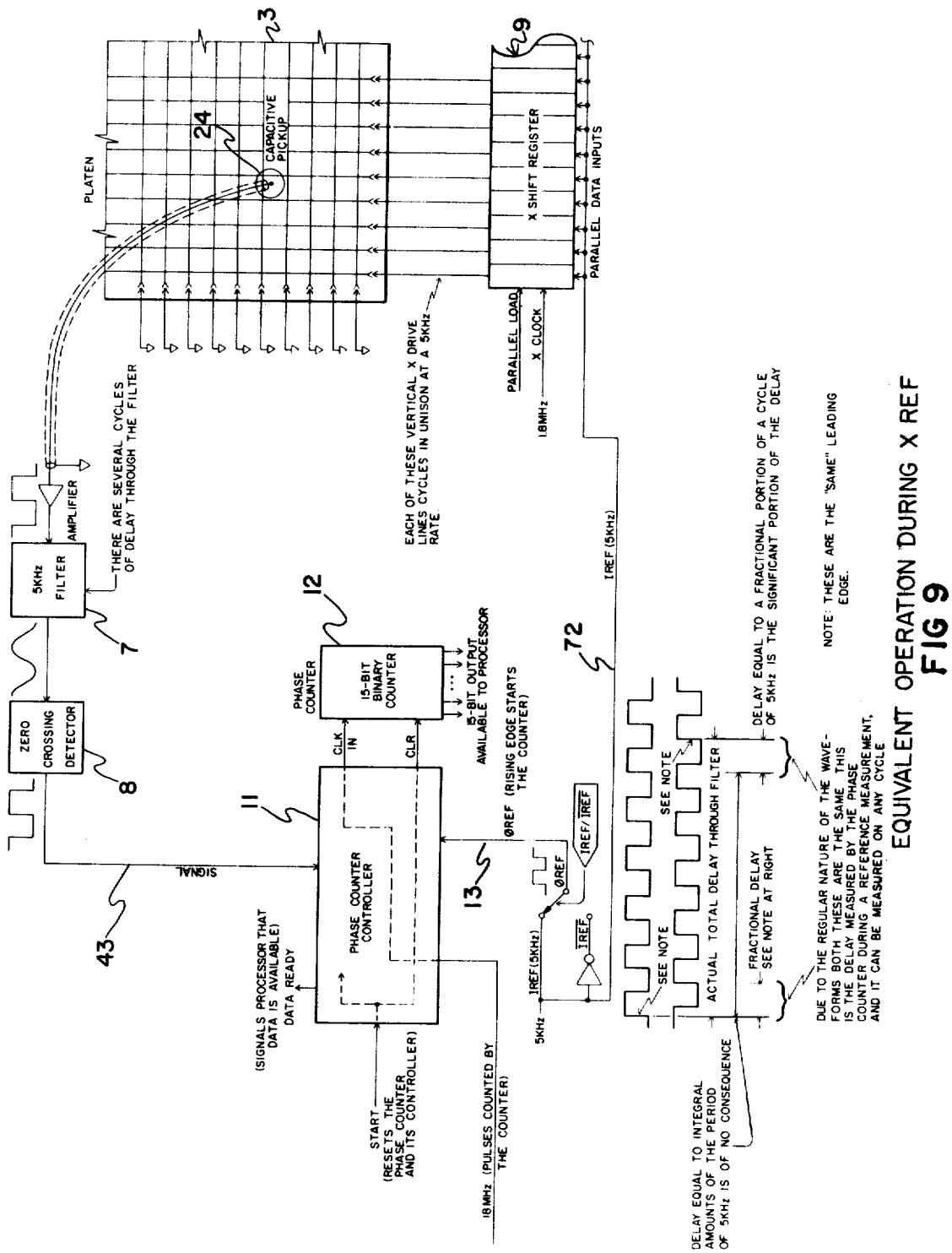
FIG. 9 is a simplified block diagram illustrating the internal configuration of the digitizer of FIG. 1 during the reference measurement for the x dimension.

FIG. 9 illustrates the equivalent internal configuration of the digitizer during the x reference measurement. The y shift register will have previously been cleared, and will remain that way since the x shift register 9 will be the active shift register. Clearing the y shift register grounds the y grid in the platen. Further, the x shift register no longer shifts a wave across the platen. Instead, the parallel load ability of the x shift register is used to drive all lines in the x grid at a 5 kHz rate (using IREF as the source of the 5 kHZ).

Thus, no matter where the cursor is in the x (or y) dimension, it sees the same signal. Furthermore, there is little or no delay between what the cursor sees and φREF (which triggers the phase counter). So the delay between the leading edge of φREF and the leading edge of SIGNAL represents the delay induced by the filter and amplifiers. (Shift register delay is actually included also, but is usually insignificant. However, it is properly taken into accout as long as the interstage shift delay equals the parallel load delay.)

As will be discussed below, what the phase counter actually measures in the reference mode is the "remainder," mentioned earlier, of the filter delay. Typically, the delay through the filter amounts to several cycles of 5 kHz. Now, if there were no delay through the filter, then obviously it could be ignored. Likewise, if the delay were exactly an integral number of periods of 5 kHz, it could also be ignored, since with periodic waveforms there is no way to tell the difference. Indeed, the phase counter cannot tell the difference, and responds only to that portion of the delay that remains after all the integral multiples of the period of 5 kHz have been removed.

Figure 10:
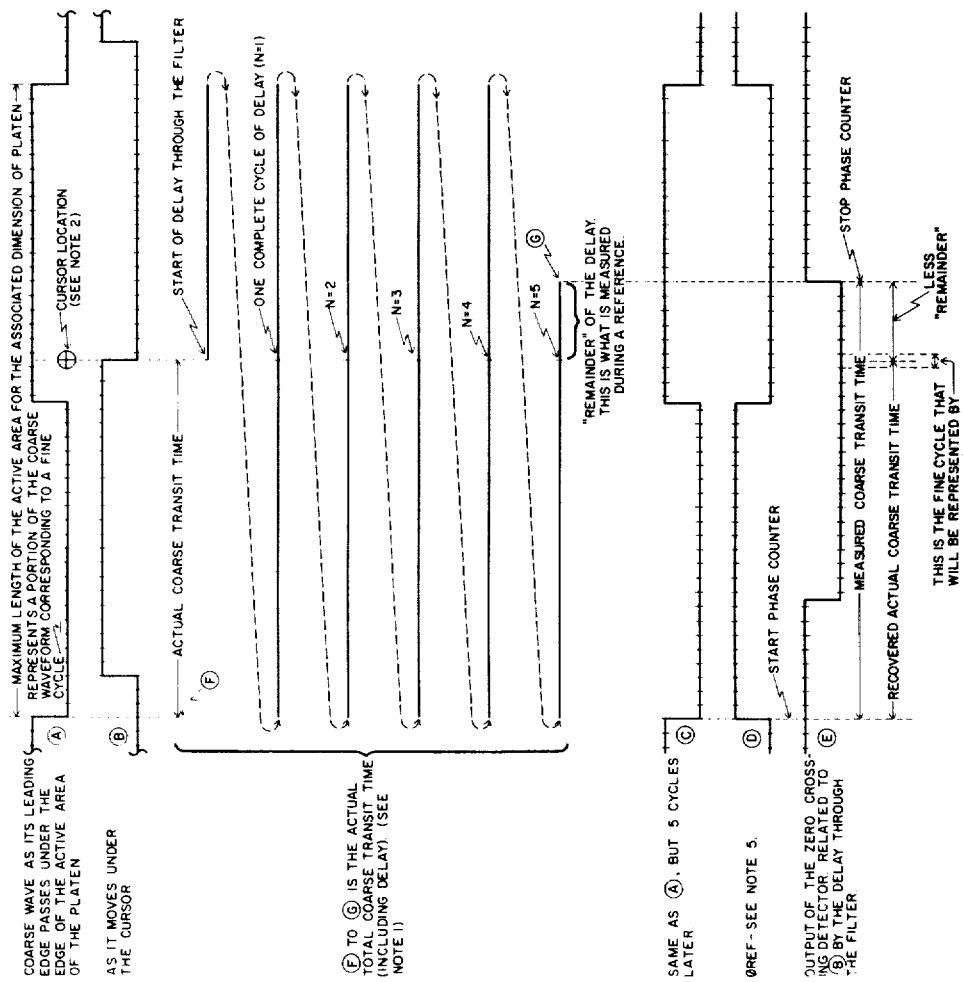
FIG. 10 is a waveform diagram illustrating the relationship between coarse and reference measurements, for either of the x or y dimensions.

Referring now to FIGS. 10 and 11, the above analysis is illustrated in detail for coarse and fine measurements, respectively. The amount of delay assumed is the same for both figures: approximately 5 1/9 cycles of 5 kHz. In each case the figures show graphically how the periodicity of the measurement waveforms absorb all but the remainder of the delay. They also show graphically how the measured value of the delay can be removed to obtain the coarse and fine measurement components for a cursor displacement in the measured dimension. That involves subtraction of the reference value from the measured coarse and measured fine values.

All three of these values originates as counts in the phase counter, whose (averaged if averaging is the case) values can range from zero to 3599 counts. And for all practical purposes, each of coarse and fine are arbitrarily related to the reference value. That is, the reference value can be a larger value than either or both of the coarse or fine values. The problem then arises of how to handle the case of a large-valued reference measurement that must be subtracted from a small-valued coarse or fine measurement. The explanation of this case may be understood with reference to FIG. 12. As shown graphically in FIG. 12, the solution is to "complement" the resulting negative value by adding 3600 counts to it.

FIGS. 10 through 12 are general purpose in the same that they do not differentiate between obtaining or using a reference value for x measurements and obtaining or using a reference value for y measurements. In fact, no such differentiation is required, other than an x reference value be used with x measurements, and a y reference value with y measurements. A y reference value is obtained in the same manner as for x, bu the x shift register is cleared while the y shift register is parallel loaded with 5 kHz.

The x reference value will, in practice, be very similar to the y reference value. However, due to the very sensitive and critical role that a reference value plays in the formation of actual coordinates, and since there is some separate x and y circuitry involved (the shift registers, the x and y grids), and since the cursor may move about on the platen as measurements are taken, it is desirable to take separate x and y reference measurements. A system employing a single reference measurement would work, albeit with somewhat less accuracy.

The accuracy of the digitizer's operation is improved by incorporating a means to average a number of consecutive measurements taken by the phase counter. In part, this is done by providing the type of phase counter operation involving AV TWO's and AV FOUR's. Recall that in these operations the phase counter automatically accumulates a number of consecutive measurements. However, averaging also employs the repeated use of AV FOUR's. For example, coarse measurements involve a single AV FOUR that is averaged, while reference and fine measurements involve an "AV 21" that is formed from an AV ONE followed by five AV FOUR's. In the latter case the processor's firmware accumulates the total value as the AV ONE and AV FOUR's proceed. There is more to averaging, however, than simply accumulating the result of n consecutive measurements and dividing it by n.

Because the time interval being measured is a difference between two periodic waveforms, the difference itself is also periodic. Thus, if a small difference becomes "markedly smaller," it abruptly becomes "large." Likewise, if a large differene gets "too large," it abruptly becomes "small." The presence of noise and drift in the threshold of the zero crossing detector can cause what should be small counts in the phase counter to become "markedly smaller," and end up "large." Such noise and drift can also cause counts in the phase counter that should be large to become "too large," and end up "small." Such behavior seriously interferes with the accumulation of numbers for averaging, and is called the problem of 3600-count ambiguity.

The problem of 3600-count ambiguity, and its solution by dynamically controlling a half-wavelength offset in $\phi$REF, may be understood with reference to FIG. 13 (A–C).

Section one of FIG. 13 illustrates three general cases where the count in the phase counter is incorrect. In two of the three cases shown (i and ii of section one of FIG. 13) the resulting count differs from what it should have been by approximately 3600 counts. These two are each cases where a small change in the relationship between $\phi$REF and SIGNAL produced an abrupt change in the value registered in the phase counter. In the third case (iii) the count is larger than 3599. This is the only case of the three where the effects of noise and threshold offsets can be explicitly discerned. For the other two cases (i and ii) there is no reliable way (e.g., statistical inference from prior values) to determine if a large or small value is actually beset by the 3600-count error. All that can be stated with assurance is that a sufficiently large or sufficiently small count *might* be off by approximately 3600 counts.

Section two of FIG. 13 is an example showing that undetected case i or case ii 3600-count ambiguities are fatal to averaging.

As shown in section four of FIG. 13, the general solution is to arrange that the phase counter not be used to accumulate measurements for actual use if the count is very small or very large. This is done by first testing the range of the count, and "if necessary," shifting $\phi$REF by a half-wavelength.

The "if necessary" is the following condition: "Is $400 \leq m < 3200$?" where m is the value returned by the phase counter. If the condition is met, then adjustment of $\phi$REF is "not necessary"; if the condition is not met, then adjust "is necessary." The exact choice of boundaries of the condition are somewhat arbitrary. The values shown work and are convenient.

After $\phi$REF is offset, the old value of m is discarded and a new one obtained. The new measurement will differ from the previous one by approximately 1800 counts. That is, it will be a "medium-sized" count. It will still exhibit minor variations in value due to noise, and will need to be arithmetically adjusted to take out the 1800-count change induced in its value. But after the 1800-count offset is adjusted, the resulting value can successfully be averaged to reduce the effects of the noise; the 3600-count ambiguity that interferes with averaging never appears.

The means used to control the half-wavelength offset of $\phi$REF is the processor's ability to inspect the value returned from the phase counter, and if necessary, change the value presented by the IREF/$\overline{\text{IREF}}$ mode control latch. This is followed by repeating the measurement; additional measurements may also be made. The processor sets flags in its programming so that it will know how to arithmetically adjust the values of m's subsequently obtained.

As shown in section five of FIG. 13, a newly returned value will need to be decreased by 1800 counts if its original value was small (case ii), or, increased by 1800 counts if its original value was large (case iii).

FIG. 13 has assumed that dynamic control of the half-wavelength offset of $\phi$REF is always used in conjunction with the results of AV ONE's. This need not be, nor is it, the case. The general technique can be applied to measurements made under the auspices of an AV FOUR. In that case the adjustment is by $4 \times 1800 = 7200$ counts when $1,600 \leq m < 12,800$.

A detailed description of how the half-wavelength offset of $\phi$REF error reduction procedure is incorporated into the overall coordinate measurement and preparation procedure is presented in a subsequent section.

The manner in which the coarse and fine components are combined to produce a coordinate value in a given dimension is explained by FIG. 14. Section one of FIG. 14 shows how the total distance is formed as a sum of a coarse component and a fine component.

Sections two and three of FIG. 14 compare the ways in which the coarse and fine measurements are made, to show that the dimensional weight of a coarse count is 45-times that of a fine count. This follows from the ratio of their swept wavelengths, and from the fact that each is resolved by the phase counter into a fixed 3600-count range. Observe also that each fine count represents a distance of 0.0111 mm.

Accordingly, and as shown in section four, a distance corresponding to one entire fine measurement cycle is represented by a coarse count of 80. This follows from the fact that 1/45 of the 360 shifts of a coarse wave is 8 coarse shifts. Since there are 3600 counts/360 shifts, or 10 counts per shift, each fine cycle corresponds to 8 shifts at 10 counts per shift, or 80 coarse counts.

As shown in Section five, what is done is to determine how many times 80-counts is contained in the coarse count. That is, $$C/80 = N + r/80 \qquad (1)$$

where:
C is the coarse count
N is an integer
r is the remainder

At this point it would be possible to convert N to an equivalent number of fine counts, add the measured fine count, and take the sum to be the raw dimensional value of the coordinate. However, the presence of "noise" in the counts, and the effects of cursor motion, render that approach inadequate for high accuracy digitizing. An error reduction technique utilizing previously unused resolution in the coarse count solves this problem.

Continuing with section five of FIG. 14, a statistical argument is advanced to show that random noise is much more likely to produce a significant error in the coarse count than in the fine. That is, one extra count due to noise in the coarse count is much more significant than one extra count due to noise in the fine count. It is also assumed that noise (in counts) is equally likely in both the coarse and fine measurements.

Now, the coarse measurement contains more significance or resolution than has been used by simply finding the highest multiple of eighty that it contains. If this were not so, there would be no remainder r in equation (1) above. That is, the coarse count would exactly indicate, times some integral multiple, the number of fine cycles it represents. The remainder r can be used used as a rough predictor of the general size of the fine count accompanying the coarse count. A remainder of 78 (out of a possible 79) does not agree with a fine count of, say, 50 (out of a possible 3599). Under such conditions we are justified in assuming that either noise has absorbed some legitimate coarse counts, or that cursor motion during measurement has changed the fine cycle associated with the coarse measurement. In either case the correct result can be restored by adjusting the coarse value to reflect agreement between the remainder r and the fine value. Section five of FIG. 14 illustrates graphically the expected correspondence between the remainder r and the fine count. Section six illustrates graphically the method of adjusting the coarse to ensure "coarse/fine agreement," and is explained below.

Section six of FIG. 14, in cases A, B, and C, shows that no adjustment to the coarse count is required when any of those three types of agreement occur. Cases D and E illustrate the required adjustment of the coarse count when either of the following two conditions occurs.

If a low remainder is accompanied by a high fine count, the assumption is that the coarse count was made larger by extra counts due to noise, or that there was cursor motion toward smaller values in the dimension under consideration. The correct action in either case is to decrement the value of N obtained in equation (1) above (when the coarse count was divided by 80). This is the correct action in the case of noise, because of the statistical likelihood arguement alluded to above. It is the best choice in the case of cursor motion because it provides the answer that would have been obtained had the digitizer taken a coarse measurement at the same time it took the fine measurement. It is, after all, with the fine measurement that the digitizer's accuracy and resolution ultimately reside; to adjust the fine to agree with the coarse would be absurd.

If a high remainder is accompanied by a low fine count, the assumption is that the coarse count was made lower by a loss of counts due to noise, or that there was cursor motion toward larger values in the dimension under consideration. The correct action is to increment the value of N.

Once the coarse count has been adjusted, the total distance (in millimeters) is found thus: DISTANCE=(45×ADJUSTED COARSE+FINE)×0.0111 . .

A complete description of the sequence of values assumed by the mode control latches in performing the coordinate pair measurement activity is given in FIGS. 15A through 15D. The first thing that is done is to clear both shift registers. Next, the x coarse measurement is performed. This involves an AV ONE to set the half-wavelength offset of φREF, followed by an AV FOUR. The x reference measurement is performed next, followed by x fine. Each of these two measurements begins with a preliminary AV ONE, to set φREF, followed by five AV FOUR's. There can actually be more than five, since each AV FOUR can detect the need to change φREF. This could happen if the cursor were moving. If such a change were necessary the AV FOUR that revealed the need would be ignored, and repeated after the change. The y measurements are performed in a slightly different order, but in a manner otherwise entirely analogous to the x measurements.

The general order of the measurements is as follows.

| CLEAR | |
|---|---|
| X COARSE | Averaged by 4 |
| X REFERENCE | Averaged by 21 |
| X FINE | Averaged by 21 |
| CLEAR | |
| Y FINE | Averaged by 21 |
| Y REFERENCE | Averaged by 21 |
| Y COARSE | Averaged by 4 |

Note that this order puts the two fine measurements as close together as possible. That is an optimum choice, as it minimizes the degree to which the coordinates must be corrected to compensate for the effects of cursor motion. The effects of cursor motion are examined in a subsequent section.

The figure shows that DELTA is issued once at the beginning of each different type of measurement: coarse, reference, or fine. START is issued once for each AV ONE or AV FOUR to be performed.

The general nature of the activity performed by the processor 14 may be understood with reference to the overview of the processor's activity shown in FIGS. 16 A and B. FIG. 16A shows the general structure of an interrupt service subroutine entered each time the phase counter controller 11 generates DATA READY (recall the DATA READY generates an interrupt).

The main purpose of the interrupt service subroutine is to control the contents of the mode control latches 15, and to generate the "A" and "B" copies of the Sample Table and of the Velocity Correction Timers. The "A" copy of the Sample Table holds the latest data gathered by the measurement sequence of FIG. 15. The firmware controlled timers necessary for cursor velocity-related correction of the coordinates are active during the time taken to generate the "A" copy of the Sample Table, and are themselves the "A" copy of the Velocity Correction Timers. As soon as the "A" copies are filled, they are transferred to the "B" copies for safe keeping and further use; the interrupt service subroutine will begin to refill the "A" copies with fresh data just as soon as possible. If the "B" copies are "busy" (i.e., in use and must not be changed) the newly completed "A" copies are discarded, and the measurement process begins again.

In addition to the "A" and "B" copies of the Sample Table, there are also "C" and "D" copies. The structure of these various copies is shown in FIG. 16A. Generally speaking, each copy is derived from the copy associated with the previous letter, and represents another stage in the preparation of the final coordinates. There are no further copies of the timers, however. The "B" copy of the timers is used in the preparation of the "C" copy of the Sample Table, and after that is of no further interest. The structure of the timers is also shown in FIG. 16A.

A detailed explanation of the operation of the interrupt service subroutine, and of the use to which the Sample Table and the Velocity Correction Timers are put is given in a subsequent section.

Figure 16B:
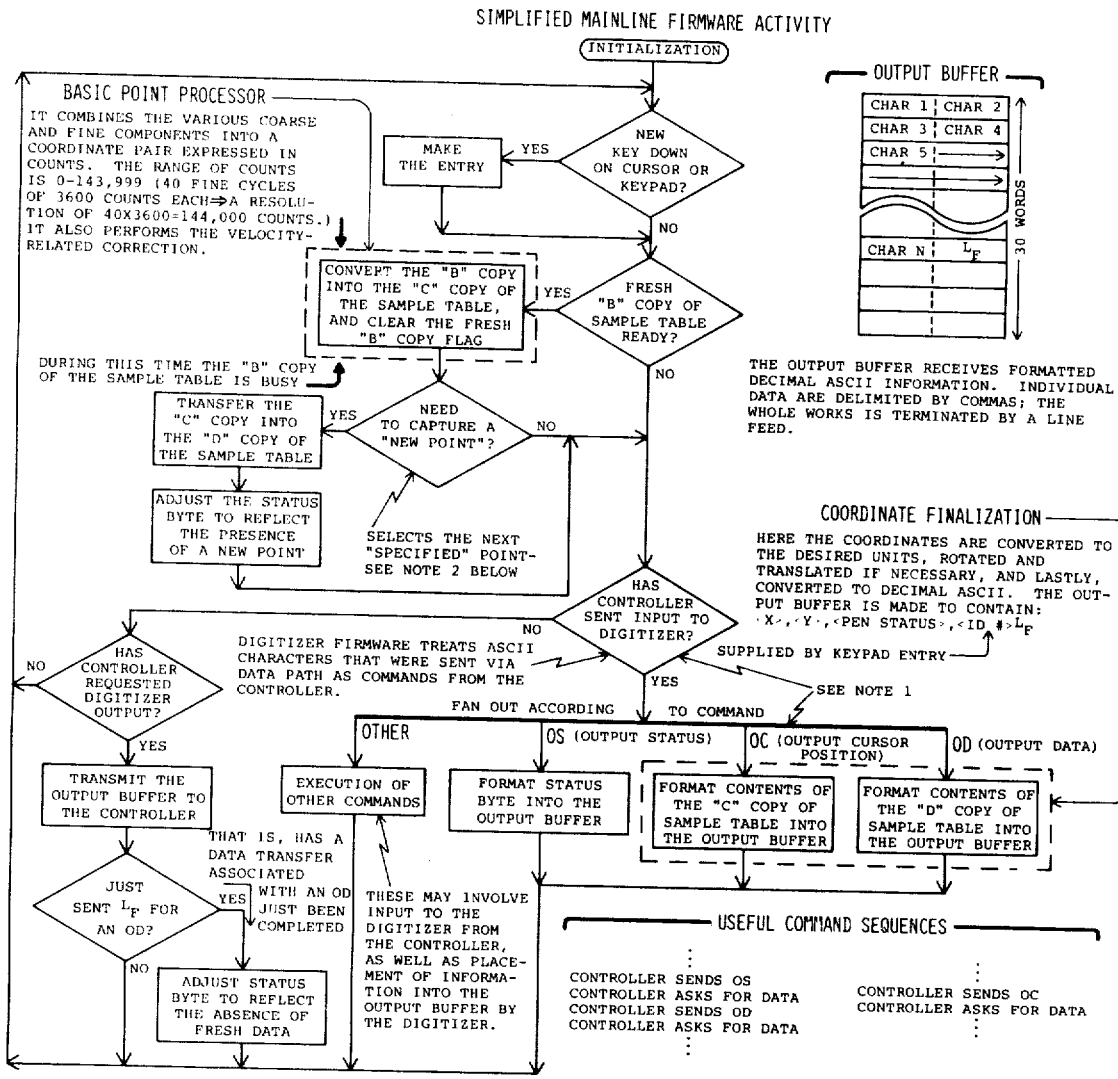
FIGS. 16 A-B is a simplified flow chart illustrating the relationship of the programming executed by the processor in the block diagram of FIG. 5A to the basic measurement sequence of FIG. 15.

Referring now to FIG. 16B, shown therein is an overview of processor's mainline firmware activity. The processor pursues this activity whenever it is not executing the interrupt service subroutine of FIG. 16A. The mainline activity shown in FIG. 16B can be considered as a sequence of very general activities. First, a check is made to see if a new key on the keypad 5 has been pressed. This involves a read-from-memory operation directed to address 16₈. If there is a new key down it is entered and processed.

Next, a check is made to see if the "B" copies of the Sample Table and Velocity Correction Timers contain fresh data that has not yet been operated upon. If they do, the data is operated upon by a section of firmware called the Basic Point Processor. The Basic Point Processor will be discussed in connection with FIG. 18, but its main function is to combine the coarse and fine components so that both coordinates can be expressed in terms of (fine) counts. That is also where velocity-related coordinate correction occurs. At the conclusion of the basic point processor the combined and velocity corrected coordinates are in the "C" copy of the Sample table.

After the activity of the Basic Point Processor is complete the current digitizing mode (Single or Continuous sampling) is taken into account to decide if the "C" copy of the Sample Table should be saved in the "D" copy for later output to the digitizer's controller.

Next, the mainline firmware attends to any required communication between the digitizer and its controlling device. This communication can take two forms. First, the controller can request that the digitizer supply some type of data. In this case the digitizer sends the contents of a previously loaded and formatted output buffer to the controller. Second, the controller can send commands to the digitizer.

Such commands are two-letter ACSII mnemonics. The digitizer responds to over forty different such commands, many of which are accompanied by sequences of parameters. The activities of all but a few of the digitizers's commands are outside the scope of this disclosure. Three commands will be briefly discussed so that the general nature of the digitizer's operation with respect to the transmission of coordinate values to the controller may be understood.

The first command of interest is OS (Output Status). This causes the digitizer to put various kinds of status information into the output buffer. The status information reflects a variety of conditions, such as, "New data is available," "There has been an out-of-bounds or low signal error," etc. After sending OS to the digitizer the controller must then request the digitizer to output the contents of the output buffer. That actually transmits the status information to the controller.

The next command of interest is OD. This command instructs the digitizer to format the "D" copy of the Sample Table into the output buffer, in anticipation of the controller's impending request for the transmission of the output buffer's contents. OD is the normal means used to prepare coordinate data for transmission to the controller. By using the "D" copy the escapement mechanisms associated with Single and Continuous sampling are effective. Note that the "D" copy does not necessarily reflect the current location of the cursor. It reflects the last point the operator thinks was "digitized."

The final command of interest is OC. This command by-passes the escapement mechanisms associated with the Single and Continuous modes that regulate the flow of coordinate data into the "D" copy of the Sample Table. OC causes the "C" copy of the Sample Table to be formatted into the output buffer, in anticipation of the controller's impending request for the transmission of the output buffer's contents. The OC command provides a way for the controller to learn the location of the cursor even though the operator is not "digitizing."

Figure 17:
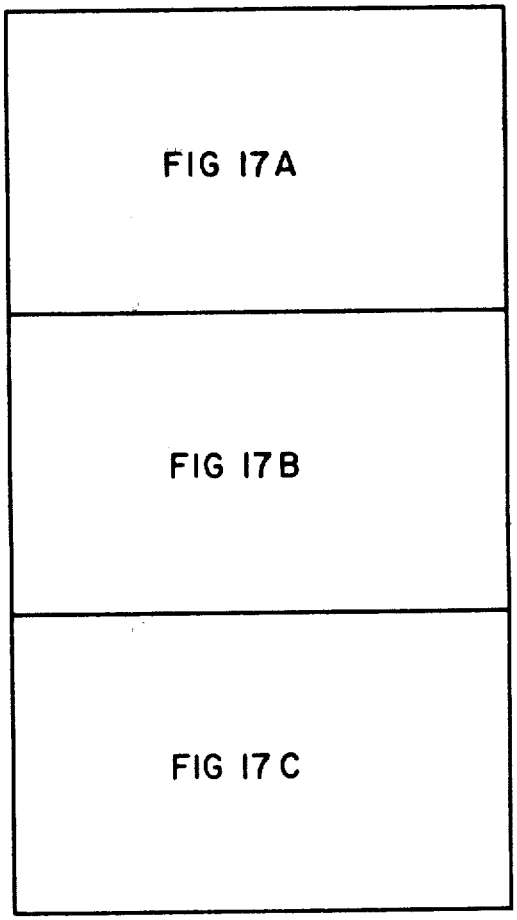
FIGS. 17 A-C is a more detailed yet still simplified flowchart of the interrupt service subroutine of FIG. 16A.
Figure 17A:
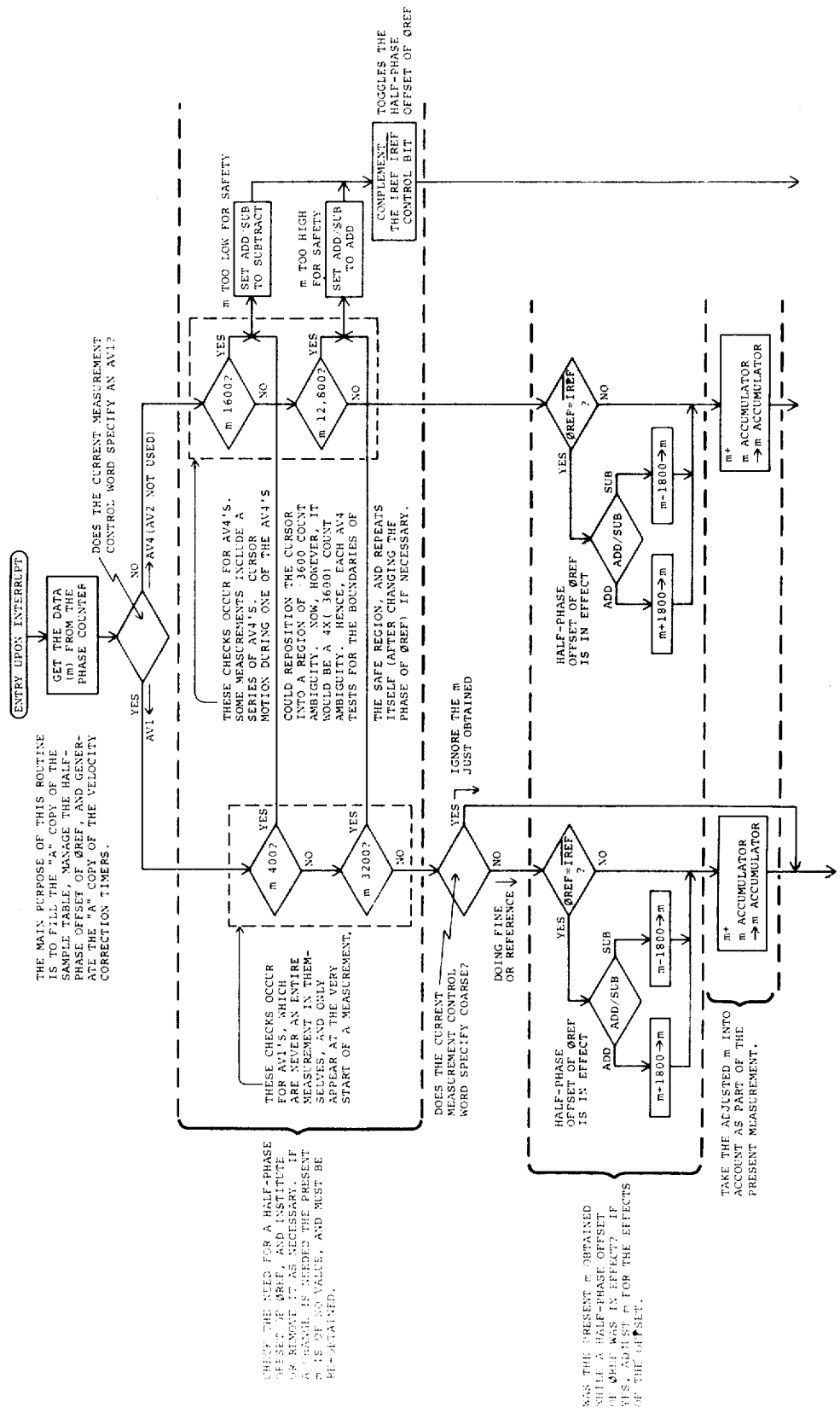

A more detailed understanding of the interrupt service subroutine may be gained with reference to FIGS. 17 A through C. Referring now to FIG. 17A, the first thing done upon an interrupt caused by DATA READY is to capture the data presented by the phase counter 12. This is done with a read-from memory operation referencing location 12₈.

Next, for each AV ONE or AV FOUR measurement, the data (m) is inspected in accordance with the principles outlined in FIG. 13 to determine if a half-wavelength offset of φREF should be induced. If so, the measurement just obtained is abandoned, the IREF-/$\overline{IREF}$ control bit complemented, and the measurement repeated by resending the same (except for IREF-/$\overline{IREF}$) mode control latch values as for the measurement just abandoned.

The use of AV FOUR's complicates the task of managing the IREF/$\overline{IREF}$ control bit. The example in section 2 of FIG. 13 shows that an AV FOUR cannot, by itself, be relied upon to reveal the actual presence of a 4×3600-count ambiguity. That is, the result of an AV FOUR is a sum. If one of the counts contributing to the sum is near zero, while all the others are near 3599, the result is not a number "near" 4×3599=14,396. Thus, the presence of the ambiguity remains undetected, which is, of course, not permissible.

The solution is to precede each single AV FOUR or group of consecutive AV FOUR's with an AV ONE, and to impose a velocity limit on cursor motion. The AV ONE correctly reveals the possibility of 3600-count ambiguity; the subsequent AV FOUR's are taken with φREF offset, or not, as determined by the AV ONE. Now, assuming that the AV ONE revealed that φREF need not be offset, cursor motion will not be so great that, by the end of the next AV FOUR, the cursor will penetrate more than "part way" into the "region of uncertainty." In fact, the "region of uncertainty" (the 400 counts at each end of the measurement interval, as discussed in FIG. 13) is sufficiently large that the cursor can penetrate that "part way" without actually incurring the possibility of ambiguity, even if it was just outside that region at the start of the AV FOUR. This gives the AV FOUR the opportunity to anticipate that the *next* AV FOUR might indeed contain an ambiguity. If the possibility occurs, the AV FOUR just completed "discards itself," and is repeated with φREF offset. And, in the other case, if the preceding AV ONE reveals the need for and immediate offset, once made, the offset provides at least 1800−400=1200 counts of "running room" for the cursor to travel in during the subsequent AV FOUR's. That amounts to several times the distance of "part way" mentioned above. The velocity restriction is chosen to work the smaller distance; it is therefore automatically compatible with the larger distance.

Note that an AV FOUR preceded by a known "good" AV FOUR is as "protected" as if it had been preceded by an AV ONE. Coarse measurements comprise an AV ONE followed by a single data gathering AV FOUR, whereas fine and reference measurements comprise an AV ONE (which also gathers data) followed by a series of five data gathering AV FOUR's. Each preceding AV FOUR protects the one that follows it. Thus, the velocity restriction, in conjunction with the knowledge that the previous measurement was wholly outside the "region of uncertainty," combine to render AV FOUR's absolutely reliable, with respect to 3600-count ambiguities.

The velocity restriction referred to above is obtained by the following analysis. First, it is necessary to determine how long a worst case AV FOUR might last. And second, it is necessary to decide how far is "part-way" into the 400-count "region of uncertainty." Testing of the actual system revealed that a consecutive value for "part way" would be halfway; that is, 200 counts into the 400-count "region of uncertainty." What this means is that actual region where genuine uncertainty might occur is really only something less than the first 200 or last 200 counts of the measurement interval. Presence of the cursor in the second 200-count interval or in the next to last 200-count interval is used to warn of possible impending cursor presence in the "region of genuine uncertainty." The cursor velocity restriction arises from considering a maximum of 200 (fine) counts of cursor motion during the maximum length of time required to perform the measurement involved (an AV FOUR).

Fine counts are chosen above because they represent a shorter distance than 200 coarse counts, and therefore result in a tighter restriction which works for both coarse and fine. 200 fine counts represents a distance of 2.222 . . . mm.

The longest time for an AV FOUR is determined as follows. First, it is noted that no DELTA (refer to the explanation of FIG. 5A) ever precedes and AV FOUR. Therefore, the 1.2 msec duration of the one shot 33 need not be added to the time being sought. Next, it is noted that the request for an AV FOUR is totally asynchronous to $\phi$REF. The phase counter will not actually begin measuring until the leading edge of $\phi$REF. So there is at most a 200 $\mu$sec (one cycle of 5 kHz) delay on this account. Next, each of the next three measurements will appear to take a full 200 $\mu$sec each, regardless of the actual number of counts accumulated. The fourth measurement could require counting as high as 3199 (3599–400). That is 88.886% of a possible 200 $\mu$sec duration, or 177.78 $\mu$sec. For the sake of margin, and to keep the numbers nice, call it 200 $\mu$sec anyway. Thus, there could be five 200 $\mu$sec intervals, or one msec, required for the completion of an AV FOUR.

Thus, the velocity restriction is 2.222. . . mm/1 msec=2.222. . . M/sec, or approximately 87.5 inches/second.

Referring once again to FIG. 17A, the flowchart is arranged to drop the returned value associated with an AV ONE performed as part of a coarse measurement. (Referring briefly to FIG. 15, it can be seen that such an AV ONE is done only to learn whether or not $\phi$REF need be offset, and not as part of an accumulation of data. The data is taken by an immediately subsequent AV FOUR.)

If the count in the phase counter is usable, a check is then made to see if a present half-wavelength offset of $\phi$REF must be accounted for by arithmetically adjusting the measured value. This is also in accordance with the principles outlined in FIG. 13.

Finally, the data is accumulated into an accumulator called the "m accumulator".

Figure 17B:
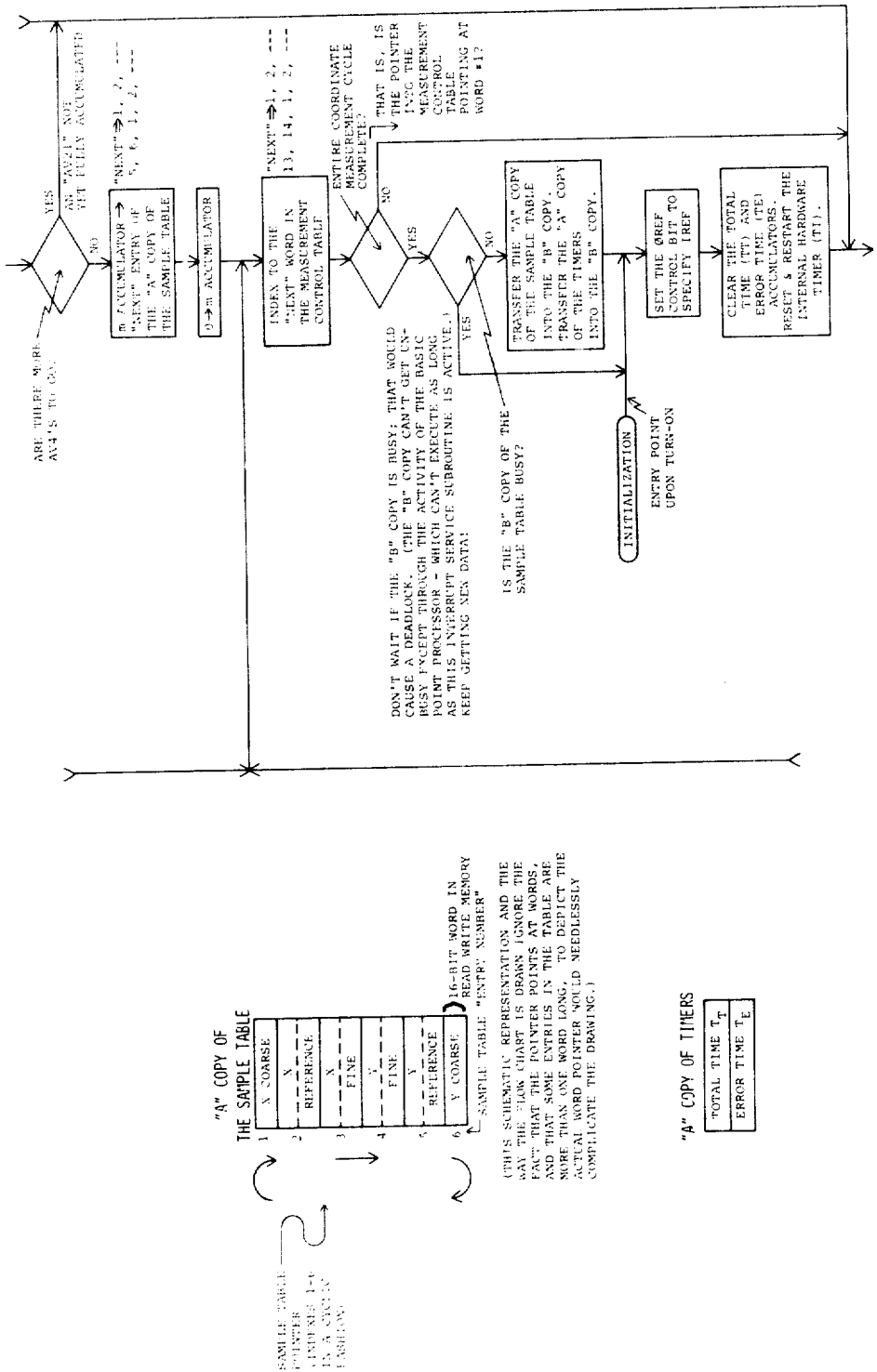

Referring now to FIG. 17B, in the case that the measurement just completed is an AV FOUR a test is made to see if more AV FOUR's need be done to complete an ongoing "AV 21" pursuant to a fine or reference measurement. If so, then the current collection of settings for the mode control latches is used to repeat the AV FOUR (up to four more times—assuming no changes to $\phi$REF) until the "AV 21" is fully accumulated. This could require more than four repetitions if cursor motion moved the cursor into a region of 3600-count ambiguity, and one of the AV FOUR's had to be repeated.

At the conclusion of an AV FOUR or of an "AV 21" the accumulated entry (in the m accumulator) is put into the appropriate location of the "A" copy of the Sample Table. (No solitary AV ONE's are ever used for data gathering purposes.) Then the m accumulator is cleared so that it will be ready for the next measurement activity.

At this point the next measurement activity will involve a different type of measurement than just completed. That is, referring briefly to FIG. 15, it can be seen that it shows fourteen different combinations (excluding IREF/$\overline{\text{IREF}}$) of the mode control latches. What is meant here is that the next one of the fourteen combinations is to be implemented next. Note that this does not necessarily mean a change from x to y measurement, or from coarse to fine, etc., although it could. It might only mean a change from using an AV ONE to using a series of AV FOUR's.

Figure 17C:
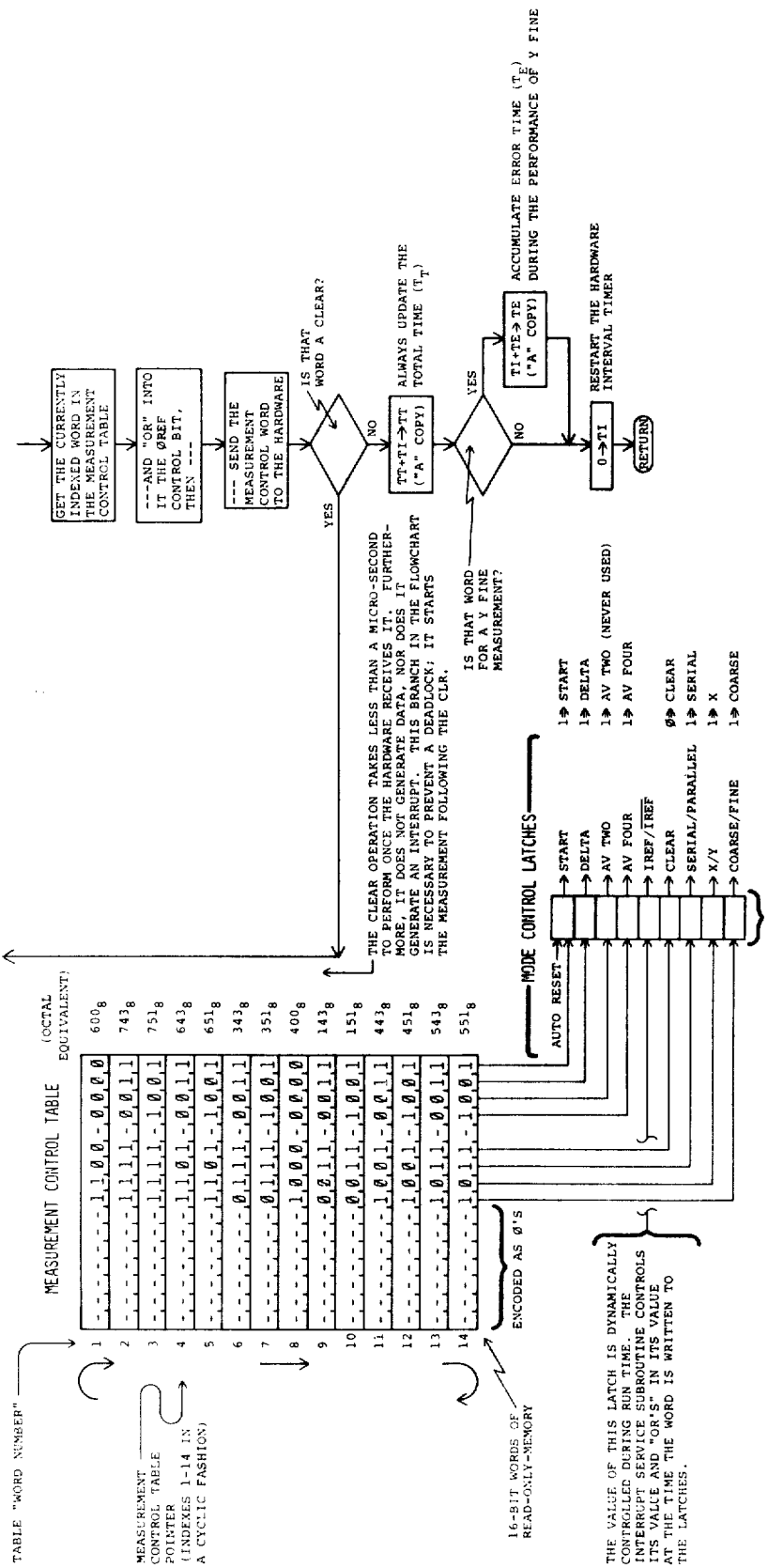

Returning now to FIG. 17B, the next activity is to select the next word from the measurement control table (shown in FIG. 17C). The measurement control table contains in ROM a representation of each of the fourteen different necessary combinations of the mode control latches. At this point the next entry in the table is merely selected; it will be sent out to the latches sooner or later.

Next, a check is made to see if the entire coordinate measurement cycle is complete. If it is, then the "A" copies of the Sample Table and Velocity Correction Timers are transferred to the "B" copies, unless the "B"copies are busy. If that should be the case, to avoid a deadlock the "A" copies are abandoned and the "B" copies are left alone; the measurement process continues, eventually resulting in new "A" copies. In either event the IREF/$\overline{\text{IREF}}$ control bit is set to indicate IREF, in preparation of the beginning of a new coordinate measurement cycle. Also, at this point the two firmware controlled Velocity Correction Timers (TT and TE) are cleared.

Referring now to FIG. 17C, the next activity is to extract the newly identified next word in the measurement control table, and "or" into it the current value of the IREF/$\overline{\text{IREF}}$ control latches. This involves a write-to-memory operation referencing location $12_8$. This actually starts the next measurement activity, unless that activity is CLEAR.

A CLEAR does not involve a measurement by the phase counter. Hence, it does not produce a subsequent DATA READY that will cause re-entry into the interrupt service subroutine to begin the next measurement. Such a situation would cause a deadlock. Hence, the flowchart traps a CLEAR just after it has been issued, and rather than leaving the subroutine, the subroutine is started over as if there had been an interrupt. The CLEAR operation is very fast anyway; CLEAR goes directly to the CLR inputs of the shift registers where it is acted upon without delay.

In the event that the upcoming operation was not a CLEAR the two timers (TT and TE) are updated, before the interrupt service subroutine is terminated to await the next DATA READY. Updating the timers is accomplished as follows.

The timers are each accumulators that represent the duration of various aspects of measurement. The timer TT represents the total time required to perform the entire measurement cycle, and is updated each time the interrupt service subroutine is used. The other timer TE represents only the time required to perform the y fine measurement.

Two genuine hardware timers could be used to some advantage in implementing TT and TE. However, other considerations resulted in the use of a single hardware timer that can time an interval of up to approximately 2.25 msec. The name of this hardware timer, as it appears in FIG. 17, is TI (Time Interval). TI is the timer 35 described in connection with FIG. 5A. Clearing, starting and reading TI involve both write-to-memory and read-from-memory operations referencing location $13_8$.

What is done is this. Each time the interrupt service subroutine is called upon the value in TI is used to augment the contents of the time accumulator TT, and if appropriate, TE also. Then TI is cleared and restarted in preparation for its use the next time the interrupt service subroutine is entered.

The specific use to which the time accumulators TT and TE are put is explained in detail in a subsequent section.

The Basic Point Processor, mentioned above in connection with FIG. 17, may be understood with reference to FIG. 18. That figure is a simplified flowchart of the Basic Point Processor. The first thing the Basic Point Processor does is average the values in the "B" copy of the Sample Table. This involves dividing the coarse values by four, and all others by twenty-one.

Next, the x coarse and x fine components, as identified in FIGS. 7 and 8, are combined. This is done as follows. First, the x reference value is removed from the measured x coarse and measured x fine values, in accordance with the principles explained in connection with FIGS. 10, 11, and 12. Then the coarse value is adjusted, if necessary, to be in agreement with the fine value, as explained in connection with FIG. 14. At this point the two values are actually combined as shown in FIG. 14, and the resulting sum is placed into the appropriate entry of the "C" copy of the Sample Table.

Following the computations for the x dimension, the identical procedures are followed for the y values.

The next activity is to correct the x coordinate for the effects of cursor motion during the measurement process that produced the values just used. The formula used to correct the coordinates is explained in connection with FIGS. 19, 20, and 21 below. Before proceeding to that explanation, however, it should be noted that such correction is only performed by the Basic Point Processor when there is a "good set" of immediately preceding coordinates. That is, velocity correction requires the use of the previous point, and a low signal or other catastrophic event (such as turn-on) must not occur between the current point and the previous one. Accordingly, a check is made to see if the current point is the first point following a low signal condition. If it is, velocity-related correction is not performed. In either case, the new x coordinate is saved for use as the old x during the next pass through the Basic Poing Processor.

Figure 19:
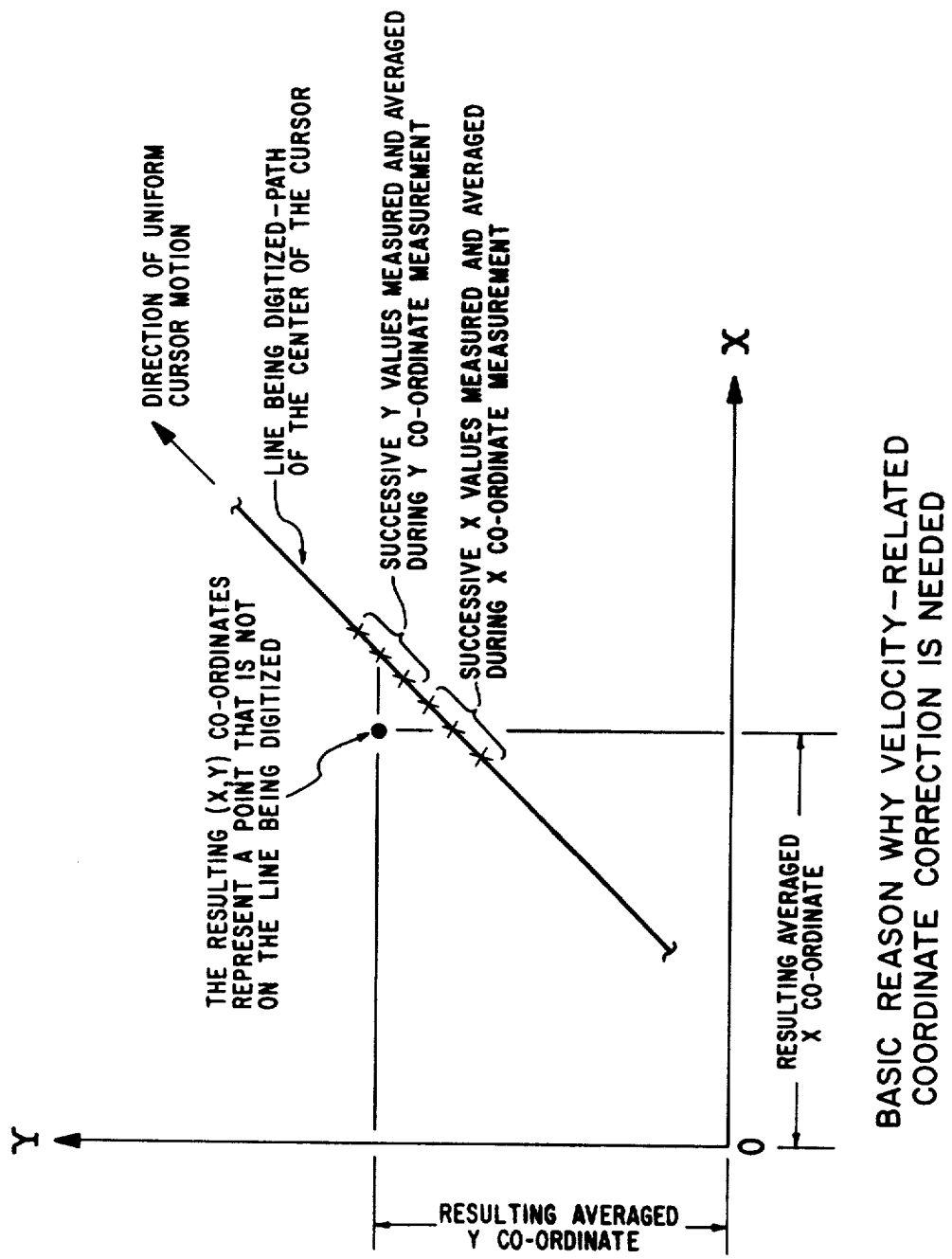
FIG. 19 is a diagram depicting the fundamental reason why cursor velocity-related coordinate correction is needed.

Referring now to FIG. 19, the basic reason why velocity-related coordinate correction is needed may be understood. That reason is that since x and y measurements are made separately, and involve repeated measurements for later averaging, cursor motion can cause the resulting x coordinate to correspond to one location on the line being digitized, while the resulting y coordinate corresponds to another. Taken together, that (x,y) pair does not represent a point on the line being digitized.

Figure 20:
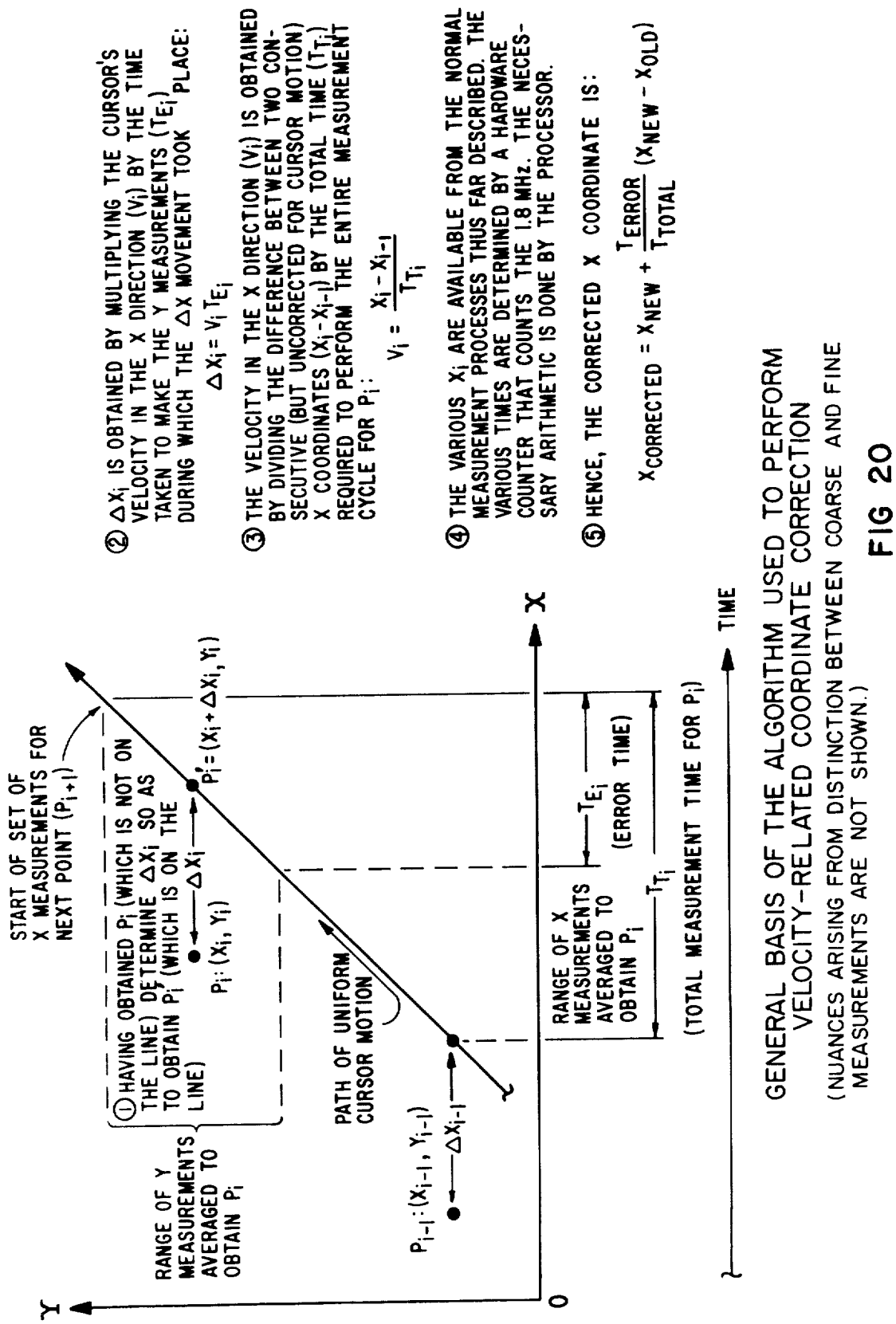
FIG. 20 is a diagram depicting the general nature of an algorithm used to correct for the problem shown in FIG. 19.

FIG. 20 is a general description of a solution to this problem. The solution is to correct the x coordinate, according to the cursor's velocity in the x dimension, so that the supplied (x,y) coordinate pair does represent a point on the line being digitized. The solution assumes that the velocities of the cursor in both dimensions are constant.

The velocity of the cursor in the x direction is found by dividing the difference between the x values of two consecutively digitized points by the time interval between taking the two points. This time is the value of TT mentioned in connection with FIG. 17. What TT represents, however, is not the time from the measurement of one x coordinate to the measurement of the next one. Instead, it is the time required for the entire (x,y) measurement sequence for the point to be corrected. This was easier to implement, and in most cases is sufficiently close to the x-to-x time to be used in its place.

It is recognized that the two times are not, in all cases identical. The interrupt service subroutine's ability to repeat AV ONE's and AV FOUR's may result in differences between the two times, as may the following consideration. Not all AV ONE's or AV FOUR's take the same amount of time, even if the shifting of $\phi$REF is disallowed. The processor's request for an AV ONE or AV FOUR is totally asynchronous to $\phi$REF. Thus, there is an unpredictable amount of delay in the start of each measurement, and there is absolutely no guarantee that the length of time for one particular AV ONE is the same as for any other AV ONE. On the average, however, the differences over the nominal six AV ONE's and the twenty-two AV FOUR's required for a complete coordinate measurement, tend to cancel.

Once the x velocity is obtained, it is used to determine how much to adjust the x coordinate. This is done by noting the time taken to make the y (fine) measurement. For it is during this time, called TE in FIG. 17, that the x coordinate and y coordinate can get out of step, so to speak. The distance by which the x coordinate is adjusted is found by multiplying TE by the x velocity. The x coordinate is then adjusted by that amount, as shown in FIG. 18.

Figure 21:
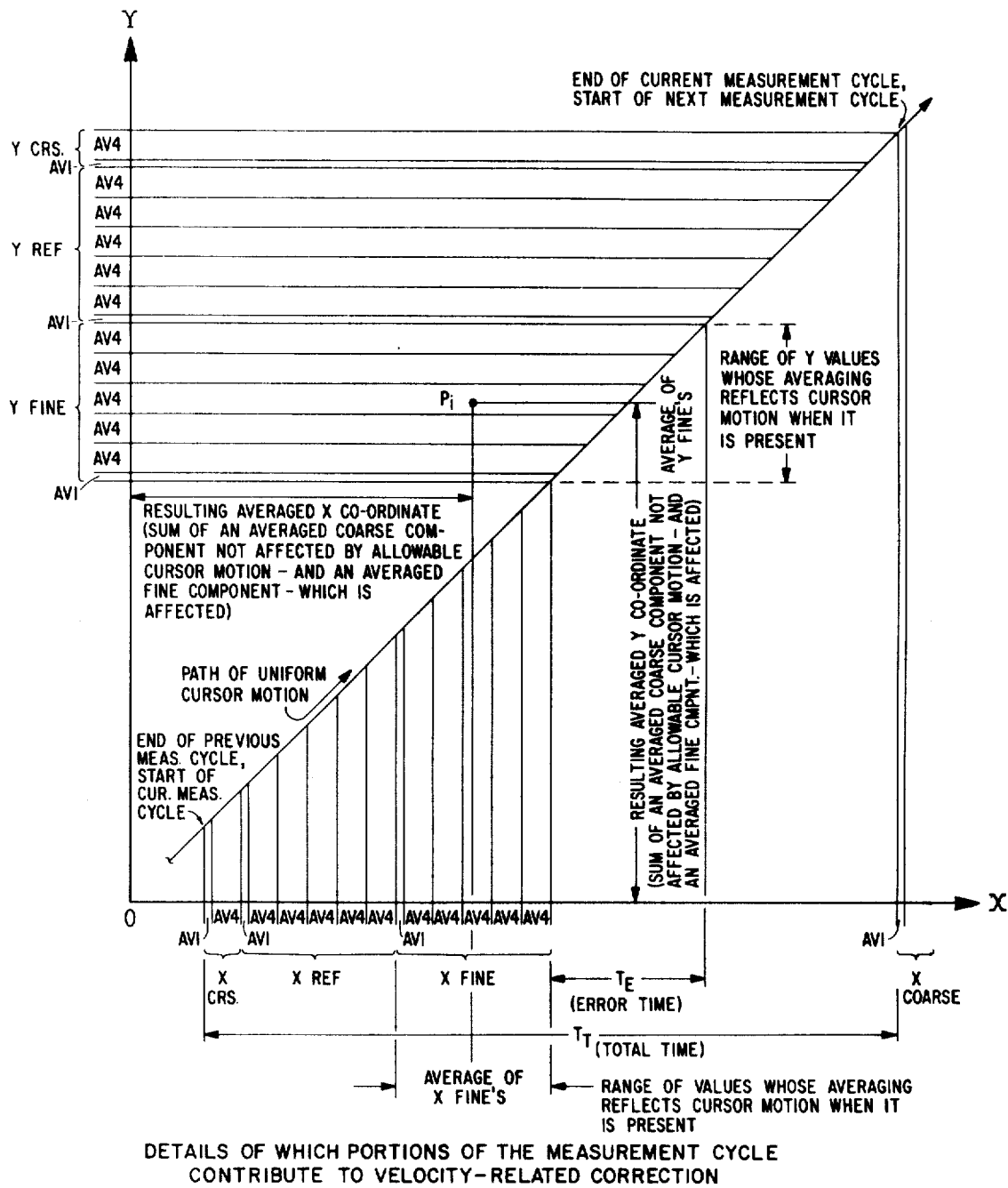
FIG. 21 is a diagram depicting some details of the algorithm of FIG. 20.

A more complete understanding of the relationship between TE and TT may be gained with reference to FIG. 21. Shown there is the sequence of measurement activity corresponding to the point whose x coordinate is to be corrected. TE is taken as the time required to do the y fine measurement only, and not as the entire y measurement time, for the following reason. It is assumed that the cursor velocity in the y direction is not so large that it will have an appreciable effect upon the y coarse measurement. That is, it is only the y fine measurement whose value changes when cursor motion is present, as compared to the same measurement with no cursor motion. The y coarse measurement, because of the restriction on y-direction velocity, and because of rounding to an equivalent number of fine cycles (see FIG. 14) will not change (except to maintain coarse/fine agreement as described in connection with FIG. 14). Now, by adjusting x, we are essentially making x track what variation occurred in y. But the above argument shows that it is only during the y fine measurement time that y varies. Hence the y fine measurement time is taken as TE.

As mentioned earlier, the digitizer incorporates a means to correct coordinates for the effects of non-perpendicularity of the x and y grids in the platen. Referring to FIG. 22, it may be seen that for any skew (i.e., non-perpendicularity) of the axes, it can be assumed that the y coordinate is correct, and that only the x coordinate need be adjusted. Further, referring to part three of FIG. 22, it can be seen that the corrected x coordinate $X_c$ is:

$$X_c = X_m/\cos\theta + Y_m \tan\theta$$

where:
$X_c$ is the corrected x
$X_m$ is the measured x
$\theta$ is the skew angle The embodiment is as follows. The skew angle is encoded in a 16-bit switch register 34 whose value the processor can obtain by doing a read-from-memory operation directed to location 11₈ (see FIG. 5A). The encoded value obtained is placed into a floating point representation of the skew angle that is then used by that portion of FIG. 16B labeled "Coordinate Finalization." What "Coordinate Finalization" does is employ the first three terms of the appropriate Taylor Series approximations to compute the terms necessary to find $X_c$.

The skew angle, which is determined at the time the platen is assembled and tested, is subsequently encoded into the switch register 34 as shown in FIG. 23. The angle is encoded, in radians, as a mantissa portion of a floating point number whose exponent is already chosen.

A summary of the various error reduction procedures incorporating arithmetic or logic performed by the processor is depicted in FIG. 24. Some of these error reduction procedures require corresponding hardware (e.g., the half-phase offset of $\phi$REF or the 16-bit skew angle switch register). FIG. 24 shows both the actual sequence used and the logical hierarchy of the procedures. By logical heirarchy is meant the necessary order in which the various procedures must be performed if they are to be valid. All of the error reduction concepts shown in FIG. 24 have been previously explained. They are shown collectively in FIG. 24 so that their relationships to one another may be better understood.

The physical and electrical nature of the platen incorporates an error reduction technique of its own, namely, the incorporation of redundant lines at the extremes of the platen. The location and physical nature of the redundant lines 19 is shown in FIGS. 3 and 6. The basic reason they are necessary is to solve the non-linearity problem shown in FIG. 25.

Figure 25:
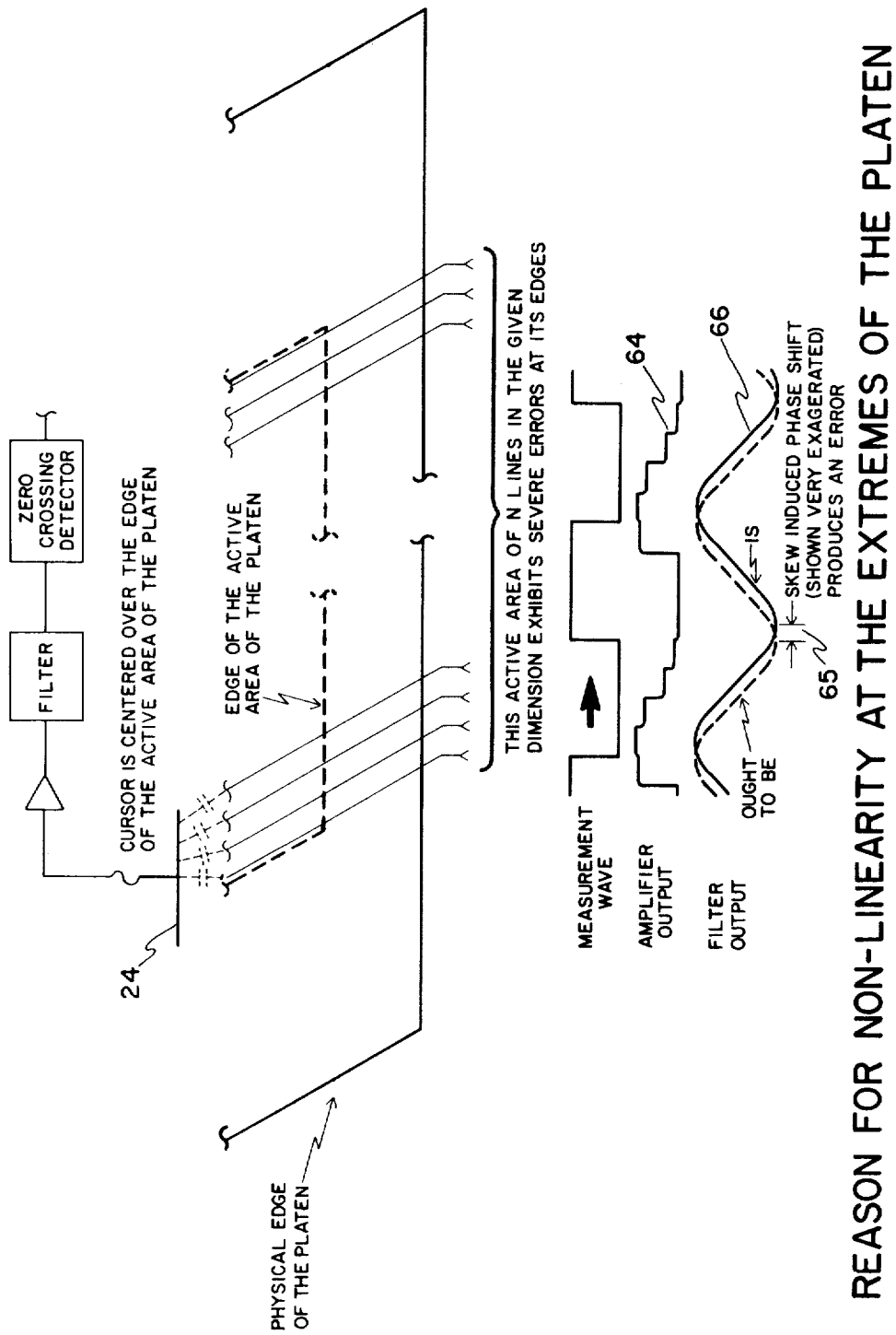
FIG. 25 is a diagram illustrating the reason for the inherent non-linearity of measurements taken at the extreme edges of the active area of the platen.

FIG. 25 shows why there is non-linearity at the ends of an N-line active area. What happens is that when the cursor's center is brought to the edge of the active area of the platen the amplified staircase signal 64 derived from the cursor becomes severely distorted. This produces a spurious phase shift 65 in the filter output 66. This phase shift induces an error in the resulting count in the phase counter.

The distortion in waveform 64 comes about because of the lack of drive lines under a portion of the cursor. This causes the measurement wave to appear abruptly to the pickup 24.

Figure 26:
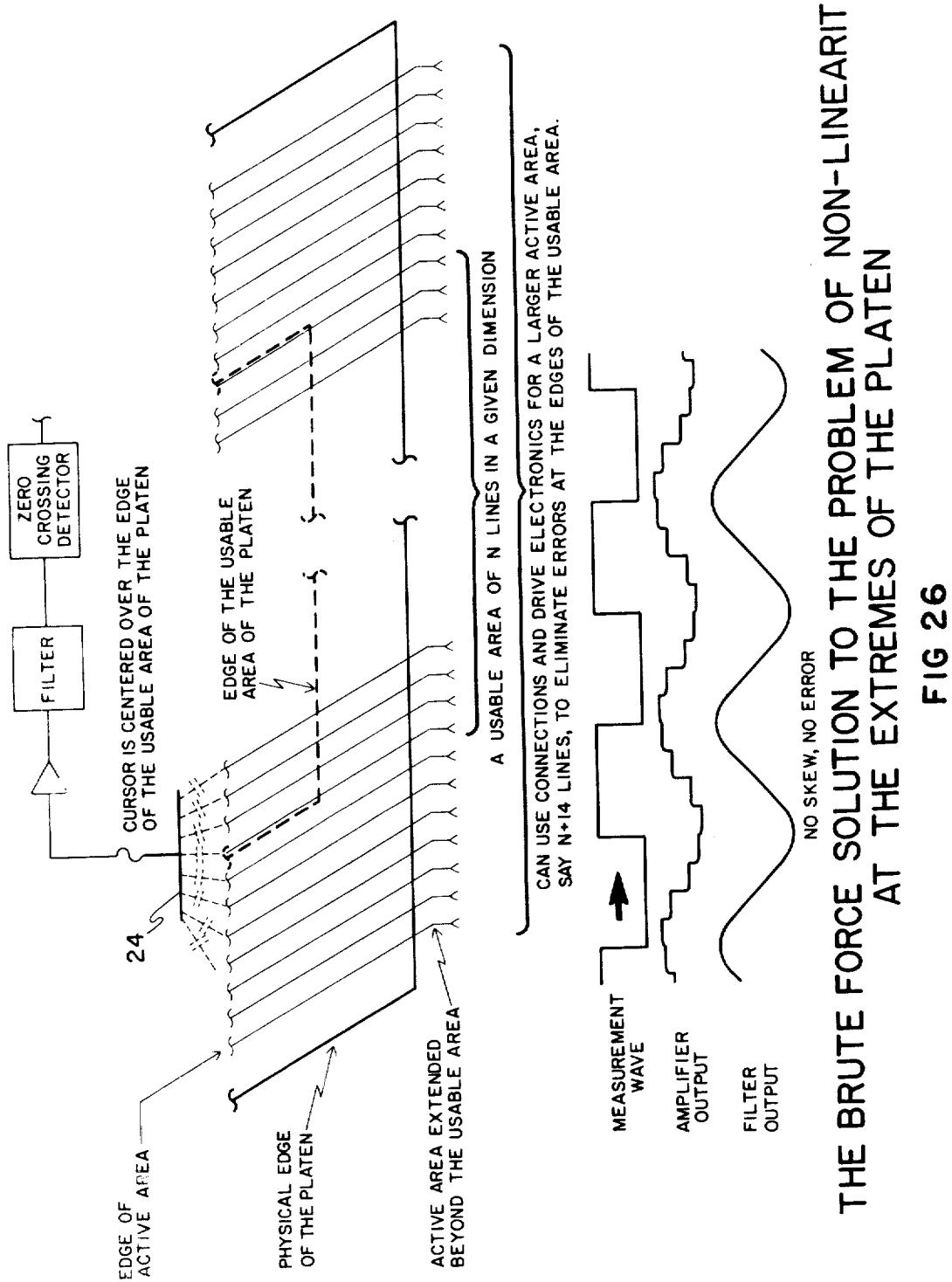
FIG. 26 is a diagram illustrating the "brute force" solution to the non-linearity problem of FIG. 25.

A "brute force" solution to the problem of the abrupt appearance of the measurement wave is shown in FIG. 26. There, the active area is extended well beyond either end of the desired usable area. Thus, as far as the pickup 24 can tell, it might as well be in the middle of the active area, even when it is on the edge of the usable area. The coupling capacitance from the pickup to the driven lines in the grid is sufficient to eliminate all distortion in the cursor signal, and remove the subsequent phase shift from the filter output. The only trouble with this solution is that it is wasteful of circuitry; each of the extra driven lines beyond the edge of usable area must have a shift register cell.

Figure 27:
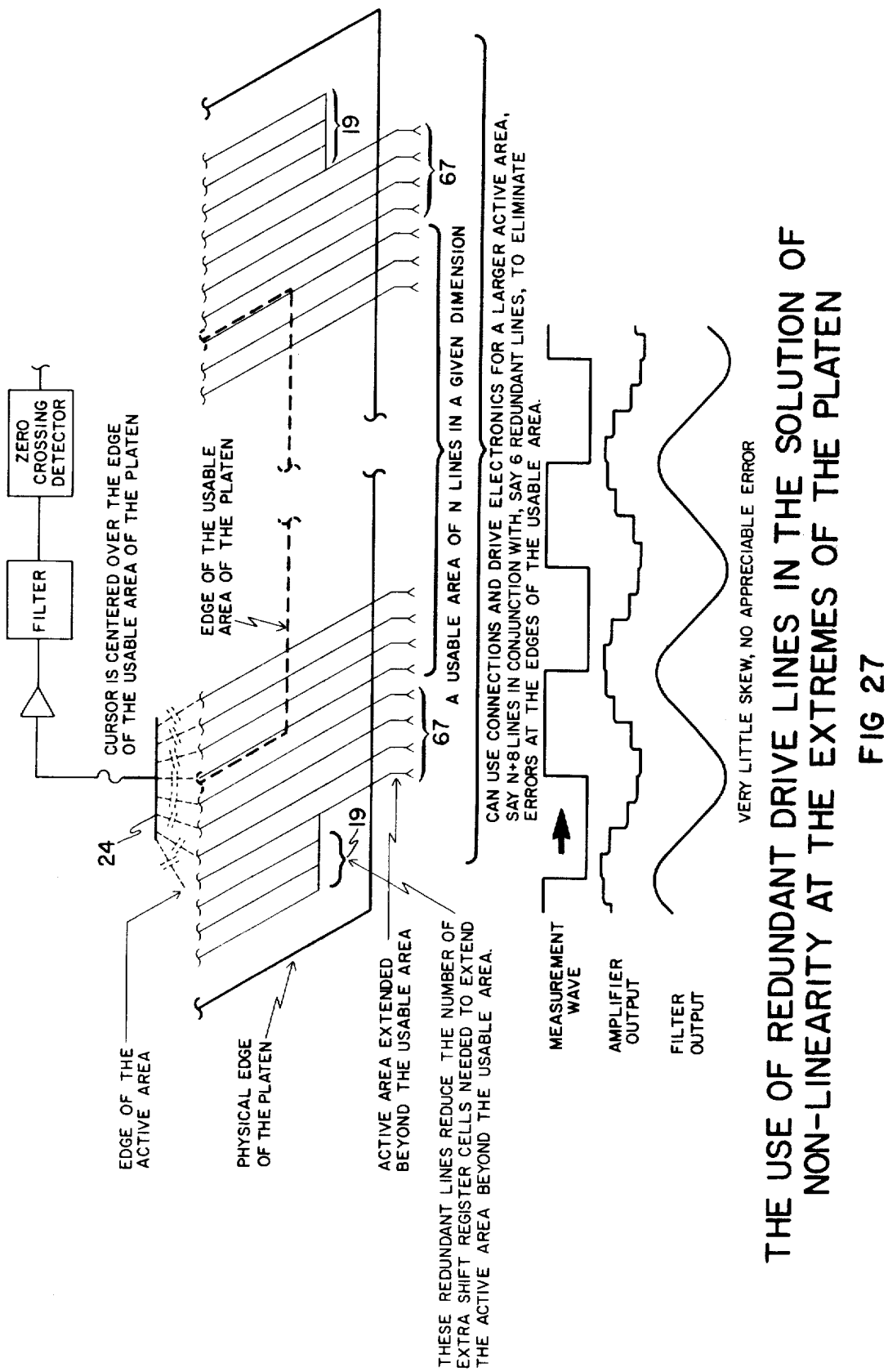
FIG. 27 is a diagram illustrating the use of "redundant" drive lines in the solution of the non-linearity problem of FIG. 25.

FIG. 27 illustrates how the use of redundant lines 19 may be used to gain the performance advantages of the method of FIG. 26, without incurring the need for as much extra circuitry. The redundant lines, when used in conjunction with a small number of extra regular lines 67, provide the needed coupling capacitance to keep the distortion in the cursor signal down to an acceptable amount. Compared with FIG. 26, however, fewer shift register cells are required. Or, for a given number of shift register cells available, the size of the usable area of the platen may be larger.

In the present embodiment the spacing between the adjacent redundant lines is 4 mm, as opposed to the 5 mm spacing between regular drive lines. This was done to save space at the edges of the platen. What is important is the amount of capacitance between the pickup and the redundant lines, not the spacing between the lines, per se.

While the present invention has been described in connection with a particular preferred embodiment thereof, it will become apparent to those persons skilled in the art that various modifications and applications are possible. It is desired, therefore, that the invention not be limited to the details of construction illustrated and described herein above, and it is intended by the appended claims to cover all modifications which fall within the spirit and scope of the invention.

For example, it is obvious that a digitizer could be constructed that uses the swept wave technique and wherein the x and y shift registers were simultaneously operated at different wavelengths. The resulting composite cursor signal would be separated by two filters, each of whose output would be sent to two separate phase counters, or to a single phase counter that selectively measures the x or y phase count. This would provide simultaneous digitizing of the x and y coordinates. Another obvious extension or modification of this invention is the replacement of the electro-static, or capacitive pickup, with a magnetic one. This would be possible in the following way. The unterminated end of each of the driven lines in the x and y grids within the platen would be either grounded or connected to a voltage source capable of supplying an appropriate amount of current. The x and y shift registers would then be modified, if necessary, to act as either current sources or current sinks, as appropriate. The essential element of the pickup would then become a magnetically coupled coil of wire, rather than a capacitively coupled disc.

Figure 28:
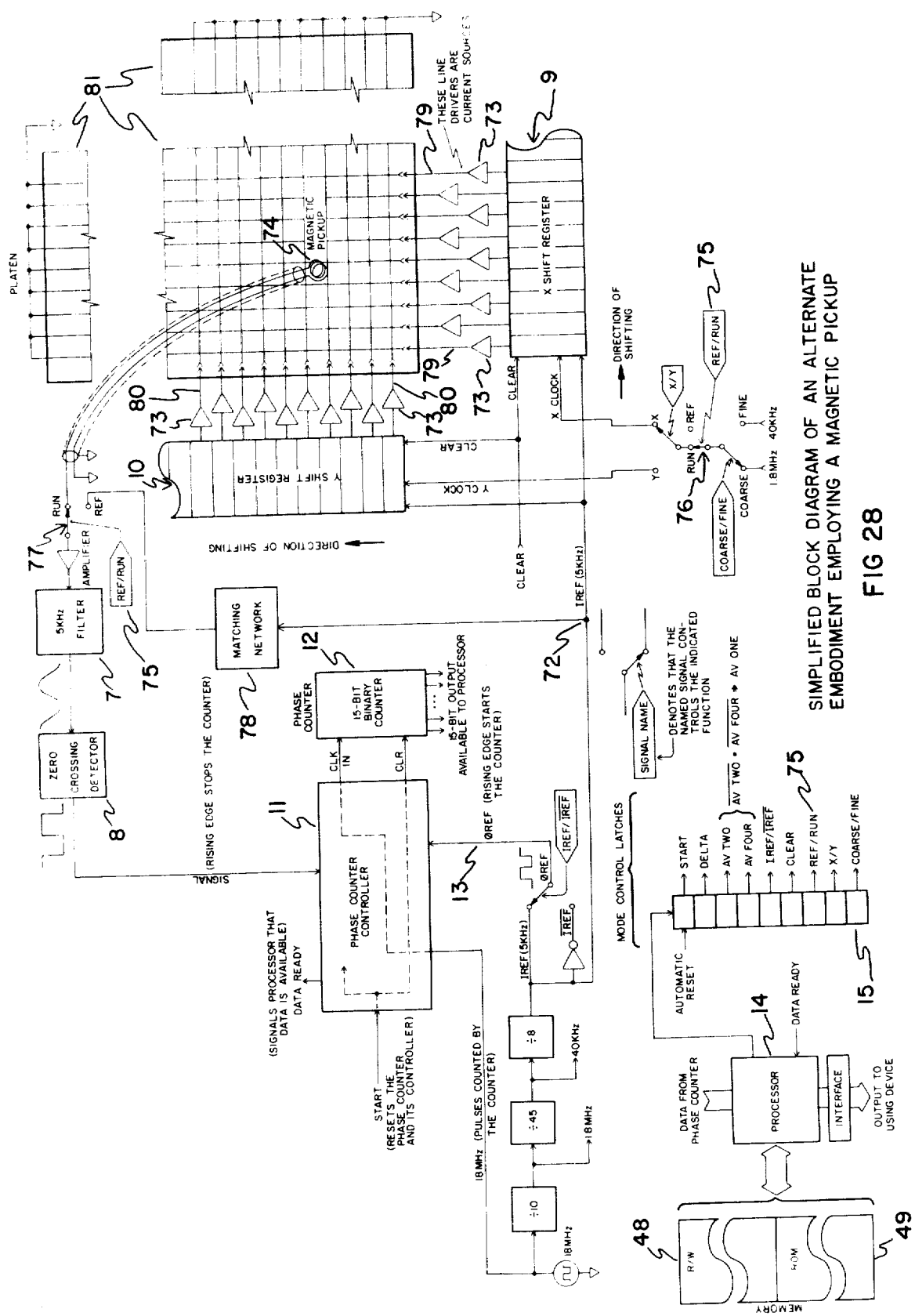
FIG. 28 is a simplified block diagram of an alternate embodiment of the digitizer of FIG. 1, incorporating a magnetic pickup.

FIG. 28 is a simplified block diagram illustrating one possible way of implementing the alternate magnetic embodiment. The shift registers 9 and 10 are now connected to the x drive lines 79 and the y drive lines 80 in the platen through current drivers 73. One current driver is employed for each conductor to be driven in the modified platen 81. Additionally, the drive lines 79 and 80 in the platen are no longer unterminated on the nondriven end. Instead, they are each grounded, so as to serve as a return path for the current supplied by the drivers 73. An equivalent alternate arrangement would be to run those ends to a current source, instead of to ground, and let the current drivers act as ground.

A good diameter for the magnetic pickup coil 74 would be half the wavelength of the fine measurement wave.

Some additional circuit changes are required to implement the magnetic embodiment, particularly in regards to the reference measurement. Because of the nature of the magnetic coupling between the pickup coil 74 and the grids in the platen, simultaneously driving an entire grid with IREF 72 will not induce a signal into the pickup coil 74. That requires a relative motion between the coil and a gradient in the incident magnetic field produced by the grid, and further, that such gradient exist within the space interior to the circumference of the coil. Simultaneous driving of all lines in a grid will not produce such a gradient.

Reference measurements of the amplifier and filter delay can still be made, however, by means of an additional signal REF/RUN 75, and additional swithching means 76 and 77. What REF/RUN does is cause switch 76 to suspend shifting of the active shift register. This is not absolutely necessary, but is a good practice to reduce noise in the system during the reference measurement. REF/RUN also causes, via switch 77, the amplifier/filter combination to receive the signal IREF via a matching network 78 consisting primarily of an attenuator, rather than receive the signal from the pickup. In this way, it is as if the pickup did have induced into it a reference signal, and the reference measurement can proceed.

Another variation of the invention concerns the method used to combine the coarse and fine components. In the preferred embodiment disclosed above the combining is done as follows. The coarse count is adjusted for agreement with the fine count, rounded and scaled to an equivelent fine count, and finally added to the fine count, after which the resulting sum is converted to a distance. All the combining arithmetic is done in terms of "counts" of the phase counter. Other embodiments are possible, wherein the coarse and fine components are first converted to either time or distance units before the coarse component is adjusted or combined with the fine component.

We claim:

1. Apparatus for digitizing the coordinate of a point along a measurement axis of a platen, the apparatus comprising:
    a platen having an ordered plurality of uniformly spaced separate parallel conductors each generally perpendicular to the measurement axis;
    clock signal means for generating a clock signal;
    reference signal means for producing a reference signal having half-wave symmetry and whose frequency is a submultiple of that of the clock signal;
    propagation circuit means coupled to receive both the clock signal and the reference signal and having an ordered plurality of outputs coupled in one-to-one correspondence to the separate parallel conductors of the platen for propagating across the platen at a rate of one conductor per cycle of the clock signal a half-wave symmetric electric field having transitions in intensity corresponding to the half-wave symmetry of the reference signal;
    a capacitive pickup positionable over the point whose coordinate is to be digitized, capacitively coupled thereat to the parallel conductors in the platen and providing a half-wave symmetric pickup signal of frequency equal to that of the reference signal as the half-wave symmetric electric field propagates across the platen and past the capacitive pickup;
    a filter tuned to reject harmonics of the reference signal and having an input coupled to the capacitive pickup for providing a filtered pickup signal at an output of the filter; and
    phase comparison means coupled to the output of the filter and to the reference signal means, for producing data corresponding to the phase difference between the filtered pickup signal and the reference signal.

2. Apparatus as in claim 1 wherein the wavelength of the propagated half-wave symmetric electric field is at least as long as the center-to-center distance between the two parallel conductors of the platen that are respectively connected to the first and last outputs in the ordered plurality of outputs of the propagation circuit means.

3. Apparatus as in claim 1 wherein the wavelength of the propagated half-wave symmetric electric field is shorter than the center-to-center distance between the two parallel conductors of the platen that are respectively connected to the first and last outputs in the ordered plurality of outputs of the propagation circuit means.

4. Apparatus as in claim 1 wherein the propagation circuit means further comprises a reference drive means for suspending the propagation of the half-wave symmetric electric field across the platen, and for causing instead of each of the outputs of the ordered plurality identical and simultaneous variations of voltage at the frequency of the reference signal.

5. Apparatus as in claim 1 further comprising reference measurement means coupled between the capacitive pickup and the input of the filter and also coupled to the reference signal means, the reference measurement means for selectively applying to the input of the filter a signal whose frequency equals that of the reference signal and whose phase is independent of the position of the capacitive pickup along the measurement axis.

6. Apparatus as in claim 1 further comprising phase reversal means coupled between the reference signal means and the phase comparison means and responsive to the data produced by the phase comparison means, for introducing a 180 degree phase shift into the reference signal supplied to the phase comparison means whenever the phase difference between the filtered pickup signal and the supplied reference signal is outside a preselected range.

7. Apparatus as in claim 1 further comprising timing signal means for producing a timing signal, and wherein:
    the timing signal has a frequency higher than the frequency of the clock signal; and
    the phase comparison means comprises a counter configured to count cycles of the timing signal between a transition in the reference signal and a corresponding transition in the filtered pickup signal.

8. Apparatus for digitizing the coordinate of a point along a measurement axis of a platen, the apparatus comprising:
    a platen having an ordered plurality of uniformly spaced separate parallel conductors each generally perpendicular to the measurement axis;

coarse clock signal means for generating a coarse clock signal;

fine clock signal means for producing a fine clock signal whose frequency is a submultiple of the frequency of the coarse clock signal;

reference signal means for producing a reference signal having half-wave symmetry and whose frequency is a submultiple of the frequency of the fine clock signal;

selection means coupled to the coarse clock signal means and to the fine clock signal means for producing a selected clock signal corresponding at separate times to each of the coarse and fine clock signals by coupling at separate times one of the coarse and fine clock signals to an output of the selection means;

propagation circuit means coupled to receive both the selected clock signal and the reference signal and having an ordered plurality of outputs coupled in one-to-one correspondence to the separate parallel conductors of the platen for propagating across the platen at a rate of one conductor per cycle of the selected clock signal a half-wave symmetric electric field having transitions in intensity corresponding to the half-wave symmetry of the reference signal and having at separate times coarse and fine wavelengths as the selected clock signal separately corresponds to the coarse and fine clock signals, respectively;

a capacitive pickup positionable over the point whose coordinate is to be digitized, capacitively coupled thereat to the parallel conductors in the platen and providing at separate times half-wave symmetric coarse and fine pickup signals each of frequency equal to that of the reference signal as the electric field having half-wave symmetric coarse and fine wavelengths propagates across the platen and past the capacitive pickup;

a filter tuned to reject harmonics of the reference signal and having an input coupled to the capacitive pickup for providing filtered coarse and fine pickup signals at an output of the filter; and phase comparison means coupled to the output of the filter and to the reference signal means, for producing at separate times data corresponding to the phase differences between the filtered coarse pickup signal and the reference signal and between the filtered fine pickup signal and the reference signal.

9. Apparatus as in claim 8 wherein the coarse wavelength of the propagated electric field is at least as long as the center-to-center distance between the two parallel conductors of the platen that are respectively connected to the first and last outputs in the ordered plurality of outputs of the propagation circuit means, and also wherein the fine wavelength of the propagated electric field is shorter than the center-to-center distance.

10. Apparatus as in claim 8 wherein the propagation circuit means further comprises a reference drive means for suspending the propagation of the half-wave symmetric electric field across the platen, and for causing instead at each of the outputs of the ordered plurality identical and simultaneous variations of voltage at the frequency of the reference signal.

11. Apparatus as in claim 8 further comprising reference measurement means coupled between the capacitive pickup and the input of the filter and also coupled to the reference signal means, the reference measurement means for selectively applying to the input of the filter a signal whose frequency equals that of the reference signal and whose phase is independent of the position of the capacitive pickup along the measurement axis.

12. Apparatus as in claim 8 further comprising phase reversal means coupled between the reference signal means and the phase comparison means and responsive to the data produced by the phase comparison means, for introducing a 180 degree phase shift into the reference signal supplied to the phase comparison means whenever the phase difference between the filtered pickup signal and the supplied reference signal is outside a preselected range.

13. Apparatus as in claim 8 further comprising timing signal means for producing a timing signal, and wherein:

the timing signal has a frequency that is higher than the frequency of the coarse clock signal; and the phase comparison means comprises a counter configured to count cycles of the timing signal between a transition in the reference signal and a correspondng transition in the filtered pickup signal.

14. A circuit for propagating differing wavelength portions of an electric field across a surface containing an ordered plurality of conductors, the circuit comprising:

first clock signal means for generating a first clock signal;

second clock signal means for generating a second clock signal having a frequency different than the frequency of the first clock signal;

third clock signal means for generating a third clock signal having a frequency less than the frequency of the first clock signal and also less than the frequency of the second clock signal;

selection means coupled to the first clock signal means and to the second clock signal means, for producing a selec⊾d clock signal corresponding at separate times to each of the first and second clock signals by coupling at separate times one of the first and second clock signals to an output of the selection means;

propagation circuit means coupled to receive both the selected clock signal and the third clock signal and having an ordered plurality of outputs coupled in one-to-one correspondence to the ordered plurality of conductors for propagating across the surface at a rate of one conductor per cycle of the selected clock signal an electric field having transitions in intensity corresponding to transitions in the third clock signal and having at separate times first and second wavelengths as the selected clock signal separately corresponds to the first and second clock signals, respectively.

15. A method of propagating a half-wave symmetric electric field across a surface containing an ordered plurality of uniformly spaced conductors, comprising the steps of:

driving each conductor with a voltage corresponding to the logical value of a bit in an ordered sequence of bits in one-to-one correspondence with the ordered plurality of conductors; and shifting by one bit at a time along the ordered sequence of bits an integral number of consecutive logical ones in alternation with an equal number of consecutive logical zeros, with equal intervening time intervals between each shift.

16. A method of propagating differing wavelength half-wave symmetric portions of an electric field across a surface containing an ordered plurality of uniformly spaced conductors, comprising the steps of:
  driving each conductor with a voltage corresponding to the logical value of a bit in an ordered sequence of bits in one-to-one correspondence with the ordered plurality of conductors;
  shifting by one bit at a time along the ordered sequence of bits a first integral number of consecutive logical ones in alternation with an equal number of consecutive logical zeros, with equal intervening first time intervals between each such shift; and
  shifting by one bit at a time along the ordered sequence of bits a second integral number of consecutive logical ones in alternation with an equal number of consecutive logical zeros, with equal intervening second time intervals between each such shift.

17. A method of determining the distance of a cursor along a measurement axis comprising the steps of:
  a. propagating along the measurement axis a plurality of cycles of a half-wave symmetric electric field;
  b. coupling the cursor to the propagating half-wave symmetric electric field to produce an AC signal having half-wave symmetry;
  c. filtering the AC signal;
  d. measuring the phase difference between a reference signal and the filtered AC signal; and
  e. diminishing the measured phase difference by an amount corresponding to the fractional portion of the delay in excess of an integral number of cycles of the AC signal through the filter.

18. A method of determining the distance of a cursor along a measurement axis comprising the steps of:
  a. propagating along the measurement axis a plurality of cycles of a half-wave symmetric electric field;
  b. coupling the cursor to the propagating half-wave symmetric electric field to produce an AC signal having half-wave symmetry;
  c. filtering the AC signal;
  d. measuring the phase difference between a reference signal and the filtered AC signal;
  e. measuring the fractional portion of the delay in excess of an integral number of cycles of the AC signal through the filter; and
  f. diminishing the measured phase difference by an amount corresponding to the measured fractional portion of the delay through the filter.

19. A method of determining the distance of a cursor along a measurement axis comprising the steps of:
  a. in alternation with step b below, propagating along the measurement axis at a first rate a plurality of half-wave symmetric cycles of a coarse electric field having a first wavelength longer than the longest distance to be determined;
  b. in alternation with step a above, propagating along the measurement axis at a second rate a plurality of half-wave symmetric cycles of a fine electric field having a second wavelength that is an aliquot portion of the first wavelength, the ratio of the first rate to the first wavelength equalling the ratio of the second rate to the second wavelength;
  c. coupling the cursor to the propagating electric fields to produce coarse and fine AC signals each of the same frequency and each having half-wave symmetry;
  d. filtering the coarse and fine AC signals;
  e. measuring the respective coarse and fine phase differences between a reference signal and each of the filtered coarse and fine AC signals;
  f. diminishing each of the measured coarse and fine phase differences by an amount corresponding to the fractional portion of the delay in excess of an integral number of cycles of the coarse and fine AC signals through the filter; and
  g. combining the diminished coarse and fine phase differences.

20. A method of determining the distance of a cursor along a measurement axis comprising the steps of:
  a. in alternation with step b below, propagating along the measurement axis at a first rate a plurality of half-wave symmetric cycles of a coarse electric field of a first wavelength longer than the longest distance to be determined;
  b. in alternation with step a above, propagating along the measurement axis at a second rate a plurality of half-wave symmetric cycles of a fine electric field of a second wavelength that is an aliquot portion of the first wavelength, the ratio of the first rate to the first wavelength equalling the ratio of the second rate to the second wavelength;
  c. coupling the cursor to the propagating electric fields to produce coarse and fine AC signals each of the same frequency and having half-wave symmetry;
  d. filtering the coarse and fine AC signals;
  e. measuring the respective coarse and fine phase differences between a reference signal and each of the filtered coarse and fine AC signals;
  f. measuring the fractional portion of the delay in excess of an integral number of cycles of the coarse and fine AC signals through the filter;
  g. diminishing each of the measured coarse and fine phase differences by an amount corresponding to the measured fractional portion of the delay through the filter; and
  h. combining the diminished coarse and fine phase differences.

21. In a digitizer having a filter responsive to an output signal from a cursor coupled to one or more conductors in a platen, a method of determining for a given frequency the remainder of the filter delay in excess of n periods of the given frequency, $n = 0, 1, 2, 3, \ldots$, the method comprising the steps of:
  simultaneously energizing in the platen all conductors associated with measurement in at least one dimension with a reference signal of the given frequency, to produce from the cursor an output signal whose phase is independent of the cursor location upon the platen;
  filtering the output signal; and
  measuring the phase difference between the filtered output signal and the reference signal.

22. Apparatus for digitizing the coordinate of a point along a measurement axis of a platen, the apparatus comprising:
  a platen having an ordered plurality of uniformly spaced separate parallel conductors each generally perpendicular to the measurement axis;
  clock signal means for generating a clock signal;

reference signal means for producing a reference signal having half-wave symmetry and whose frequency is a submultiple of that of the clock signal;

propagation circuit means coupled to receive both the clock signal and the reference signal and having an ordered plurality of outputs coupled in one-to-one correspondence to the separate parallel conductors of the platen for propagating across the platen at a rate of one conductor per cycle of the clock signal a half-wave symmetric magnetic field having transitions in intensity corresponding to the half-wave symmetry of the reference signal;

an inductive pickup positionable over the point whose coordinate is to be digitized, inductively coupled thereat to the parallel conductors in the platen and providing a half-wave symmetric pickup signal of frequency equal to that of the reference signal as the half-wave symmetric magnetic field propagates across the platen and past the inductive pickup;

a filter tuned to reject harmonics of the reference signal and having an input coupled to the inductive pickup for providing a filtered pickup signal at an output of the filter; and phase comparison means coupled to the output of the filter and to the reference signal means, for producing data corresponding to the phase difference between the filtered pickup signal and the reference signal.

23. Apparatus as in claim 22 wherein the wavelength of the propagated half-wave symmetric magnetic field is at least as long as the center-to-center distance between the two parallel conductors of the platen that are respectively connected to the first and last outputs in the ordered plurality of outputs of the propagation circuit means.

24. Apparatus as in claim 22 wherein the wavelength of the propagated half-wave symmetric magnetic field is shorter than the center-to-center distance between the two parallel conductors of the platen that are respectively connected to the first and last outputs in the ordered plurality of outputs of the propagation circuit means.

25. Apparatus as in claim 22 further comprising reference measurement means coupled between the magnetic pickup and the input of the filter and also coupled to the reference signal means, the reference measurement means for selectively applying to the input of the filter a signal whose frequency equals that of the reference signal and whose phase is independent of the position of the inductive pickup along the measurement axis.

26. Apparatus as in claim 22 further comprising phase reversal means coupled between the reference signal means and the phase comparison means and responsive to the data produced by the phase comparison means, for introducing a 180 degree phase shift into the reference signal supplied to the phase comparison means whenever the phase difference between the filtered pickup signal and the supplied reference signal is outside a preselected range.

27. Apparatus as in claim 22 further comprising timing signal means for producing a timing signal, and wherein:

the timing signal has a frequency higher than the frequency of the clock signal; and the phase comparison means comprises a counter configured to count cycles of the timing signal between a transition in the reference signal and a corresponding transition in the filtered pickup signal.

28. Apparatus for digitizing the coordinate of a point along a measurement axis of a platen, the apparatus comprising:

a platen having an ordered plurality of uniformly spaced separate parallel conductors each generally perpendicular to the measurement axis;

coarse clock signal means for generating a coarse clock signal;

fine clock signal means for producing a fine clock signal whose frequency is a submultiple of the frequency of the coarse clock signal;

reference signal means for producing a reference signal having half-wave symmetry and whose frequency is a submultiple of the frequency of the fine clock signal;

selection means coupled to the coarse clock signal means and to the fine clock signal means for producing a selected clock signal corresponding at separate times to each of the coarse and fine clock signals by coupling at separate times one of the coarse and fine clock signals to an output of the selection means;

propagation circuit means coupled to receive both the selected clock signal and the reference signal and having an ordered plurality of outputs coupled in one-to-one correspondence to the separate parallel conductors of the platen for propagating across the platen at a rate of one conductor per cycle of the selected clock signal a half-wave symmetric magnetic field having transitions in intensity corresponding to the half-wave symmetry of the reference signal and having at separate times coarse and fine wavelengths as the selected clock signal separately corresponds to the coarse and fine clock signals, respectively;

an inductive pickup positionable over the point whose coordinate is to be digitized, inductively coupled thereat to the parallel conductors in the platen and providing at separate times half-wave symmetric coarse and fine pickup signals each of frequency equal to that of the reference signal as the magnetic field having half-wave symmetric coarse and fine wavelengths propagates across the platen and past the inductive pickup;

a filter tuned to reject harmonics of the reference signal and having an input coupled to the inductive pickup for providing filtered coarse and fine pickup signals at an output of the filter; and phase comparison means coupled to the output of the filter and to the reference signal means, for producing at separate times data corresponding to the phase differences between the filtered coarse pickup signal and the reference signal and between the filtered fine pickup signal and the reference signal.

29. Apparatus as in claim 28 wherein the coarse wavelength of the propagated magnetic field is at least as long as the center-to-center distance between the two parallel conductors of the platen that are respectively connected to the first and last outputs in the ordered plurality of outputs of the propagation circuit means, and also wherein the fine wavelength of the propagated magnetic field is shorter than the center-to-center distance.

30. Apparatus as in claim 28 further comprising reference measurement means coupled between the inductive pickup and the input of the filter and also coupled to the reference signal means, the reference measurement means for selectively applying to the input of the filter a signal whose frequency equals that of the reference signal and whose phase is independent of the position of the inductive pickup along the measurement axis.

31. Apparatus as in claim 28 further comprising phase reversal means coupled between the reference signal means and the phase comparison means and responsive to the data produced by the phase comparison means, for introducing a 180 degree phase shift into the reference signal supplied to the phase comparison means whenever the phase difference between the filtered pickup signal and the supplied reference signal is outside a preselected range.

32. Apparatus as in claim 28 further comprising timing signal means for producing a timing signal, and wherein:
   the timing signal has a frequency that is higher than the frequency of the coarse clock signal; and
   the phase comparison means comprises a counter configured to count cycles of the timing signal between a transition in the reference signal and a corresponding transition in the filtered pickup signal.

33. A circuit for propagating differing wavelength portions of a magnetic field across a surface containing an ordered plurality of conductors, the circuit comprising:
   first clock signal means for generating a first clock signal;
   second clock signal means for generating a second clock signal having a frequency different than the frequency of the first clock signal;
   third clock signal means for generating a third clock signal having a frequency less than the frequency of the first clock signal and also less than the frequency of the second clock signal;
   selection means coupled to the first clock signal means and to the second clock signal means, for producing a selected clock signal corresponding at separate times to each of the first and second clock signals by coupling at separate times one of the first and second clock signals to an output of the selection means;
   propagation circuit means coupled to receive both the selected clock signal and the third clock signal and having an ordered plurality of outputs coupled in one-to-one correspondence to the ordered plurality of conductors for propagating across the surface at a rate of one conductor per cycle of the selected clock signal a magnetic field having transitions in intensity corresponding to transitions in the third clock signal and having at separate times first and second wavelengths as the selected clock signal separately corresponds to the first and second clock signals, respectively.

34. A method of propagating a half-wave symmetric magnetic field across a surface containing an ordered plurality of uniformly spaced conductors, comprising the steps of:
   driving each conductor with a current corresponding to the logical value of a bit in an ordered sequence of bits in one-to-one correspondence with the ordered plurality of conductors; and
   shifting by one bit at a time along the ordered sequence of bits an integral number of consecutive logical ones in alternation with an equal number of consecutive logical zeros, with equal intervening time intervals between each shift.

35. A method of propagating differing wavelength half-wave symmetric portions of a magnetic field across a surface containing an ordered plurality of uniformly spaced conductors, comprising the steps of:
   driving each conductor with a current corresponding to the logical value of a bit in an ordered sequence of bits in one-to-one correspondence with the ordered plurality of conductors.
   shifting by one bit at a time along the ordered sequence of bits a first integral number of consecutive logical ones in alternation with an equal number of consecutive logical zeros, with equal intervening first time intervals between each such shift; and
   shifting by one bit at a time along the ordered sequence of bits a second integral number of consecutive logical ones in alternation with an equal number of consecutive logical zeros, with equal intervening second time intervals between each such shift.

36. A method of determining the distance of a cursor along a measurement axis comprising the steps of:
   a. propagating along the measurement axis a plurality of cycles of a half-wave symmetric magnetic field;
   b. coupling the cursor to the propagating half-wave symmetric magnetic field to produce an AC signal having half-wave symmetry;
   c. filtering the AC signal;
   d. measuring the phase difference between a reference signal and the filtered AC signal; and
   e. diminishing the measured phase difference by an amount corresponding to the fractional portion of the delay in excess of an integral number of cycles of the AC signal through the filter.

37. A method of determining the distance of a cursor along a measurement axis comprising the steps of:
   a. propagating along the measurement axis a plurality of cycles of a half-wave symmetric magnetic field;
   b. coupling the cursor to the propagating half-wave symmetric magnetic field to produce an AC signal having half-wave symmetry;
   c. filtering the AC signal;
   d. measuring the phase difference between a reference signal and the filtered AC signal;
   e. measuring the fractional portion of the delay in excess of an integral number of cycles of the AC signal through the filter; and
   f. diminishing the measured phase difference by an amount corresponding to the measured fractional portion of the delay through the filter.

38. A method of determining the distance of a cursor along a measurement axis comprising the steps of:
   a. in alternation with step b below, propagating along the measurement axis at a first rate a plurality of half-wave symmetric cycles of a coarse magnetic field having a first wavelength longer than the longest distance to be determined;
   b. in alternation with step a above, propagating along the measurement axis at a second rate a plurality of half-wave symmetric cycles of a fine magnetic field having a second wavelength that is an aliquot portion of the first wavelength, the ratio of the first rate to the first wavelength equalling the ratio of the second rate to the second wavelength;

c. coupling the cursor to the propagating magnetic fields to produce coarse and fine AC signals each of the same frequency and each having half-wave symmetry;

d. filtering the coarse and fine AC signals;

e. measuring the respective coarse and fine phase differences between a reference signal and each of the filtered coarse and fine AC signals;

f. diminishing each of the measured coarse and fine phase differences by an amount corresponding to the fractional portion of the delay in excess of an integral number of cycles of the coarse and fine AC signals through the filter; and g. combining the diminished coarse and fine phase differences.

39. A method of determining the distance of a cursor along a measurement axis comprising the steps of:

a. in alternation with step b below, propagating along the measurement axis at a first rate a plurality of half-wave symmetric cycles of a coarse magnetic field of a first wavelength longer than the longest distance to be determined;

b. in alternation with step a above, propagating along the measurement axis at a second rate a plurality of half-wave symmetric cycles of a fine magnetic field of a second wavelength that is an aliquot portion of the first wavelength, the ratio of the first rate to the first wavelength equalling the ratio of the second rate to the second wavelength;

c. coupling the cursor to the propagating magnetic fields to produce coarse and fine AC signals each of the same frequency and having half-wave symmetry;

d. filtering the coarse and fine AC signals;

e. measuring the respective coarse and fine phase differences between a reference signal and each of the filtered coarse and fine AC signals;

f. measuring the fractional portion of the delay in excess of an integral number of cycles of the coarse and fine AC signals through the filter;

g. diminishing each of the measured coarse and fine phase differences by an amount corresponding to the measured fractional portion of the delay through the filter; and h. combining the diminished coarse and fine phase differences.

40. In a digitizer having a filter responsive to an output signal from a cursor coupled to one or more conductors in a platen, a method of determining for a given frequency the remainder of the filter delay in excess of n periods of the given frequency, n=0, 1,2,3, . . . , the method comprising the steps of:

coupling a reference signal of the given frequency to the input of the filter in place of the signal from the cursor; and measuring the phase difference between the reference signal and the output of the filter.

41. A method of error reduction while combining measured coarse and fine components of the distance to a cursor along a measurement axis comprising the steps of:

a. measuring the coarse component with sufficient resolution to allow prediction of the fine component;

b. measuring the fine component;

c. converting the coarse component into an equivalent integral number n of maximum length fine distance units plus a remainder portion r corresponding to a fractional amount of a fine distance unit;

d. incrementing the integral number n by one whenever both the measured fine component is less than a preselected first lower limit and the remainder portion r is greater than a preselected first upper limit;

e. decrementing the integral number n by one whenever both the measured fine component is greater than a preselected second upper limit and the remainder portion r is less than a preselected second lower limit; and f. after steps a through e, combining the measured fine component with the product of a weighting factor times the value of the integral number n.

42. A digitizer providing cartesian coordinates corrected for motion of a cursor traveling along a path upon a platen, the digitizer comprising:

coordinate measurement means for measuring abscissas and ordinates in alternate succession, and determining consecutive abscissa and ordinate pairs representing points dissociated from the path traveled by the cursor;

velocity determination means, responsive to the consecutive abscissa and ordinate pairs, for determining a quantity indicative of the velocity of the cursor; and coordinate correction means, responsive to the consecutive abscissa and ordinate pairs and to the quantity indicative of the velocity of the cursor, for correcting consecutive abscissa and ordinate pairs to correspond to points located on the path traveled by the cursor.

43. A digitizer providing cartesian coordinate sets, each set including first and second elements defining magnitude, the digitizer comprising:

a digitizing surface upon which coordinate sets may be digitized;

cursor means movable along a path, for selecting points on the digitizing surface;

measurement control means for repetitively indicating sequences of first and second periods of time;

first axis measurement means responsive to the position of the cursor during the first period of time for determining the first element of a coordinate set;

second axis measurement means responsive to the position of the cursor during the second period of time for determining the second element of said last named coordinate set;

coordinate means repetitively responsive to the first and second axis measurement means for providing a sequence of coordinate sets uncorrected for cursor motion;

offset determination means responsive to the sequence of coordinate sets from the coordinate means for determining the amount by which one element of a coordinate set must be corrected in a direction parallel to the axis of said one element to provide the coordinate set of a point on the path described by the motion of the cursor; and offset correction means responsive to the offset determination means and to the coordinate means for correcting said one element by the amount provided by the offset determination means, thereby providing a coordinate set corrected for cursor motion.

44. A method by which digitized cartesian coordinates of a cursor location having ordinate and abscissa dimensions are corrected for errors produced by motion of the cursor during the digitization of the coordinates, comprising the steps of:
digitizing ordinate and abscissa dimensions in alternate succession;
determining the velocity of the cursor along one of said ordinate and abscissa dimensions; and
correcting said one digitized dimension by an amount equal to the product of said cursor velocity by the time required to digitize the other of said dimensions.

45. A method as in claim 44 wherein the step of digitizing the ordinate and abscissa dimensions includes the step of averaging a series of consecutively obtained values to produce the value of the dimension prior to its use in the steps for the correction of errors due to cursor motion.

46. A method by which digitized cartesian coordinates of a cursor location having ordinate and abscissa dimensions, each including coarse and fine components, are corrected for errors produced by motion of the cursor during the digitization of the coordinates, comprising the steps of:
digitizing ordinate and abscissa dimensions in alternate succession;
determining the velocity of the cursor along one of said ordinate and abscissa dimensions; and
correcting said one digitized dimension by an amount equal to the product of said cursor velocity by the time required to digitize the fine component of the other of said dimensions.

47. A method as in claim 46 wherein the step of digitizing the ordinate and abscissa dimensions includes the step of averaging a series of consecutively obtained values for at least one of the coarse and fine components.

48. Apparatus for digitizing cartesian coordinates of a point located on a platen and correcting them for error produced by non-orthogonality of grids within said platen, the apparatus comprising:
first coordinate measurement means for determining a first element of a coordinate set for a point located on said platen;
second coordinate measurement means for determining a second element of said coordinate set for said point;
skew angle encoder means for storing a predetermined quantity indicative of the degree of non-orthogonality between grids within said platen; and
coordinate correction means, responsive to the first and second coordinate measurement means and to the skew angle encoder means, for correcting one of said first and second elements of said coordinate set to obtain a cartesian coordinate set corrected for grid non-orthogonality.

49. A method of correcting digitized coordinates for errors produced by non-orthogonality of grids in a platen, comprising the steps of:
ascertaining the error angle by which the grids are non-orthogonal;
digitizing an uncorrected abscissa and ordinate; and
calculating a corrected abscissa equal to the sum obtained by finding the product of the uncorrected ordinate multiplied by the tangent of the error angle, finding the quotient of the uncorrected abscissa divided by the cosine of the error angle, and then adding the product to the quotient.

50. A method of correcting digitized coordinates for errors produced by non-orthogonality of grids in a platen, comprising the steps of:
ascertaining the error angle by which the grids are non-orthogonal;
digitizing an uncorrected abscissa and ordinate; and
calculating a corrected ordinate equal to the sum obtained by finding the product of the uncorrected abscissa multiplied by the tangent of the error angle, finding the quotient of the uncorrected ordinate divided by the cosine of the error angle, and then adding the product to the quotient.

51. A digitizer platen comprising:
a series of parallel active conductors having a first active conductor at one extreme of the series and a last active conductor at the other extreme of the series;
a first section of at least one conductor, the first section being outside the series of parallel active conductors and adjacent to the first active conductor, each conductor of the first section being parallel with and electrically connected to the first active conductor; and
a second section of at least one conductor, the second section being outside the series of parallel active conductors and adjacent to the last active conductor, each conductor of the second section being parallel with and electrically connected to the last active conductor.

52. A method of reducing error in a coordinate digitized at an extremity of a digitizing platen incorporating a series of selectively energized parallel active conductors, the method comprising the step of energizing at least one additional conductor, located at said extremity and parallel to said collection, whenever the active conductor nearest said extremity is energized.

53. A method of reducing error due to cursor motion while sequentially digitizing coarse and fine components for first and second elements of cartesian coordinates, comprising the steps of:
digitizing a coarse component of a first element of a cartesian coordinate;
digitizing a fine component of said first element;
digitizing without delay a fine component of a second element of said cartesian coordinate; and
digitizing a coarse component of said second element.

54. A method of sequentially digitizing coarse, fine, and reference components for first and second elements of cartesian coordinates, comprising the steps of:
digitizing a coarse component of a first element of a cartesian coordinate;
digitizing a reference component of said first element;
digitizing a fine component of said first element;
digitizing a fine component of a second element of said cartesian coordinate;
digitizing a reference component of said second element; and
digitizing a coarse component of said second element.

* * * * *

UNITED STATES PATENT AND TRADEMARK OFFICE
CERTIFICATE OF CORRECTION

PATENT NO. : 4,255,617
DATED : March 10, 1981
INVENTOR(S) : Frank P. Carau, Sr., Henry T. Hetzel, and Michael A. Tremblay It is certified that error appears in the above—identified patent and that said Letters Patent is hereby corrected as shown below:

Column 4, line 67, "process" should be --processor--;

Column 8, line 36, "KHz" should be --kHz--;

Column 9, line 43, "KHz" should be --kHz--;

Column 9, line 59, "shifter" should be --shift--;

Column 10, line 5, "be" should be --by--;

Column 10, line 13, "KHz" should be --kHz--;

Column 10, line 36, "KHz" should be --kHz--;

Column 11, line 31, after "to" insert --a--;

Column 12, line 59, "piece" should be --pieces--;

Column 14, line 4, "basis" should be --basic--;

Column 17, line 38, "situated" should be --switched--;

Column 19, line 5, "There" should be --Therein--;

Column 20, line 54, "fails" should be --falls--;

Column 21, line 54, "accout" should be --account--;

Column 22, line 26, "same" should be --sense--;

Column 22, line 33, "bu" should be --but--;

UNITED STATES PATENT AND TRADEMARK OFFICE
CERTIFICATE OF CORRECTION

PATENT NO. : 4,255,617
DATED : March 10, 1981
INVENTOR(S) : Frank P. Carau, Sr., Henry T. Hetzel, and Michael A. Tremblay It is certified that error appears in the above—identified patent and that said Letters Patent is hereby corrected as shown below:

Column 28, line 6, after "from" insert -- - --;

Column 28, line 45, "the" should be --that--;

Column 29, line 6, "consecutive" should be --conservative--;

Column 29, line 27, "and" should be --an--;

Column 36, line 31, Claim 4, "of" should be --at--;

Signed and Sealed this

Twenty-fifth Day of August 1981

[SEAL]

Attest:

Attesting Officer

GERALD J. MOSSINGHOFF

Commissioner of Patents and Trademarks